US012659970B2

(12) United States Patent
Hua et al.

(10) Patent No.: US 12,659,970 B2
(45) Date of Patent: Jun. 16, 2026

(54) DOWNLINK CONTROL INFORMATION TRANSMISSION METHOD AND RELATED APPARATUS

(71) Applicant: HUAWEI TECHNOLOGIES CO., LTD., Shenzhen (CN)

(72) Inventors: Meng Hua, Shanghai (CN); Fei Gao, Shanghai (CN); Jinlin Peng, Shanghai (CN); Yi Wang, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 222 days.

(21) Appl. No.: 18/476,859

(22) Filed: Sep. 28, 2023

(65) Prior Publication Data

US 2024/0032064 A1 Jan. 25, 2024

Related U.S. Application Data

(63) Continuation of application No. PCT/CN2022/084470, filed on Mar. 31, 2022.

(30) Foreign Application Priority Data

Apr. 2, 2021 (CN) .......................... 202110363928.6

(51) Int. Cl.
  *H04W 72/23* (2023.01)
  *H04L 27/26* (2006.01)
  (Continued)

(52) U.S. Cl.
  CPC ..... *H04W 72/232* (2023.01); *H04L 27/26025* (2021.01); *H04W 72/1268* (2013.01)

(58) Field of Classification Search
  CPC ............ H04W 72/232; H04W 72/1268; H04L 27/26025
  See application file for complete search history.

(56) References Cited

U.S. PATENT DOCUMENTS

2020/0092073 A1* 3/2020 Papasakellariou ..........................
  H04W 72/0446
2021/0195559 A1* 6/2021 Khoshnevisan ...... H04W 72/23

FOREIGN PATENT DOCUMENTS

CN  110830216 A  2/2020
CN  110958094 A  4/2020
WO  2021021401 A1  2/2021

OTHER PUBLICATIONS

Qualcomm Incorporated, "Views on cross-carrier scheduling from an SCell to the PCell/PSCell," 3GPP TSG RAN WG1 Meeting #103-e, R1-2009277, E-meeting, Oct. 26-Nov. 13, 2020, 6 pages.
(Continued)

*Primary Examiner* — Ronald B Abelson
(74) *Attorney, Agent, or Firm* — Fish & Richardson P.C.

(57) ABSTRACT

This application provides example downlink control information transmission methods and apparatuses. In an example method, a terminal device receives first configuration information. The first configuration information may indicate the terminal device to monitor a physical downlink control channel (PDCCH) candidate in a first scheduling cell and a second scheduling cell. The PDCCH candidate is used to carry downlink control information for scheduling data transmission in a same scheduled cell. The terminal device determines, for the same scheduled cell, monitoring upper limits of the PDCCH candidate in a first unit time and a second unit time. The first unit time is determined based on a subcarrier spacing of an active downlink bandwidth part in the first scheduling cell, and the second unit time is determined based on a subcarrier spacing of an active downlink bandwidth part in the second scheduling cell.

27 Claims, 10 Drawing Sheets

Core network device 110

Radio access network device 120

Terminal device 130

Terminal device 140

(51) Int. Cl.
    *H04W 72/12*       (2023.01)
    *H04W 72/1268*    (2023.01)
    *H04W 72/232*     (2023.01)

(56)           References Cited

OTHER PUBLICATIONS

3GPP TS 38.212 V16.5.0, "3rd Generation Partnership Project; Technical Specification Group Radio Access Network; NR; Multiplexing and channel coding (Release 16)," Mar. 2021, 152 pages.

ZTE, "Discussion on Cross-Carrier Scheduling from SCell to PCell," 3GPP TSG RAN WG1 Meeting #104-e, R1-2100110, e-Meeting, Jan. 25-Feb. 5, 2021, 9 pages.

3GPP TS 38.213 V16.5.0, "3rd Generation Partnership Project; Technical Specification Group Radio Access Network; NR; Physical layer procedures for control (Release 16)," Mar. 2021, 183 pages.

Huawei et al., "Discussion on SCell PDCCH scheduling P(S)Cell PDSCH or Pusch," 3GPP TSG RAN WG1 Meeting #104bis-e, R1-2102309, E-meeting, Apr. 12-20, 2021, 7 pages.

3GPP TS 38.331 V16.4.1, "3rd Generation Partnership Project; Technical Specification Group Radio Access Network; NR; Radio Resource Control (RRC) protocol specification (Release 16)," Mar. 2021, 954 pages.

Qualcomm Incorporated, "Cross-carrier scheduling from an SCell to the PCell/PSCell," 3GPP TSG RAN WG1 Meeting #104-e, R1-2101490, E-meeting, Jan. 25-Feb. 5, 2021, 9 pages.

International Search Report and Written Opinion in International Appln. No. PCT/CN2022/084470, mailed on Jun. 8, 2022, 23 pages (with English translation).

3GPP TS 38.213 V16.4.0 (Dec. 2020), 3rd Generation Partnership Project; Technical Specification Group Radio Access Network; NR; Physical layer procedures for control (Release 16), Dec. 2020, 181 pages.

Office Action in Japanese Appln. No. 2023-560345, mailed on Oct. 8, 2024, 10 pages (with English translation).

* cited by examiner

Slot: slot
Symbol: symbol
SS set: search space set
OS: orthogonal frequency division multiplexing symbol
PDCCH MO: physical downlink control channel monitoring occasion PDCCH monitoring occasion for self-scheduling
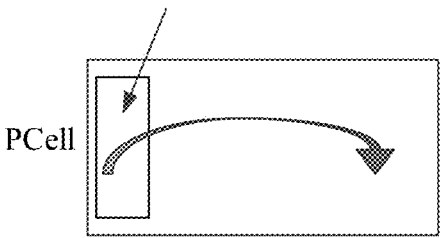
PDCCH monitoring occasion for self-scheduling
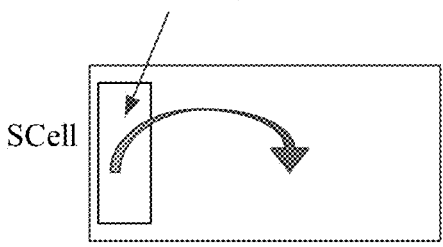
PDCCH: physical downlink control channel
PCell: primary cell
SCell: secondary cell
FIG. 3
PDCCH monitoring occasion for cross-carrier scheduling
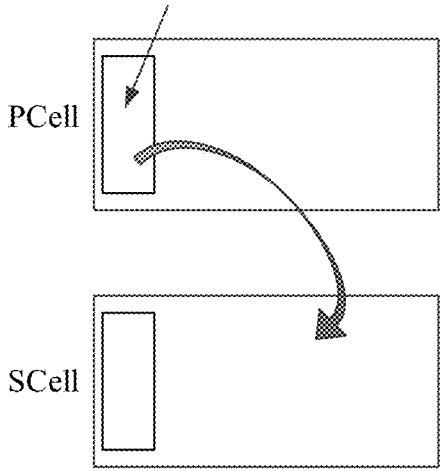
PDCCH: physical downlink control channel
PCell: primary cell
SCell: secondary cell
FIG. 4

PDCCH monitoring occasion for cross-carrier scheduling of a PCell

SCell

PCell

PDCCH monitoring occasion for self-scheduling

PDCCH: physical downlink control channel
PCell: primary cell
SCell: secondary cell 1 slot

| 0 | 1 | 2 | 3 | 4 | 5 | 6 | 7 | 8 | 9 | 10 | 11 | 12 | 13 |

Span 1
Y symbols
X symbols

Slot: slot
Y symbols: Y symbols
X symbols: X symbols
Span: span

PDCCH monitoring occasion for self-scheduling

PDCCH monitoring occasion for cross-carrier scheduling of a PCell

One slot in the SCell

One slot in the SCell

One slot in the PCell

PDCCH monitoring occasion for self-scheduling

SCell

PCell

PDCCH: physical downlink control channel
PCell: primary cell
SCell: secondary cell
Slot: slot

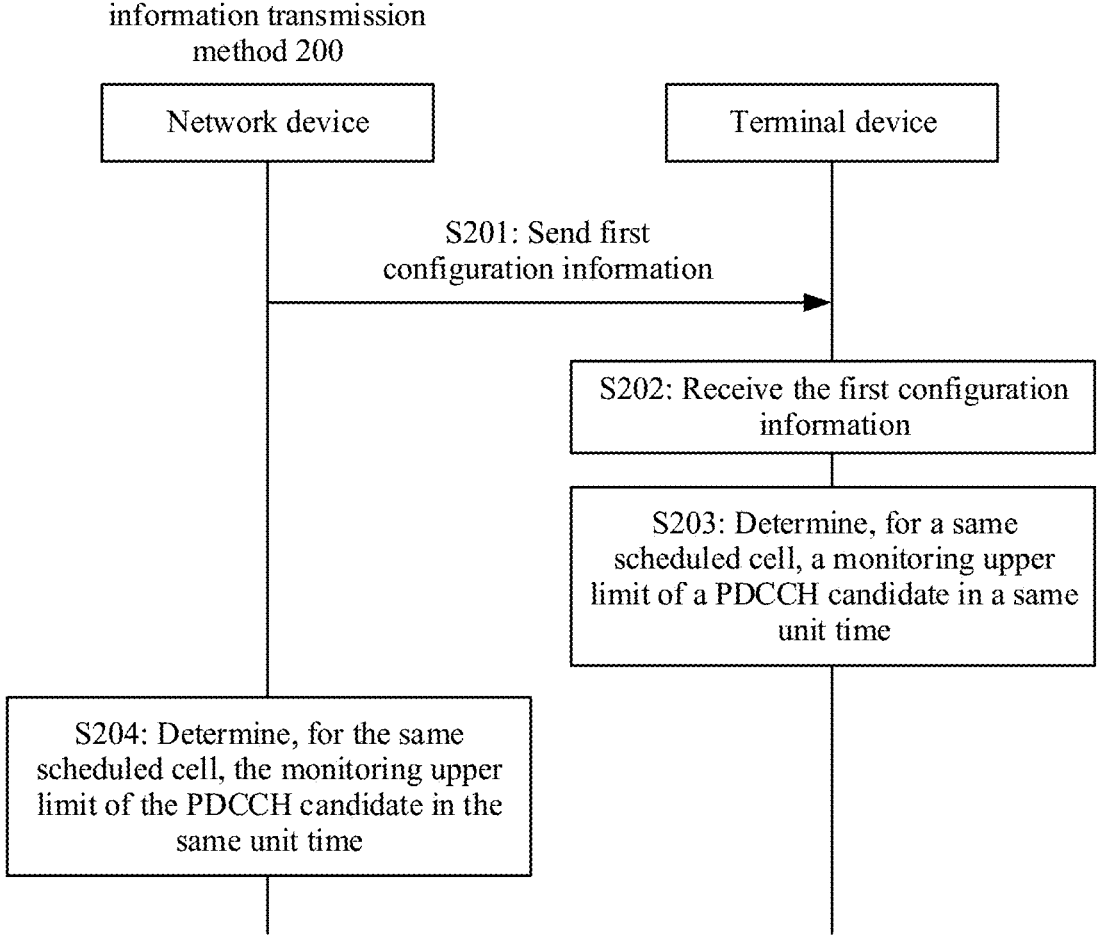

Downlink control
information transmission
method 200

Network device

Terminal device

S201: Send first
configuration information

S202: Receive the first configuration
information

S203: Determine, for a same
scheduled cell, a monitoring upper
limit of a PDCCH candidate in a same
unit time S204: Determine, for the same
scheduled cell, the monitoring upper
limit of the PDCCH candidate in the
same unit time

FIG. 9

DOWNLINK CONTROL INFORMATION TRANSMISSION METHOD AND RELATED APPARATUS

CROSS-REFERENCE TO RELATED APPLICATIONS

This application is a continuation of International Application No. PCT/CN2022/084470, filed on Mar. 31, 2022, which claims priority to Chinese Patent Application No. 202110363928.6, filed on Apr. 2, 2021. The aforementioned applications are hereby incorporated by reference in their entireties.

TECHNICAL FIELD

This application relates to the field of communication technologies, and in particular, to a downlink control information transmission method and a related apparatus.

BACKGROUND

In a new radio (NR) communication system, a physical downlink control channel (PDCCH) candidate may include L={1, 2, 4, 8, 16} control channel elements (CCEs). A PDCCH may be sent, or may not be sent on the PDCCH candidate. Therefore, a terminal device may monitor (or detect) the PDCCH candidate, to determine whether there is a PDCCH of the terminal device.

There are two tasks in PDCCH candidate monitoring that greatly affect implementation complexity of the terminal device: a number of to-be-monitored PDCCH candidates (or referred to as a number of blind detections), and a number of non-overlapping CCEs. More to-be-monitored PDCCH candidates indicate higher decoding complexity of the terminal device; and more non-overlapping CCEs indicate higher channel estimation complexity of the terminal device. This finally results in higher implementation complexity of the terminal device. A monitoring upper limit per unit time in a single cell may be preset, so that implementation complexity of the terminal device falls within a specific range. The preset monitoring upper limit per unit time in the single cell includes a maximum number of to-be-monitored PDCCH candidates and a maximum number of non-overlapping CCEs. The preset monitoring upper limit per unit time in the single cell is related to a value of a subcarrier spacing of an active downlink bandwidth part in the cell.

For self-scheduling, data transmission in a cell is scheduled through a PDCCH in the cell, and a preset monitoring upper limit of a PDCCH candidate, monitored by the terminal device, per unit time in a single cell may be obtained through query in a table based on a subcarrier spacing of an active downlink bandwidth part in the cell. For cross-carrier scheduling, for example, data transmission in a primary cell may be simultaneously scheduled by a PDCCH in the primary cell and a PDCCH in a secondary cell, that is, there are two scheduling cells for scheduling a scheduled cell. In this case, how to determine a monitoring upper limit per unit time becomes an urgent problem to be resolved.

SUMMARY

This application provides a downlink control information transmission method and a related apparatus, to resolve a problem of how to determine a monitoring upper limit in a scenario in which two cells schedule a same cell.

According to a first aspect, this application provides a downlink control information transmission method. In the method, a terminal device may receive first configuration information. The first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell. The terminal device determines, for the same scheduled cell, monitoring upper limits of the PDCCH candidate in a first unit time and in a second unit time. The first unit time is determined based on a subcarrier spacing of an active downlink bandwidth part in the first scheduling cell, and the second unit time is determined based on a subcarrier spacing of an active downlink bandwidth part in the second scheduling cell.

It can be learned that, in the method, monitoring limits of the PDCCH candidate in two unit times are determined, to be specific, the subcarrier spacings respectively corresponding to the first scheduling cell and the second scheduling cell are considered, and this resolves a problem of how to determine the monitoring upper limit in a scenario in which the two scheduling cells schedule the same scheduled cell.

In addition, the downlink control information transmission method in this aspect is applicable to a scenario in which subcarrier spacings are different. For example, the subcarrier spacing corresponding to the first scheduling cell is different from the subcarrier spacing corresponding to the second scheduling cell. In the method, the monitoring upper limits in the two unit times are determined. This can avoid a problem that only a monitoring upper limit in one unit time is determined and a monitoring upper limit in the other unit time is excessively large.

According to a second aspect, this application further provides a downlink control information transmission method. The method corresponds to the first aspect, and is described from a perspective of a network device. In the method, the network device sends first configuration information. The first configuration information indicates a terminal device to monitor a physical downlink control channel PDCCH candidate in a first scheduling cell and a second scheduling cell, and the PDCCH candidate is used to carry downlink control information for scheduling data transmission in a same scheduled cell. The network device determines, for the same scheduled cell, monitoring upper limits of the PDCCH candidate in a first unit time and a second unit time. The first unit time is determined based on a subcarrier spacing of an active downlink bandwidth part in the first scheduling cell, and the second unit time is determined based on a subcarrier spacing of an active downlink bandwidth part in the second scheduling cell.

It can be learned that, in the method, monitoring limits of the PDCCH candidate in two unit times are determined, to be specific, the subcarrier spacings respectively corresponding to the first scheduling cell and the second scheduling cell are considered, and this resolves a problem of how to determine the monitoring upper limit in a scenario in which the two scheduling cells schedule the same scheduled cell.

Optionally, the method is applicable to a scenario in which a plurality of scheduling cells schedule a same scheduled cell. For example, in a scenario in which a first scheduling cell, a second scheduling cell, and a third scheduling cell schedule a same scheduled cell, monitoring upper limits of a PDCCH candidate in a first unit time to a third unit time may be determined for the scheduled cell. The first unit time is determined based on a subcarrier spacing of an active downlink bandwidth part in the first scheduling cell, the second unit time is determined based on a subcarrier spacing of an active downlink bandwidth part in the second scheduling cell, and the third unit time is determined based on a subcarrier spacing of an active downlink bandwidth part in the third scheduling cell.

In addition, the downlink control information transmission method in this aspect is applicable to a scenario in which subcarrier spacings are different. For example, the subcarrier spacing corresponding to the first scheduling cell is different from the subcarrier spacing corresponding to the second scheduling cell. In the method, the monitoring upper limits in two unit times are determined. This can avoid a problem that only the monitoring upper limit in one unit time is determined and the monitoring upper limit in the other unit time is excessively large.

The following describes one or more implementations applicable to the first aspect or the second aspect.

In an optional implementation, the first configuration information meets one or more of the following features:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool;

the first scheduling cell is not configured with a control resource set pool CORESETPool, and the second scheduling cell is configured with a CORESETPool; or the first scheduling cell and the second scheduling cell both are such configured that a monitoring upper limit is determined at a granularity of a span, and monitoring is performed in the first monitoring cell and the second monitoring cell by using a combination $(X, Y)$, where there is a symbol group, in the second scheduling cell, whose start location overlaps a start location of any symbol group in the first scheduling cell, every $X$ symbols constitute a symbol group, the subcarrier spacing of the active downlink bandwidth part in the first scheduling cell is greater than the subcarrier spacing of the active downlink bandwidth part in the second scheduling cell, the combination $(X, Y)$ indicates that an interval between start symbols of two consecutive spans is not less than $X$ symbols, and each span is not greater than $Y$ symbols.

It can be learned that, in this implementation, configuration information of the first scheduling cell and the second scheduling cell is limited. This helps simplify determining of the monitoring upper limit of the PDCCH candidate per unit time.

That the first scheduling cell and the second scheduling cell both are such configured that the monitoring upper limit is determined at the granularity of the slot may be: The first scheduling cell and the second scheduling cell each are not configured with an r16 monitoring capability; the first scheduling cell and the second scheduling cell each are not configured with a monitoring capability configuration-r16 that is equal to an r16 monitoring capability; the first scheduling cell and the second scheduling cell each are not configured with a monitoring capability configuration-r16; the first scheduling cell and the second scheduling cell each are configured with a monitoring capability configuration-r16 that is equal to an r15 monitoring capability; the first scheduling cell and the second scheduling cell each are configured with an r15 monitoring capability; or the first scheduling cell is configured with a monitoring capability configuration-r16 that is equal to an r15 monitoring capability, and the second scheduling cell is not configured with a monitoringCapabilityConfig-r16.

That the first scheduling cell and the second scheduling cell both are such configured that the monitoring upper limit is determined at the granularity of the span may be: The first scheduling cell and the second scheduling cell each are configured with an r16 monitoring capability, or the first scheduling cell and the second scheduling cell each are configured with a monitoring capability configuration-r16 that is equal to an r16 monitoring capability.

The control resource set pools CORESETPools that are respectively configured for the first scheduling cell and the second scheduling cell may be control resource set pool indexes CORESETPoolIndexes that are respectively configured for the first scheduling cell and the second scheduling cell. Correspondingly, a number of CORESETPools may be a number of CORESETPoolIndexes.

In an optional implementation, the monitoring upper limit in the first unit time is determined based on a preset monitoring upper limit per unit time corresponding to the first scheduling cell, and the monitoring upper limit in the second unit time is determined based on a preset monitoring upper limit per unit time corresponding to the second scheduling cell.

Optionally, the monitoring upper limit in each unit time includes a first upper limit in the unit time, and/or a second upper limit in the unit time, where the first upper limit is a maximum number of to-be-monitored PDCCH candidates, and the second upper limit is a maximum number of non-overlapping control channel elements CCEs in the to-be-monitored PDCCH candidate. The preset monitoring upper limit per unit time includes a first preset upper limit and/or a second preset upper limit, where the first preset upper limit is a preset maximum number of to-be-monitored PDCCH candidates in the unit time, and the second preset upper limit is a preset maximum number of non-overlapping CCEs in the to-be-monitored PDCCH candidate in the unit time.

In an optional implementation, when the first scheduling cell and the second scheduling cell each are not configured with a control resource set pool CORESETPool, or each are configured with a CORESETPool, when the first scheduling cell is configured with a CORESETPool, and the second scheduling cell is not configured with a CORESETPool, when the first scheduling cell is not configured with a CORESETPool, and the second scheduling cell is configured with a CORESETPool, or when the first scheduling cell and the second scheduling cell each are configured with two CORESETPools, for control resource sets corresponding to a same CORESETPool, the monitoring upper limit in the first unit time includes one or more of the following:

US 12,659,970 B2

5 a first upper limit corresponding to the first scheduling cell and the second scheduling cell, where the first upper limit is determined based on a first preset upper limit corresponding to the first scheduling cell;

a second upper limit corresponding to the first scheduling cell and the second scheduling cell, where the second upper limit is determined based on a second preset upper limit corresponding to the first scheduling cell;

a first upper limit corresponding to the first scheduling cell, where the first upper limit is determined based on the first preset upper limit corresponding to the first scheduling cell; and a second upper limit corresponding to the first scheduling cell, where the second upper limit is determined based on the second preset upper limit corresponding to the first scheduling cell; and the monitoring upper limit in the second unit time includes one or more of the following:

a first upper limit corresponding to the first scheduling cell and the second scheduling cell, where the first upper limit is determined based on a first preset upper limit corresponding to the second scheduling cell;

a second upper limit corresponding to the first scheduling cell and the second scheduling cell, where the second upper limit is determined based on a second preset upper limit corresponding to the second scheduling cell;

a first upper limit corresponding to the second scheduling cell, where the first upper limit is determined based on the first preset upper limit corresponding to the second scheduling cell; and a second upper limit corresponding to the second scheduling cell, where the second upper limit is determined based on the second preset upper limit corresponding to the second scheduling cell.

It can be learned that, in this implementation, the monitoring upper limit in the first unit time is as follows: The first upper limit corresponding to the first scheduling cell, or the first upper limit corresponding to the first scheduling cell and the second scheduling cell is determined based on the first preset upper limit corresponding to the first scheduling cell; and the second upper limit corresponding to the first scheduling cell, or the second upper limit corresponding to the first scheduling cell and the second scheduling cell is determined based on the second preset upper limit corresponding to the first scheduling cell. The monitoring upper limit in the second unit time is as follows: The first upper limit corresponding to the second scheduling cell, or the first upper limit corresponding to the first scheduling cell and the second scheduling cell is determined based on the first preset upper limit corresponding to the second scheduling cell; and the second upper limit corresponding to the second scheduling cell, or the second upper limit corresponding to the first scheduling cell and the second scheduling cell is determined based on the second preset upper limit corresponding to the second scheduling cell.

In another implementation, when the first scheduling cell and the second scheduling cell are configured with two control resource set pools CORESETPools, the monitoring upper limit in the first unit time includes one or more of the following:

a first upper limit corresponding to the first scheduling cell and the second scheduling cell, where the first upper limit is determined based on a third parameter and a first preset upper limit corresponding to the first scheduling cell;

6 a second upper limit corresponding to the first scheduling cell and the second scheduling cell, where the second upper limit is determined based on the third parameter and a second preset upper limit corresponding to the first scheduling cell;

a first upper limit corresponding to the first scheduling cell, where the first upper limit is determined based on the third parameter and the first preset upper limit corresponding to the first scheduling cell; and a second upper limit corresponding to the first scheduling cell, where the second upper limit is determined based on the third parameter and the second preset upper limit corresponding to the first scheduling cell; and the monitoring upper limit in the second unit time includes one or more of the following:

a first upper limit corresponding to the first scheduling cell and the second scheduling cell, where the first upper limit is determined based on the third parameter and a first preset upper limit corresponding to the second scheduling cell;

a second upper limit corresponding to the first scheduling cell and the second scheduling cell, where the second upper limit is determined based on the third parameter and a second preset upper limit corresponding to the second scheduling cell;

a first upper limit corresponding to the second scheduling cell, where the first upper limit is determined based on the third parameter and the first preset upper limit corresponding to the second scheduling cell; and a second upper limit corresponding to the second scheduling cell, where the second upper limit is determined based on the third parameter and the second preset upper limit corresponding to the second scheduling cell.

The third parameter is used to determine a number of cells corresponding to a scheduled cell scheduled by the scheduling cell configured with the two CORESETPools.

It can be learned that, in this implementation, the monitoring upper limit in the first unit time is as follows: The first upper limit corresponding to the first scheduling cell, or the first upper limit corresponding to the first scheduling cell and the second scheduling cell is determined based on the third parameter and the first preset upper limit corresponding to the first scheduling cell; and the second upper limit corresponding to the first scheduling cell, or the second upper limit corresponding to the first scheduling cell and the second scheduling cell is determined based on the third parameter and the second preset upper limit corresponding to the first scheduling cell. The monitoring upper limit in the second unit time is as follows: The first upper limit corresponding to the second scheduling cell, or the first upper limit corresponding to the first scheduling cell and the second scheduling cell is determined based on the third parameter and the first preset upper limit corresponding to the second scheduling cell; and the second upper limit corresponding to the second scheduling cell, or the second upper limit corresponding to the first scheduling cell and the second scheduling cell is determined based on the third parameter and the second preset upper limit corresponding to the second scheduling cell. It can be learned that, in this implementation, the number of cells (or may be referred to as a number of logical cells corresponding to the scheduled cell) corresponding to the scheduled cell scheduled by the scheduling cell configured with the two CORESETPools is considered.

In addition to providing the monitoring upper limits, in the two unit times, determined for the same scheduled cell in any one of the foregoing implementations, this application further provides a monitoring upper limit, in one unit time, determined for a plurality of scheduled cells. To be specific, the terminal device determines, for a plurality of scheduled cells, a monitoring upper limit of all PDCCH candidates in a plurality of scheduling cells in a unit time with a subcarrier spacing of μ. The plurality of scheduling cells are all scheduling cells that are configured for the terminal device and in which a subcarrier spacing of an active downlink bandwidth part is μ, and the plurality of scheduled cells are all scheduled cells that are respectively scheduled by the plurality of scheduling cells.

For the plurality of scheduled cells, the monitoring upper limit is determined based on a preset monitoring upper limit per unit time corresponding to the scheduling cell in which the subcarrier spacing is μ. Specifically, a maximum number of all PDCCH candidates is determined based on a preset upper limit of PDCCH candidates corresponding to the scheduling cell in which the subcarrier spacing is μ; and the upper limit of the number of non-overlapping CCEs in all PDCCH candidates is determined based on a preset upper limit of non-overlapping CCEs in PDCCH candidates corresponding to the scheduling cell in which the subcarrier spacing is μ.

According to a third aspect, this application provides a downlink control information transmission method. In the method, a terminal device receives first configuration information. The first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell. The terminal device determines, for the same scheduled cell, a monitoring upper limit of the PDCCH candidate in a same unit time. The same unit time is determined based on a subcarrier spacing of an active downlink bandwidth part in the first scheduling cell or the second scheduling cell.

It can be learned that, in the method, when a unit time determined based on the subcarrier spacing of the active downlink bandwidth part in the first scheduling cell and a unit time determined based on the subcarrier spacing of the active downlink bandwidth part in the second scheduling cell are a same unit time, that is, the subcarrier spacing of the active downlink bandwidth part in the first scheduling cell is the same as the subcarrier spacing of the active downlink bandwidth part in the second scheduling cell, the monitoring upper limit of the PDCCH candidate in the same unit time may be determined.

According to a fourth aspect, this application further provides a downlink control information transmission method. The method corresponds to the method in the third aspect, and is described from a perspective of a network device. In the method, the network device sends first configuration information. The first configuration information indicates a terminal device to monitor a physical downlink control channel PDCCH candidate in a first scheduling cell and a second scheduling cell, and the PDCCH candidate is used to carry downlink control information for scheduling data transmission in a same scheduled cell. The network device determines, for the same scheduled cell, a monitoring upper limit of the PDCCH candidate in a same unit time. The same unit time is determined based on a subcarrier spacing of an active downlink bandwidth part in the first scheduling cell or the second scheduling cell.

It can be learned that, in the method, when a unit time determined based on the subcarrier spacing of the active downlink bandwidth part in the first scheduling cell and a unit time determined based on the subcarrier spacing of the active downlink bandwidth part in the second scheduling cell are a same unit time, the monitoring upper limit of the PDCCH candidate in the same unit time may be determined.

In an optional implementation, in the method in the third aspect or the fourth aspect, the first configuration information meets one or more of the following features:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool; or the first scheduling cell and the second scheduling cell both are such configured that a monitoring upper limit is determined at a granularity of a span, and monitoring is performed in the first monitoring cell and the second monitoring cell by using a combination (X, Y).

The combination (X, Y) indicates that an interval between start symbols of two consecutive spans is not less than X symbols, and each span is not greater than Y symbols.

In this implementation, the monitoring upper limit of the PDCCH candidate is determined under the foregoing limitation condition. This can reduce implementation complexity of the terminal.

According to a fifth aspect, this application further provides a downlink control information transmission method. In the method, a terminal device receives first configuration information. The first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell. When the first configuration information does not meet one or more of the following features, the terminal device determines that the PDCCH candidate is not monitored for the scheduled cell:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool; or the first scheduling cell and the second scheduling cell both are such configured that a monitoring upper limit is determined at a granularity of a span, and monitoring is performed in the first monitoring cell and the second monitoring cell by using a combination, where there is a symbol group, in the second scheduling cell, whose start location overlaps a start location of any symbol group in the first scheduling cell, every X symbols constitute a symbol group, the combination (X, Y) indicates that an interval between start symbols of two consecutive spans is not less than X symbols, and each span is not greater than Y symbols.

It can be learned that, in the method, determining of the monitoring upper limit of the PDCCH candidate can be simplified based on one or more of the foregoing features. In addition, the terminal device expects that the first configuration information meets one or more of the foregoing features. In other words, the terminal device does not expect that the first configuration information does not have one or more of the foregoing features.

From another perspective, when determining that the first configuration information cannot meet one or more of the following features, the terminal device may monitor the PDCCH candidate, or when determining that the first configuration information meets one or more of the following features, the terminal device determines that the PDCCH candidate is not monitored for the scheduled cell:

one scheduling cell in the first scheduling cell and the second scheduling cell is such configured that a monitoring upper limit is determined at a granularity of a slot, and the other scheduling cell is such configured that a monitoring upper limit is determined at a granularity of a span;

a number of CORESETPools configured for one scheduling cell in the first scheduling cell and the second scheduling cell is 2, and a number of CORESETPools configured for the other scheduling cell is 1;

a number of CORESETPools configured for one scheduling cell in the first scheduling cell and the second scheduling cell is 2, and the other scheduling cell is not configured with a CORESETPool;

the first scheduling cell and the second scheduling cell both are such configured that a monitoring upper limit is determined at a granularity of a span, and monitoring is performed in the first monitoring cell and the second monitoring cell by using different combinations (X, Y), where the combination (X, Y) indicates that an interval between start symbols of two consecutive spans is not less than X symbols, and each span is not greater than Y symbols; or the first scheduling cell and the second scheduling cell both are such configured that a monitoring upper limit is determined at a granularity of a span, and monitoring is performed in the first monitoring cell and the second monitoring cell by using a combination (X, Y), where there is no symbol group, in the second scheduling cell, whose start location overlaps a start location of at least one symbol group in the first scheduling cell, every X symbols constitute a symbol group, the combination (X, Y) indicates that an interval between start symbols of two consecutive spans is not less than X symbols, and each span is not greater than Y symbols.

According to a sixth aspect, this application further provides a downlink control information transmission method. The method corresponds to the method in the fifth aspect, and is described from a perspective of a network device. In the method, the network device is configured to send first configuration information. The first configuration information indicates a terminal device to monitor a physical downlink control channel PDCCH candidate in a first scheduling cell and a second scheduling cell, and the PDCCH candidate is used to carry downlink control information for scheduling data transmission in a same scheduled cell.

The first configuration information meets one or more of the following features:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool; or the first scheduling cell and the second scheduling cell both are such configured that a monitoring upper limit is determined at a granularity of a span, and monitoring is performed in the first monitoring cell and the second monitoring cell by using a combination (X, Y), where there is a symbol group, in the second scheduling cell, whose start location overlaps a start location of any symbol group in the first scheduling cell, every X symbols constitute a symbol group, the combination (X, Y) indicates that an interval between start symbols of two consecutive spans is not less than X symbols, and each span is not greater than Y symbols.

Further, the network device determines, for the same scheduled cell, monitoring upper limits of the PDCCH candidate in a first unit time and a second unit time. The first unit time is determined based on a subcarrier spacing of an active downlink bandwidth part in the first scheduling cell, and the second unit time is determined based on a subcarrier spacing of an active downlink bandwidth part in the second scheduling cell.

It can be learned that, in the method, determining of the monitoring upper limit of the PDCCH candidate can be simplified based on one or more of the foregoing features.

According to a seventh aspect, this application further provides a downlink control information transmission method. In the method, a terminal device receives first configuration information. The first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell. When the first configuration information does not meet one or more of the following features, the terminal device determines that the PDCCH candidate is not monitored for the scheduled cell:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool; or the first scheduling cell and the second scheduling cell both are such configured that a monitoring upper limit is determined at a granularity of a span, and monitoring is performed in the first monitoring cell and the second monitoring cell by using a combination (X, Y).

The combination (X, Y) indicates that an interval between start symbols of two consecutive spans is not less than X symbols, and each span is not greater than Y symbols.

It can be learned that, in the method, determining of the monitoring upper limit of the PDCCH candidate can be simplified based on one or more of the foregoing features. In addition, the terminal device expects that the first configuration information meets one or more of the foregoing features In other words, the terminal device does not expect that the first configuration information does not have one or more of the foregoing features.

From another perspective, when determining that the first configuration information cannot meet one or more of the following features, the terminal device may monitor the PDCCH candidate, or when determining that the first configuration information meets one or more of the following features, the terminal device determines that the PDCCH candidate is not monitored for the scheduled cell:

one scheduling cell in the first scheduling cell and the second scheduling cell is such configured that a monitoring upper limit is determined at a granularity of a slot, and the other scheduling cell is such configured that a monitoring upper limit is determined at a granularity of a span;

a number of CORESETPools configured for one scheduling cell in the first scheduling cell and the second scheduling cell is 2, and a number of CORESETPools configured for the other scheduling cell is 1;

a number of CORESETPools configured for one scheduling cell in the first scheduling cell and the second scheduling cell is 2, and the other scheduling cell is not configured with a CORESETPool; or the first scheduling cell and the second scheduling cell both are such configured that a monitoring upper limit is determined at a granularity of a span, and monitoring is performed in the first monitoring cell and the second monitoring cell by using different combinations (X, Y), where the combination (X, Y) indicates that an interval between start symbols of two consecutive spans is not less than X symbols, and each span is not greater than Y symbols.

The combination (X, Y) indicates that an interval between start symbols of two consecutive spans is not less than X symbols, and each span is not greater than Y symbols.

It can be learned that in the method, when a subcarrier spacing of an active downlink bandwidth part in the first scheduling cell is the same as a subcarrier spacing of an active downlink bandwidth part in the second scheduling cell, determining of the monitoring upper limit of the PDCCH candidate can be simplified.

According to an eighth aspect, this application further provides a downlink control information transmission method. The method corresponds to the method in the sixth aspect, and is described from a perspective of a network device. In the method, the network device is configured to send first configuration information. The first configuration information indicates a terminal device to monitor a physical downlink control channel PDCCH candidate in a first scheduling cell and a second scheduling cell, and the PDCCH candidate is used to carry downlink control information for scheduling data transmission in a same scheduled cell.

The first configuration information meets one or more of the following features:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool; or the first scheduling cell and the second scheduling cell both are such configured that a monitoring upper limit is determined at a granularity of a span, and monitoring is performed in the first monitoring cell and the second monitoring cell by using a combination (X, Y).

The combination (X, Y) indicates that an interval between start symbols of two consecutive spans is not less than X symbols, and each span is not greater than Y symbols.

Further, the network device determines, for the same scheduled cell, a monitoring upper limit of the PDCCH candidate in a same unit time. The same unit time is determined based on a subcarrier spacing of an active downlink bandwidth part in the first scheduling cell or the second scheduling cell.

It can be learned that in the method, when a subcarrier spacing of an active downlink bandwidth part in the first scheduling cell is the same as a subcarrier spacing of an active downlink bandwidth part in the second scheduling cell, determining of the monitoring upper limit of the PDCCH candidate can be simplified.

It should be noted that the method in any one of the first aspect to the eighth aspect of this application is also applicable to a scenario in which a plurality of scheduling cells schedule a same scheduled cell. For example, in a scenario in which a first scheduling cell, a second scheduling cell, and a third scheduling cell schedule a same scheduled cell, with reference to the method in the first aspect or the second aspect, monitoring upper limits of a PDCCH candidate in the first to the third unit time may be determined for the scheduled cell. The first unit time is determined based on a subcarrier spacing of an active downlink bandwidth part in the first scheduling cell, the second unit time is determined based on a subcarrier spacing of an active downlink bandwidth part in the second scheduling cell, and the third unit time is determined based on a subcarrier spacing of an active downlink bandwidth part in the third scheduling cell.

According to a ninth aspect, this application provides a communication apparatus, including a communication unit and a processing unit. The communication apparatus is configured to implement the method described in any one of the first aspect to the eighth aspect or the possible implementations of the first aspect to the eighth aspect.

In this aspect, the communication unit may also be a transceiver, configured to send and/or receive data in any one of the first aspect to the eighth aspect; and the processing unit may also be a processor, configured to process data in any one of the first aspect to the eighth aspect.

According to a tenth aspect, this application provides a chip system. The chip system includes at least one processor, configured to implement functions in any one of the first aspect to the eighth aspect, for example, receiving or processing data and/or information in the foregoing methods.

In a possible design, the chip system further includes a memory. The memory is configured to store program instructions and data. The memory is located inside the processor or outside the processor. The chip system may include a chip, or may include a chip and another discrete component.

According to an eleventh aspect, this application further provides a communication apparatus. The communication apparatus includes at least one processor and a communication interface. The communication interface is configured to send and/or receive data. The at least one processor is configured to invoke a computer program stored in at least one memory, so that the communication apparatus implements the method described in any one of the first aspect to the eighth aspect or the possible implementation of the first aspect to the eighth aspect.

According to a twelfth aspect, this application further provides a downlink control channel transmission system. The downlink control channel transmission system includes at least a network device and a terminal device. The network device is configured to implement the method described in any one of the possible implementations of the second aspect, the fourth aspect, or the eighth aspect. The terminal device is configured to implement the method described in any one of the possible implementations of the first aspect, the third aspect, or the fifth aspect.

According to a thirteenth aspect, this application further provides a computer-readable storage medium. The computer-readable storage medium stores a computer program, and when the computer program is run on one or more processors, the method described in any one of the first aspect to the eighth aspect or the possible implementations of the first aspect to the eighth aspect is implemented.

According to a fourteenth aspect, an embodiment of this application discloses a computer program product. When the computer program product runs on one or more processors, the method described in any one of the first aspect to the eighth aspect or the possible implementations of the first aspect to the eighth aspect is implemented.

BRIEF DESCRIPTION OF DRAWINGS

FIG. 3 is a schematic diagram of respective self-scheduling of a PCell and an SCell according to an embodiment of this application;

FIG. 4 is a schematic diagram of cross-carrier scheduling on an SCell from a PCell according to an embodiment of this application;

FIG. 9 is a schematic flowchart of a downlink control information transmission method 200 according to an embodiment of this application;

DESCRIPTION OF EMBODIMENTS

Figure 1:
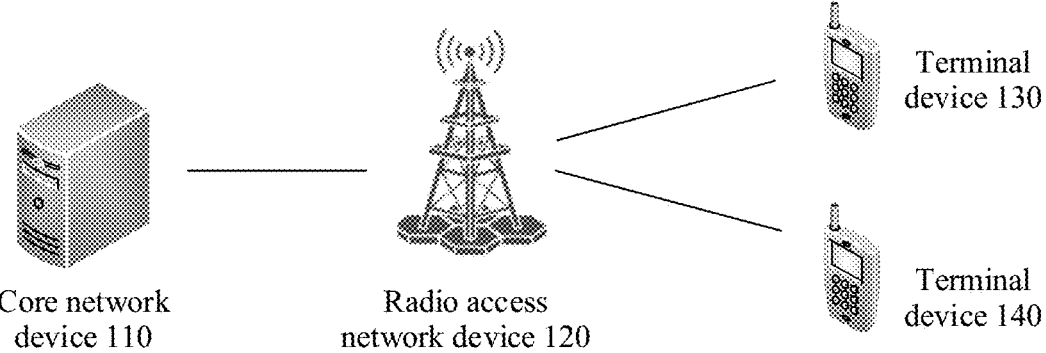
FIG. 1 is a schematic diagram of a structure of a communication system according to an embodiment of this application.

According to the downlink control information transmission method and the related apparatus provided in this application, an upper limit of a PDCCH candidate that needs to be monitored by a terminal device can be determined for a scenario in which a plurality of scheduling cells schedule a same scheduled cell.

First, the following describes a communication system to which embodiments of this application are applicable.

In this application, communication between a network device and a terminal device and communication between terminal devices may be performed by using a licensed spectrum, an unlicensed spectrum, or both the licensed spectrum and the unlicensed spectrum. Communication between the network device and the terminal device and communication between the terminal devices may be performed by using a spectrum below 6G, a spectrum above 6G, or both a spectrum below 6G and a spectrum above 6G. A spectrum resource used between the network device and the terminal device is not limited in embodiments of this application. This application may be applied to various communication systems, for example, a 4th generation (4G) mobile communication system, a 5th generation (5G) mobile communication system, and a 6th generation (6G) mobile communication system. With continuous development of communication technologies, technical solutions in embodiments of this application may be further applied to a subsequently evolved communication system, for example, a 7th generation (7G) mobile communication system.

In embodiments of this application, the network device is an entity configured to transmit or receive a signal on a network side, and the network device may be a device having a wireless transceiver function or a chip that may be disposed in the device. The network device includes but is not limited to an evolved NodeB (eNB), an access point (AP) in a wireless fidelity (Wi-Fi) system, a wireless relay node, a wireless backhaul node, a transmission point (TRP), or transmission point (TP), and the like. Alternatively, the network device may be a device used in a 4G, 5G, or even 6G system, for example, a gNB in an NR system, or a TRP or TP, or one or a group of antenna panels (including a plurality of antenna panels) of a network device in a 4G system. Alternatively, the network device may be a network node that forms a gNB or a transmission point, for example, a baseband unit (BBU), a distributed unit (DU), a picocell, a femtocell or a road side unit (RSU) in an intelligent driving scenario.

In embodiments of this application, the terminal device is an entity configured to receive or transmit a signal on a terminal side, and the terminal device may be a device having a wireless transceiver function or a chip that may be disposed in the device. The terminal device may also be referred to as user equipment (UE), a terminal, an access terminal, a subscriber unit, a subscriber station, a mobile station, a mobile console, a remote station, a remote terminal, a mobile device, a user terminal, a user agent, or a user apparatus, and may be used in a 4G, 5G, or even 6G system. The terminal in embodiments of this application may be a mobile phone, a tablet computer (e.g. Pad), a computer with a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, an RSU of the foregoing wireless terminal type, or the like.

The network device and the terminal device may be deployed on the land, including an indoor device, an outdoor device, a handheld device, or a vehicle-mounted device; may be deployed on the water; or may be deployed on an airplane, a balloon, and a satellite in the air. Application scenarios of a radio access network device and the terminal device are not limited in embodiments of this application.

This application is applicable to downlink signal transmission. For the downlink signal transmission, a sending device is the network device, and a corresponding receiving device is the terminal device. For D2D signal transmission, a sending device is a terminal device, and a corresponding receiving device is also a terminal device.

FIG. 1 is a schematic diagram of a structure of a communication system according to an embodiment of this application. The communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. A core network device and the radio access network device may be independent and different physical devices, or functions of the core network device and logical functions of the radio access network device are integrated into a same physical device, or a part of functions of the core network device and a part of functions of the radio access network device are integrated into one physical device. The terminal device may be located at a fixed location, or may be mobile. FIG. 1 is a schematic diagram. The communication system may further include other network devices, for example, a wireless relay device and a wireless backhaul device, which are not shown in FIG. 1. Numbers of core network devices, radio access network devices, and terminal devices included in the mobile communication system are not limited in this embodiment of this application. In FIG. 1, for example, the radio access network device is a base station and the terminal device is a mobile phone.

For example, in the communication system shown in FIG. 1, the base station may send first configuration information to the mobile phone. The first configuration information indicates the mobile phone to monitor a physical downlink control channel candidate (PDCCH candidate) in a first scheduling cell and a second scheduling cell. The PDCCH candidate is used to carry downlink control information for scheduling data transmission in the same scheduled cell. Further, after receiving the first configuration information, the mobile phone may determine monitoring upper limits of the PDCCH candidate in one or two unit times for the same scheduled cell.

In another embodiment, the base station sends first configuration information to the mobile phone. The first configuration information indicates the mobile phone to monitor a physical downlink control channel PDCCH candidate in a first scheduling cell and a second scheduling cell, and also has one or more of the following features: The first scheduling cell and the second scheduling cell both are such configured that a monitoring upper limit is determined at a granularity of a slot; the first scheduling cell and the second scheduling cell both are such configured that a monitoring upper limit is determined at a granularity of a span; numbers of control resource set pools CORESETPools that are respectively configured for the first scheduling cell and the second scheduling cell are the same and the numbers of the respectively configured CORESETPools are 1; numbers of control resource set pools CORESETPools that are respectively configured for the first scheduling cell and the second scheduling cell are the same and the numbers of the respectively configured CORESETPools are 2; the first scheduling cell is configured with a control resource set pool CORESETPool, and the second scheduling cell is not configured with a CORESETPool; or the first scheduling cell and the second scheduling cell both are such configured that a monitoring upper limit is determined at a granularity of a span, and monitoring is performed in the first monitoring cell and the second monitoring cell by using a combination (X, Y), where there is a symbol group, in the second scheduling cell, whose start location overlaps a start location of any symbol group in the first scheduling cell, every X symbols constitute a symbol group, the combination (X, Y) indicates that an interval between start symbols of two consecutive spans is not less than X symbols, and each span is not greater than Y symbols. Therefore, in a scenario in which a plurality of scheduling cells schedule a same scheduled cell, a monitoring upper limit of a PDCCH candidate in a unit time can be simplified.

In embodiments provided in this application, an NR network scenario in a wireless communication network is used as an example of scenarios for description. It should be noted that the solutions in embodiments disclosed in this application may be further applied to another wireless communication network, and a corresponding name may also be replaced with a name of a corresponding function in the another wireless communication network.

In embodiments provided in this application, aspects, embodiments, or features of this application are presented by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, related concepts in embodiments of this application are briefly described.

1. Cell

The cell is described from a perspective of resource management or mobility management by a higher layer (for example, a protocol layer above a physical layer such as a radio resource control layer or a medium access control layer). Coverage of each network device may be divided into one or more cells. One cell may be configured with one downlink carrier. Optionally, the cell may alternatively be configured with at least one uplink carrier. The cell is a general name. For a terminal device, a cell that provides a service for the terminal device is referred to as a serving cell. Therefore, the cell in this application may also be a serving cell.

In dual connectivity (DC), a terminal device establishes links to a plurality of cells, and these cells are divided into two groups: a master cell group (MCG) and a secondary cell group (SCG). If dual connectivity is not performed, a group of cells that communicate with the terminal device are an MCG. A primary cell in the MCG is a primary cell (PCell), a primary cell in the SCG is a primary secondary cell (PSCell), and another cell in the MCG and the SCG is a secondary cell (SCell). The PCell in the MCG and the SCell in the MCG are combined by using the carrier aggregation (CA) technology. The PSCell in the SCG and the SCell in the SCG are also combined by using a carrier aggregation technology.

2. Subcarrier Spacing

Subcarrier spacing (SCS): There are five subcarrier spacings in NR, and indexes of the five subcarrier spacings may be 0 to 4, and respectively correspond to 15 kHz, 30 kHz, 60 kHz, 120 kHz, and 240 kHz.

In addition, a concept of a bandwidth part (BWP) is introduced into the NR. One BWP is a segment of consecutive frequency resources on one carrier. After one BWP is configured and activated, the BWP is referred to as an active BWP. There may be one active downlink BWP on one downlink carrier, and there may be one active uplink BWP on one uplink carrier. Uplink data and control information sent by UE are sent in the active uplink BWP, and downlink data and control information are received in the active downlink BWP.

In a plurality of cells connected to a terminal device, subcarrier spacings of configured active downlink BWPs may be the same or different. Different subcarrier spacings correspond to different slot lengths.

3. PDCCH Candidate and PDCCH Monitoring Occasion

A terminal device needs to monitor a PDCCH candidate corresponding to this cell, to determine whether there is a PDCCH of the terminal device. A PDCCH candidate of a cell may include L={1, 2, 4, 8, 16} control channel elements (CCEs). L may be referred to as a PDCCH aggregation level (AL). One CCE includes six resource element groups (REGs), and each REG corresponds to one resource block (RB) on one orthogonal frequency division multiplexing symbol (OFDM symbol).

The cell may be configured with a search space whose AL is L. The search space whose AL is L is a set including several PDCCH candidates, and a size of each PDCCH candidate is L control channel elements. A search space set (SS set) is a set including search spaces of different ALs. One search space set is associated with one control resource set (CORESET). One CORESET is defined in one cell, includes a group of consecutive or non-consecutive RBs in frequency domain, and includes one, two, or three consecutive OFDM symbols in time domain.

Figure 2:
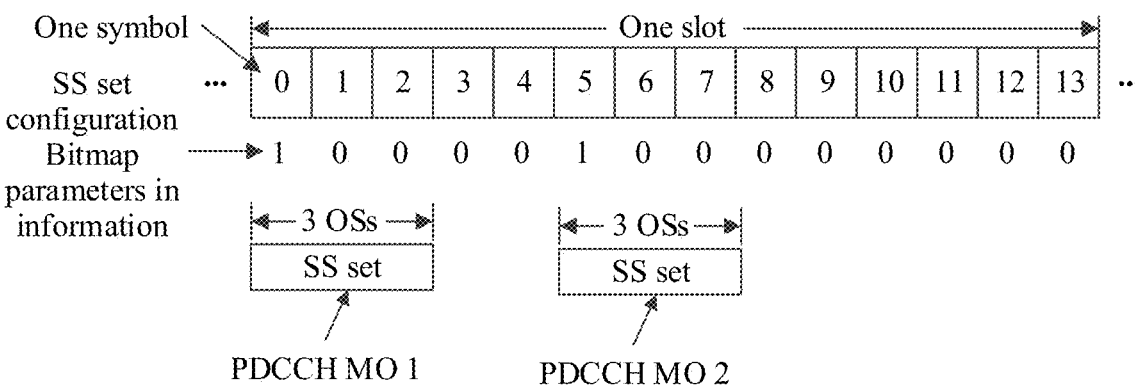
FIG. 2 is a schematic diagram of a method for determining a PDCCH monitoring occasion according to an embodiment of this application.

The PDCCH monitoring occasion (PDCCH MO) may also be briefly referred to as a monitoring occasion. A PDCCH monitoring occasion of an SS set in a slot is determined by using the SS set and configuration information of a CORESET associated with the SS set. For example, the configuration information of the SS set may include a 14-bit bitmap parameter (monitoringSymbolsWithinSlot). As shown in FIG. 2, each bit is in a one-to-one correspondence with one OFDM symbol in one slot, to indicate a start symbol on which the SS set is listened in one slot. For example, monitoringSymbolsWithinSlot=1000010000000 shown in FIG. 2 indicates that listening on the SS set needs to start from a first OFDM symbol and a fifth OFDM in one slot. It is assumed that the SS set is associated with a CORESET with a length of three consecutive OFDM symbols. PDCCH monitoring occasions of the SS set are a PDCCH MO 1 and a PDCCH MO 2 shown in FIG. 2.

4. Self-Scheduling and Cross-Carrier Scheduling

Self-scheduling means that data transmission in a cell is scheduled by a PDCCH in the cell. In other words, downlink control information (DCI) for scheduling data transmission in the cell is carried by the PDCCH in the cell. For example, as shown in FIG. 3, a PDCCH in a primary cell (PCell) is used to schedule a radio resource in the PCell to transmit data of the PCell; and a PDCCH in a secondary cell (SCell) is used to schedule a radio resource in the SCell to transmit data of the SCell.

Cross-carrier scheduling means that data transmission in a cell may be scheduled by a PDCCH in another cell. In other words, DCI for scheduling data transmission in the cell may be carried by a PDCCH in another cell. For example, as shown in FIG. 4, a PDCCH in a primary cell (PCell) is used to schedule a radio resource in a secondary cell (SCell) to transmit data of the SCell. A cell carrying a PDCCH, for example, a PCell, may be referred to as a scheduling cell or a scheduling cell; and a cell carrying data transmission, for example, an SCell, may be referred to as a scheduled cell or a scheduled cell.

Figure 5:
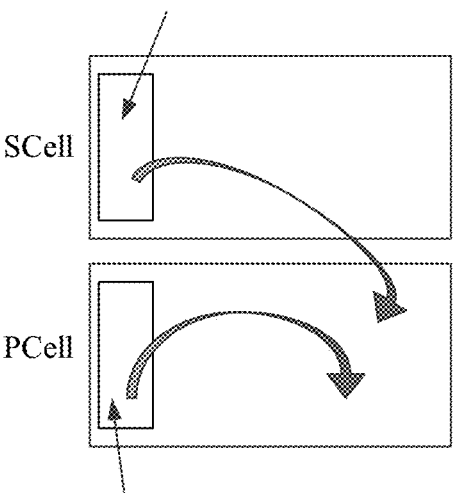
FIG. 5 is a schematic diagram in which a PCell and an SCell both can schedule the PCell according to an embodiment of this application.

When data transmission in a cell may be scheduled by a PDCCH of the cell, and may also be scheduled by a PDCCH of another cell, a plurality of scheduling cells may schedule a same scheduled cell. As shown in FIG. 5, data transmission in a PCell may be scheduled by a PDCCH in the PCell, and may also be scheduled by a PDCCH in an SCell. In this way, a terminal device needs to monitor a PDCCH candidate in each scheduling cell, to obtain DCI for scheduling data transmission in the scheduled cell.

5. Unit Time

In this application, different subcarrier spacings correspond to different duration of unit times. For example, different subcarrier spacings correspond to different duration of slots. Optionally, the unit time may be a span in addition to a slot.

One slot includes 14 consecutive OFDM symbols or 12 consecutive OFDM symbols. Different subcarrier spacings respectively correspond to different duration of OFDM symbols in the slot.

The span may also be referred to as a time unit, a sub-time unit, or the like, and is a group of consecutive OFDM symbols in a slot. Any PDCCH monitoring occasion supported by a terminal device is included in a span. A start symbol of a span is a start symbol of a PDCCH monitoring occasion, an end symbol of a span is an end symbol of a PDCCH monitoring occasion, and a maximum number of symbols of a span is Y. When a terminal device monitors a PDCCH candidate in a cell by using a combination (X, Y), a minimum value of an interval between start symbols of two consecutive spans in the cell is X symbols, and the two consecutive spans may be in a same slot or between slots.

Figure 6:
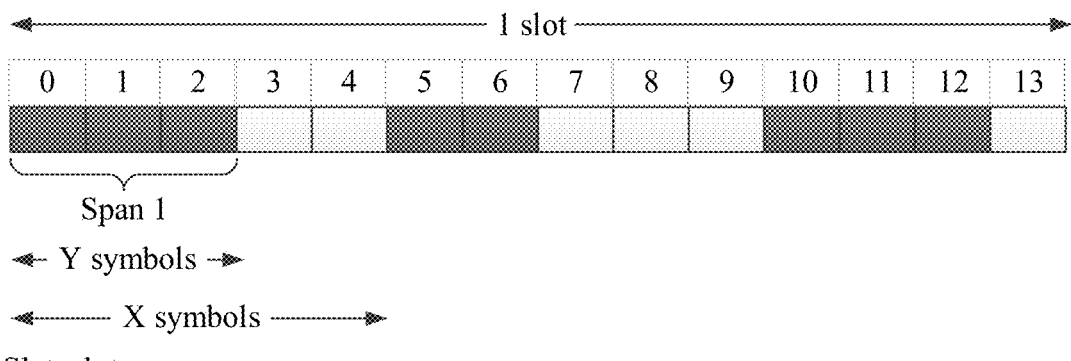
FIG. 6 is a schematic diagram of a span in a slot with a subcarrier spacing of $\mu$ according to an embodiment of this application.

For example, as shown in FIG. 6, in a slot with a subcarrier spacing of μ, the terminal device monitors the PDCCH candidate by using a combination (4, 3). A span in the slot may be shown in FIG. 6. A minimum value of an interval between start symbols of two consecutive spans is four symbols, and a maximum number of symbols of one span is 3. For example, a start symbol of a span 1 is a symbol 0, a start symbol of a span 2 is a symbol 5, and a start symbol of a span 3 is a symbol 10. An interval between the start symbol of the span 1 and the start symbol of the span 2 is four symbols, an interval between the start symbol of the span 2 and the start symbol of the span 3 is four symbols, and the intervals are not less than X (namely, 4). In addition, a number of symbols of the span 1 is 3, a number of symbols of the span 2 is 2, a number of symbols of the span 3 is 3, and each number does not exceed Y (namely, 3).

In this application, each unit time is determined based on a subcarrier spacing of an active downlink bandwidth part in each scheduling cell. That is, different values of unit times may be respectively determined based on different subcarrier spacings.

6. Monitoring Upper Limit and Preset Monitoring Upper Limit Per Unit Time

In this application, in one case, the monitoring upper limit is relative to a unit time and a single cell. For example, in a first unit time, the monitoring upper limit is a maximum number of to-be-monitored PDCCH candidates and a maximum number of non-overlapping CCEs in a first scheduling cell. For another example, in a second unit time, the monitoring upper limit is a maximum number of to-be-monitored PDCCH candidates and a maximum number of non-overlapping CCEs in a second scheduling cell.

Figure 7:
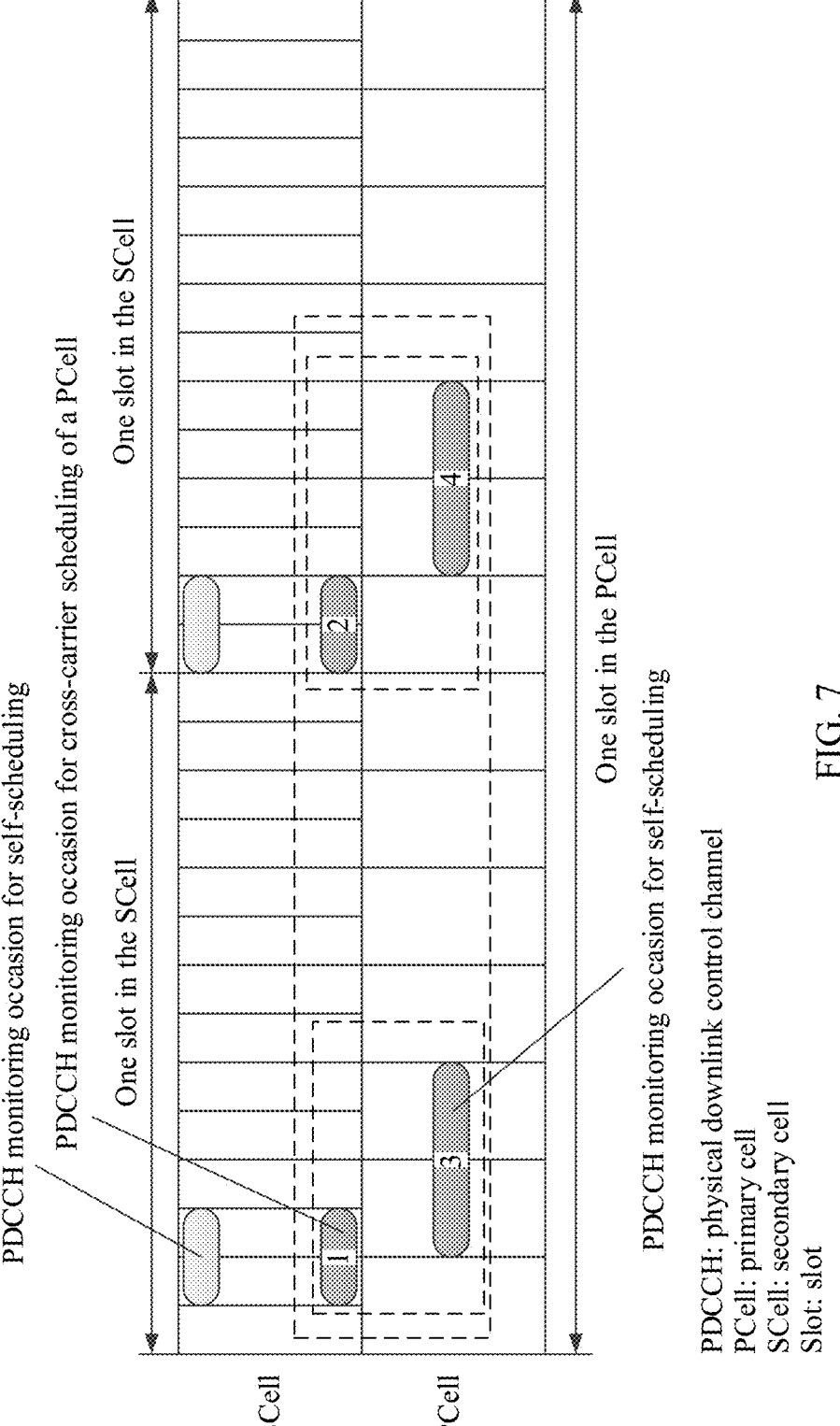
FIG. 7 is a schematic diagram of a PDCCH monitoring occasion on which a PCell and an SCell both can schedule the PCell according to an embodiment of this application.

For example, a PCell and an SCell both can schedule the PCell. As shown in FIG. 7, a subcarrier spacing of an active downlink bandwidth part in the PCell is less than a subcarrier spacing of an active downlink bandwidth part in the SCell. For example, the subcarrier spacing of the active downlink bandwidth part in the PCell is 15 kHz, and the subcarrier spacing of the active downlink bandwidth part in the SCell is 30 kHz. Therefore, a time length of a slot in the PCell is twice a time length of a slot in the SCell. In addition, as shown in FIG. 7, in one slot in the SCell, a PDCCH monitoring occasion for cross-carrier scheduling of the PCell is a radio resource 1, and in a next consecutive slot in the SCell, a PDCCH monitoring occasion for cross-carrier scheduling of the PCell is a radio resource 2; and in a slot in the PCell, a self-scheduling PDCCH monitoring occasion is a radio resource 3 and a radio resource 4.

In this case, in a slot in the PCell, a maximum number of to-be-monitored PDCCH candidates in the PCell is a maximum number of to-be-monitored PDCCH candidates in the radio resource 3 and the radio resource 4; and in the slot in the PCell, a maximum number of non-overlapping CCEs in the PCell is a maximum number of non-overlapping CCEs in the radio resource 3 and the radio resource 4.

In this case, in a slot in the SCell, a maximum number of to-be-monitored PDCCH candidates in the SCell is a maximum number of to-be-monitored PDCCH candidates in the radio resource 1 or the radio resource 2; and in the slot in the SCell, a maximum number of non-overlapping CCEs in the SCell is a maximum number of non-overlapping CCEs in the radio resource 1 or the radio resource 2.

In another case, the monitoring upper limit is relative to a unit time and a plurality of cells. For example, in a first unit time, the monitoring upper limit is a maximum total number of all to-be-monitored PDCCH candidates and a maximum total number of all non-overlapping CCEs in a first scheduling cell and a second scheduling cell. For another example, in a second unit time, the monitoring upper limit is a maximum total number of all to-be-monitored PDCCH candidates and a maximum total number of all non-overlapping CCEs in the first scheduling cell and the second scheduling cell.

For example, as shown in FIG. 7, in a slot in an SCell, a maximum total number of to-be-monitored PDCCH candidates in the SCell and a PCell is a maximum total number of to-be-monitored PDCCH candidates in a radio resource 1 and a radio resource 3; and a maximum total number of non-overlapping CCEs in the SCell and the PCell is a maximum total number of non-overlapping CCEs in the radio resource 1 and the radio resource 3.

In a slot in a PCell, a maximum total number of to-be-monitored PDCCH candidates in the SCell and the PCell is a maximum total number of to-be-monitored PDCCH candidates in the radio resource 1, the radio resource 2, the radio resource 3, and the radio resource 4; and a maximum total number of non-overlapping CCEs in the SCell and the PCell is a maximum total number of non-overlapping CCEs in the radio resource 1, the radio resource 2, the radio resource 3, and the radio resource 4.

For ease of description, regardless of a single cell or a plurality of cells, a maximum number of to-be-monitored PDCCH candidates is briefly referred to as a first upper limit, and a maximum number of non-overlapping CCEs is briefly referred to as a second upper limit. In addition, in each unit time, a monitoring upper limit corresponding to a cell or a plurality of cells is that each unit time in the unit time needs to meet the monitoring upper limit. For example, as shown in FIG. 5, a monitoring upper limit per span needs to meet a monitoring upper limit in this span, for example, the first upper limit and the second upper limit. As shown in FIG. 7, in a slot with a subcarrier spacing of 15 kHz, a monitoring upper limit per slot in the SCell needs to meet a monitoring upper limit in the SCell in the slot, for example, the first upper limit and the second upper limit.

The preset monitoring upper limit per unit time may also be referred to as a preset monitoring upper limit per unit time in a single cell, and includes a preset maximum number of to-be-monitored PDCCH candidates and a preset maximum number of non-overlapping CCEs per unit time in the single cell. Similarly, for ease of description, the preset maximum number of to-be-monitored PDCCH candidates is briefly referred to as a first preset upper limit, and the preset maximum number of non-overlapping CCEs is briefly referred to as a second preset upper limit.

In an optional implementation, the preset monitoring upper limit per unit time in the single cell, such as the first preset upper limit or the second preset upper limit, may be obtained through query in a table.

For example, a subcarrier spacing of an active downlink bandwidth part in a cell is μ. In a slot with a subcarrier spacing of μ, a first preset upper limit corresponding to the cell may be represented as $$M_{PDCCH}^{max,slot,\mu},$$

and a second preset upper limit corresponding to the cell may be represented as $$C_{PDCCH}^{max,slot,\mu}.$$

In this case, Table 1 shows values of $$M_{PDCCH}^{max,slot,\mu}$$

obtained when the subcarrier spacing μ separately corresponds to indexes 0, 1, 2, and 3. Table 2 shows values of $$C_{PDCCH}^{max,slot,\mu}$$

obtained when the subcarrier spacing μ separately corresponds to indexes 0, 1, 2, and 3. As shown in FIG. 7, in each slot with a subcarrier spacing of 15 kHz, a first preset upper limit corresponding to the SCell is 44 and a second preset upper limit is 56.

TABLE 1

| Maximum number $M_{PDCCH}^{max, slot, \mu}$ of monitored PDCCH candidates per slot in a single cell in which a subcarrier spacing μ of an active downlink bandwidth part belongs to {0, 1, 2, 3} | |
| --- | --- |
| μ | $M_{PDCCH}^{max, slot, \mu}$ per slot corresponding to each cell |
| 0 | 44 |
| 1 | 36 |
| 2 | 22 |
| 3 | 20 |

TABLE 2

| Maximum number $C_{PDCCH}^{max, slot, \mu}$ of non-overlapping CCEs per slot in a single cell in which a subcarrier spacing μ of an active downlink bandwidth part belongs to {0, 1, 2, 3} | |
| --- | --- |
| μ | $C_{PDCCH}^{max, slot, \mu}$ per slot corresponding to each cell |
| 0 | 56 |
| 1 | 56 |
| 2 | 48 |
| 3 | 32 |

For example, a subcarrier spacing of an active downlink bandwidth part in a cell is μ. In each span for a combination (X, Y) in a slot with a subcarrier spacing of μ, a first preset upper limit corresponding to the cell may be represented as $$M_{PDCCH}^{max,(X,Y),\mu},$$

and a second preset upper limit corresponding to the cell may be represented as $$C_{PDCCH}^{max,(X,Y),\mu}.$$

In this case, PDCCH Table 1 shows values of $$M_{PDCCH}^{max,(X,Y),\mu}$$

obtained when the subcarrier spacing μ separately corresponds to indexes 0, 1, 2, and 3 and a combination (2, 2), a combination (4, 3), or a combination (7, 3). Table 2 shows values of $$C_{PDCCH}^{max,(X,Y),\mu}$$

obtained when the subcarrier spacing PDCCH μ separately corresponds to indexes 0, 1, 2, and 3 and a combination (2, 2), a combination (4, 3), or a combination (7, 3).

TABLE 3

| Maximum number $M_{PDCCH}^{max, (X, Y), \mu}$ of monitored PDCCH candidates per span for a combination (X, Y) in a single cell in which a subcarrier spacing μ of an active downlink bandwidth part belongs to {0, 1, 2, 3} | | | |
| --- | --- | --- | --- |
| $M_{PDCCH}^{max, (X, Y), \mu}$ per span corresponding to each cell | | | |
| μ | (2, 2) | (4, 3) | (7, 3) |
| 0 | 14 | 28 | 44 |
| 1 | 12 | 24 | 36 |

TABLE 4

| Maximum number $C_{PDCCH}^{max, (X, Y), \mu}$ of non-overlapping CCEs per span for a combination (X, Y) in a single cell in which a subcarrier spacing μ of an active downlink bandwidth part belongs to {0, 1, 2, 3} | | | |
| --- | --- | --- | --- |
| $C_{PDCCH}^{max, (X, Y), \mu}$ per span corresponding to each cell | | | |
| μ | (2, 2) | (4, 3) | (7, 3) |
| 0 | 18 | 36 | 56 |
| 1 | 18 | 36 | 56 |

In addition, for ease of description, the preset monitoring upper limit per unit time may be referred to as a preset monitoring upper limit per unit time corresponding to a cell, namely a preset monitoring upper limit per unit time corresponding to a subcarrier spacing of an active downlink bandwidth part in the cell.

For ease of description, a unit time corresponding to a cell or a scheduling cell in this application is a unit time corresponding to a subcarrier spacing of an active downlink bandwidth part in the cell or the scheduling cell. A preset monitoring upper limit per unit time corresponding to a cell or a scheduling cell is a first preset upper limit and/or a second preset upper limit in a unit time corresponding to the cell or the scheduling cell.

In an optional implementation, when a cell is such configured that a monitoring upper limit is determined at a granularity of a slot, for example, when the cell is not configured with an r16 monitoring capability, when the cell is not configured with a monitoring capability configuration-r16 that is equal to an r16 monitoring capability, when the cell is not configured with a monitoring capability configuration-r16, when the cell is configured with a monitoring capability configuration-r16 that is equal to an r15 monitoring capability, or when the cell is configured with an r15 monitoring capability, a preset monitoring upper limit per unit time corresponding to the cell may be determined based on Table 1 and Table 2.

In another optional implementation, when a cell is such configured that a monitoring upper limit is determined at a granularity of a span, for example, when the cell is configured with an r16 monitoring capability, or when the cell is configured with a monitoring capability configuration-r16 that is equal to an r16 monitoring capability, a preset monitoring upper limit per unit time corresponding to the cell may be determined based on Table 3 and Table 4.

The following describes related embodiments provided in this application with reference to the accompanying drawings.

This application provides a downlink control information transmission method 100. In a scenario in which a plurality of scheduling cells schedule a same scheduled cell, a terminal device or a network device may determine a monitoring upper limit in each unit time. Each unit time is determined based on a subcarrier spacing of an active downlink bandwidth part in each scheduling cell. This application is applicable to a scenario in which subcarrier spacings of active downlink bandwidth parts in a plurality of scheduling cells are different.

This application provides a downlink control information transmission method 200. In a scenario in which a plurality of scheduling cells schedule a same scheduled cell, a terminal device or a network device may determine a monitoring upper limit in a same unit time. The same unit time is determined based on a subcarrier spacing of an active downlink bandwidth part in one of the scheduling cells. This application is applicable to a scenario in which subcarrier spacings of active downlink bandwidth parts in a plurality of scheduling cells are the same.

This application provides a downlink control information transmission method 300. In a scenario in which a plurality of scheduling cells schedule a same scheduled cell, first configuration information sent by a network device may meet one or more of the following features: The plurality of scheduling cells all are such configured that a monitoring upper limit is determined at a granularity of a slot; the plurality of scheduling cells all are such configured that a monitoring upper limit is determined at a granularity of a span; numbers of control resource set pools CORESETPools that are respectively configured for the plurality of scheduling cells are the same and the numbers of the respectively configured CORESETPools are 1; numbers of control resource set pools CORESETPools that are respectively configured for the plurality of scheduling cells are the same and the numbers of the respectively configured CORESET-Pools are 2; some of the plurality of scheduling cells each are configured with a control resource set pool CORESET- Pool, and the other scheduling cells are not configured with a CORESETPool; or the plurality of scheduling cells all are such configured that a monitoring upper limit is determined at a granularity of a span, and monitoring is performed in the plurality of scheduling cells by using the combination (X, Y). In addition, there is a symbol group, in a scheduling cell with a small subcarrier spacing, whose start location overlaps a start location of any symbol group in a scheduling cell with a large subcarrier spacing, and every X symbols constitute a symbol group. In the method, correspondingly, the terminal device does not expect that the first configuration information does not meet the one or more of features, that is, the terminal device expects that the first configuration information meets the one or more of features. According to the downlink control information transmission method 300, determining of a monitoring upper limit in a unit time can be simplified. Optionally, the downlink control information transmission method 300 may be combined with the downlink control information transmission method 100 or the downlink control information transmission method 200 in this application, to simplify determining of a monitoring upper limit in a unit time.

This application provides a downlink control information transmission method 400. For a plurality of scheduled cells, a monitoring upper limit of all PDCCH candidates in a plurality of scheduling cells in a unit time with a subcarrier spacing of µ is determined. The plurality of scheduling cells are all scheduling cells in which a subcarrier spacing of an active downlink bandwidth part is µ, and the plurality of scheduled cells are all scheduled cells that are respectively scheduled by the plurality of scheduling cells. For the plurality of scheduled cells, the monitoring upper limit is determined based on a preset monitoring upper limit per unit time corresponding to the scheduling cell in which the subcarrier spacing is µ. It can be learned that the downlink control information transmission method 400 may be combined with any one of the downlink control information transmission method 100, the downlink control information transmission method 200, and the downlink control information transmission method 300, to determine a monitoring upper limit of a plurality of scheduled cells in addition of determining a monitoring upper limit of one scheduled cell.

Embodiment 1: Downlink control information transmission method 100.

Figure 8:
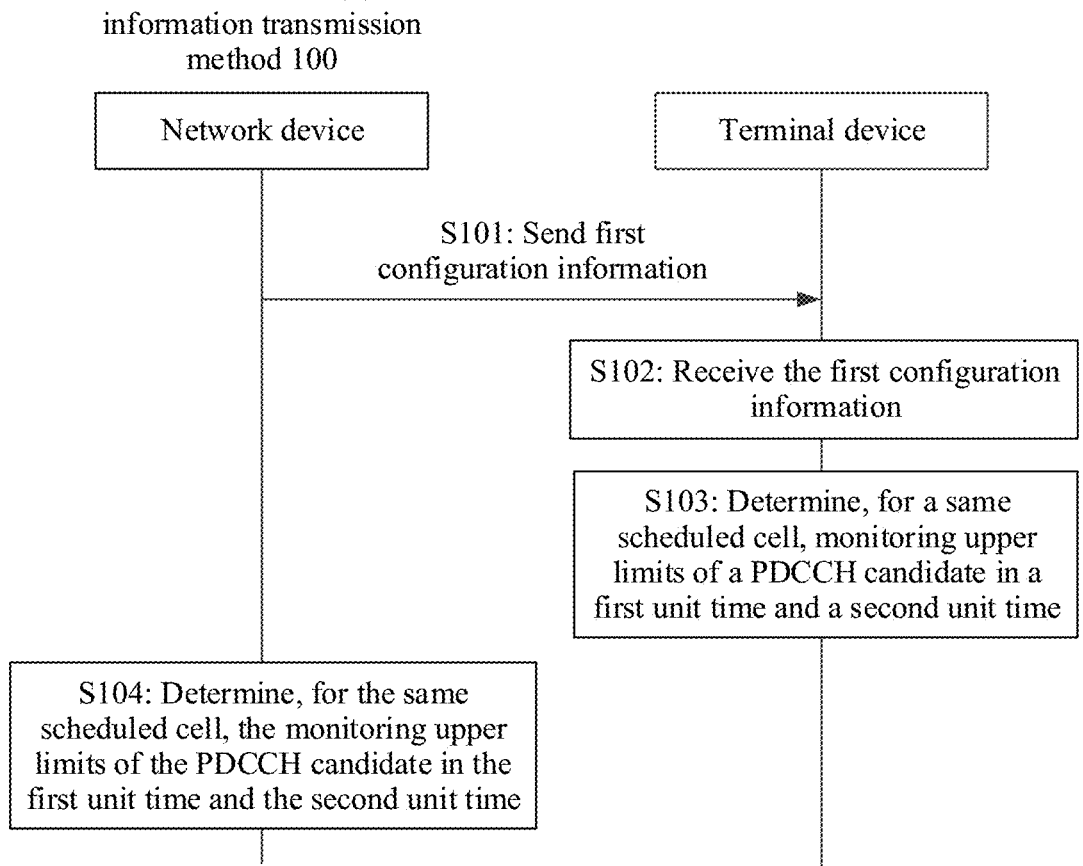
FIG. 8 is a schematic flowchart of a downlink control information transmission method 100 according to an embodiment of this application.

FIG. 8 is a schematic flowchart of a downlink control information transmission method 100 according to an embodiment of this application. The downlink control information transmission method 100 is described by using an example in which a first scheduling cell and a second scheduling cell schedule a same scheduled cell. Optionally, the downlink control information transmission method 100 is also applicable to a scenario in which a plurality of scheduling cells schedule a same scheduled cell. There is a same inventive concept, and details are not described in this application.

As shown in FIG. 8, the downlink control information transmission method 100 may include but is not limited to the following steps.

S101: A network device sends first configuration information.

S102: A terminal device receives the first configuration information.

The first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell. It can be learned that the terminal device needs to monitor both the PDCCH candidate in the first scheduling cell and the PDCCH candidate in the second scheduling cell.

In an optional implementation, in the first configuration information configured by the network device for the terminal device, an identifier of a search space of the first scheduling cell is the same as an identifier of search space of the second scheduling cell. In this way, the terminal device may learn that the physical downlink control channel PDCCH candidate needs to be monitored in both the first scheduling cell and the second scheduling cell, to obtain DCI for scheduling data transmission in the same scheduled cell.

S103: The terminal device determines, for the same scheduled cell, monitoring upper limits of the PDCCH candidate in a first unit time and a second unit time.

S104: The network device also determines, for the same scheduled cell, monitoring upper limits of the PDCCH candidate in the first unit time and the second unit time.

The first unit time is determined based on a subcarrier spacing of an active downlink bandwidth part in the first scheduling cell, and the second unit time is determined based on a subcarrier spacing of an active downlink bandwidth part in the second scheduling cell. The monitoring upper limits of the PDCCH candidate in the first unit time and the second unit time may include: monitoring upper limits of the PDCCH candidate in a single scheduling cell in the first unit time and the second unit time; and/or further include monitoring upper limits of total PDCCH candidates in the two scheduling cells in the first unit time and the second unit time. Therefore, in the steps S103 and S104, the PDCCH candidate may be a PDCCH candidate in a single scheduling cell, and/or total PDCCH candidates in the two scheduling cells.

Optionally, the monitoring upper limits of the PDCCH candidate in the first unit time and the second unit time may also be referred to as actual monitoring upper limits of the terminal device.

In an optional implementation, the network device may first determine the first configuration information, perform the step S104 of determining an actual monitoring upper limit of the terminal device, and then perform the step 101 of sending the first configuration information to the terminal device, and the terminal device performs the steps S102 and S103. In another optional implementation, the network device may also jointly determine the first configuration information and an actual monitoring upper limit of the terminal device, and then perform the step 101 of sending the first configuration information to the terminal device, and the terminal device performs the steps S102 and S103.

In an optional implementation, the downlink control information transmission method 100 may further include: The network device sends a PDCCH-related configuration to the terminal device, and then sends a PDCCH in each scheduling cell, so that the terminal device monitors the PDCCH candidate based on the PDCCH-related configuration and an actual monitoring upper limit, to obtain the PDCCH. Optionally, a sequence in which the network device sends the PDCCH-related configuration and the terminal device performs the step S103 may not be limited in this embodiment of this application. The PDCCH-related configuration includes a CORESET configuration, an SS configuration, and the like. UE determines information including a PDCCH candidate location and the like based on the PDCCH-related configuration, and performs PDCCH candidate monitoring.

It can be learned that, in the downlink control information transmission method 100 shown in FIG. 8, monitoring upper limits of the PDCCH candidate in two unit times are determined, to be specific, the subcarrier spacings respectively corresponding to the first scheduling cell and the second scheduling cell are considered, and this resolves a problem of how to determine the monitoring upper limit in a scenario in which the two scheduling cells schedule the same scheduled cell.

In addition, the downlink control information transmission method in this aspect is applicable to a scenario in which subcarrier spacings are different. For example, the subcarrier spacing corresponding to the first scheduling cell is different from the subcarrier spacing corresponding to the second scheduling cell. In the method, the monitoring upper limits in two unit times are determined. This can avoid a problem that only the monitoring upper limit in one unit time is determined and the monitoring upper limit in the other unit time is excessively large.

For example, as shown in FIG. 7, the subcarrier spacing of the SCell is 30 kHz, and the subcarrier spacing of the PCell is 15 kHz. A monitoring upper limit of a PDCCH candidate in a 30 kHz slot is 36, and a monitoring upper limit of a PDCCH candidate in a 15 kHz slot is 44. It is assumed that one of the subcarrier spacings is used as a reference subcarrier spacing, and a monitoring upper limit of the PDCCH candidate in a unit time with the reference subcarrier spacing is determined through query in a table.

For example, when the 30 kHz subcarrier spacing of the SCell is used as a reference subcarrier spacing, in the 30 kHz slot, a monitoring upper limit of PDCCH candidates in the PCell and the SCell is 36, in other words, a monitoring upper limit of a PDCCH candidate in a radio resource 1 and a radio resource 3 is 36, and a monitoring upper limit of a PDCCH candidate in a radio resource 2 and a radio resource 4 is also 36.

It is assumed that the radio resource 1 and the radio resource 2 in the SCell each are not configured with a PDCCH candidate. A monitoring upper limit of a PDCCH candidate that needs to be configured for the radio resource 3 in the PCell is 36, and a monitoring upper limit of a PDCCH candidate that needs to be configured for the radio resource 4 is 36, to meet that the monitoring upper limit of a PDCCH candidate in the PCell and the SCell is 36 in the 30 kHz slot. A monitoring upper limit of a PDCCH candidate in the PCell in the 15 kHz slot is 36+36, namely, 72. However, the monitoring upper limit of the PDCCH candidate in the 15 kHz slot is 44. It can be learned that, when a monitoring upper limit in the 30 kHz slot is used as the monitoring upper limit of the PDCCH candidate corresponding to the PCell and the SCell, in some cases, it may cause a problem that the monitoring upper limit of the PDCCH candidate corresponding to the PCell exceeds the monitoring upper limit in the 15 kHz slot.

For another example, when the 15 kHz subcarrier spacing of the PCell is used as the reference subcarrier spacing, in a 15 kHz slot, a monitoring upper limit of a PDCCH candidate corresponding to the PCell and the SCell is 44, in other words, a monitoring upper limit of total PDCCH candidates in a radio resource 1, a radio resource 2, a radio resource 3, and a radio resource 4 is 44.

It is assumed that the radio resource 1, the radio resource 2, and the radio resource 4 each are not configured with a PDCCH candidate. A monitoring upper limit of a PDCCH candidate that needs to be configured for the radio resource 3 is 44, to meet that the monitoring upper limit of the PDCCH candidate corresponding to the PCell and the SCell is 44 in the 15 kHz slot. A monitoring upper limit of a PDCCH candidate in the SCell in the 30 kHz slot is 44. However, the monitoring upper limit of the PDCCH candidate in the 30 kHz slot is 36. It can be learned that, when a monitoring upper limit in the 15 kHz slot is used as the monitoring upper limit of the PDCCH candidate corresponding to the PCell and the SCell, in some cases, it may cause a problem that the monitoring upper limit of the PDCCH candidate corresponding to the SCell exceeds the monitoring upper limit in the 30 kHz slot.

Refer to FIG. 7. A monitoring upper limit of a PDCCH candidate in a 15 kHz slot and a 30 kHz slot is determined according to the method in this embodiment of this application. The monitoring upper limit of the PDCCH candidate may include the following three manners: a manner is a monitoring upper limit of a PDCCH candidate corresponding to the PCell and the SCell in a 15 kHz slot, and a monitoring upper limit of a PDCCH candidate corresponding to the PCell and the SCell in a 30 kHz slot; another manner is a monitoring upper limit of a PDCCH candidate corresponding to the PCell in a 15 kHz slot, and a monitoring upper limit of a PDCCH candidate corresponding to the SCell in a 30 kHz slot; and still another manner is a monitoring upper limit of a PDCCH candidate corresponding to the PCell in a 15 kHz slot, a monitoring upper limit of a PDCCH candidate corresponding to the SCell in a 30 kHz slot, a monitoring upper limit of a PDCCH candidate corresponding to the PCell and the SCell in a 15 kHz slot, and a monitoring upper limit of a PDCCH candidate corresponding to the PCell and the SCell in a 30 kHz slot. It can be learned that two unit times are considered in the monitoring upper limits of the PDCCH candidate in the three manners. This avoids a problem that only a monitoring upper limit in one unit time is determined and an actual monitoring upper limit corresponding to a cell is greater than a preset monitoring upper limit per unit time in the corresponding unit time.

The following describes some optional implementations of Embodiment 1.

In an optional implementation, the monitoring upper limit in the first unit time is determined based on a preset monitoring upper limit per unit time corresponding to the first scheduling cell, and the monitoring upper limit in the second unit time is determined based on a preset monitoring upper limit per unit time corresponding to the second scheduling cell. It can be learned that the actual monitoring upper limit of the terminal device is related to the first configuration information and the preset monitoring upper limit per unit time.

As described above, a preset monitoring upper limit per unit time corresponding to each cell may be obtained through query in a table based on a subcarrier spacing of an active downlink bandwidth part in the cell. Optionally, when the first scheduling cell and the second scheduling cell both are such configured that a monitoring upper limit is determined at a granularity of a slot, a preset monitoring upper limit per unit time corresponding to each scheduling cell may be determined based on Table 1 and Table 2. Optionally, when the first scheduling cell and the second scheduling cell both are such configured that a monitoring upper limit is determined at a granularity of a span, a preset monitoring upper limit per unit time corresponding to each scheduling cell may be determined based on Table 3 and Table 4.

Optionally, in this implementation, a monitoring upper limit in each unit time may alternatively be determined in different manners based on a number of control resource set pools CORESETPools that are configured for the first scheduling cell and the second scheduling cell. An implementation 1.1 and an implementation 1.2 are separately used for description below.

Implementation 1.1: The monitoring upper limit in each unit time is determined based on a preset monitoring upper limit per unit time in a scheduling cell corresponding to the unit time.

In the implementation 1.1, the description is provided by using an example in which the monitoring upper limit includes a first upper limit and/or a second upper limit, and the preset monitoring upper limit per unit time correspondingly includes a first preset upper limit and/or a second preset upper limit.

When the first scheduling cell and the second scheduling cell each are not configured with a control resource set pool CORESETPool, or each are configured with a CORESET-Pool, when the first scheduling cell is configured with a CORESETPool, and the second scheduling cell is not configured with a CORESETPool, when the first scheduling cell is not configured with a CORESETPool, and the second scheduling cell is configured with a CORESETPool, or when the first scheduling cell and the second scheduling cell each are configured with two CORESETPools, for control resource sets corresponding to a same CORESETPool, the monitoring upper limit in the first unit time may include one or more of the following:

a first upper limit corresponding to the first scheduling cell and the second scheduling cell, where the first upper limit corresponding to the first scheduling cell and the second scheduling cell is determined based on a first preset upper limit corresponding to the first scheduling cell;

a second upper limit corresponding to the first scheduling cell and the second scheduling cell, where the second upper limit corresponding to the first scheduling cell and the second scheduling cell is determined based on a second preset upper limit corresponding to the first scheduling cell;

a first upper limit corresponding to the first scheduling cell, where the first upper limit corresponding to the first scheduling cell is determined based on the first preset upper limit corresponding to the first scheduling cell; and a second upper limit corresponding to the first scheduling cell, where the second upper limit corresponding to the first scheduling cell is determined based on the second preset upper limit corresponding to the first scheduling cell; and the monitoring upper limit in the second unit time may include one or more of the following:

a first upper limit corresponding to the first scheduling cell and the second scheduling cell, where the first upper limit is determined based on a first preset upper limit corresponding to the second scheduling cell;

a second upper limit corresponding to the first scheduling cell and the second scheduling cell, where the second upper limit is determined based on a second preset upper limit corresponding to the second scheduling cell;

a first upper limit corresponding to the second scheduling cell, where the first upper limit is determined based on the first preset upper limit corresponding to the second scheduling cell; and a second upper limit corresponding to the second scheduling cell, where the second upper limit is determined based on the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORE-SETPool, or when the PCell and the SCell each are config- ured with two CORESETPools, for control resource sets corresponding to a same CORESETPool, a monitoring upper limit in a 15 kHz slot may include one or more of the following:

a first upper limit corresponding to the PCell and the SCell, where first upper limit corresponding to the PCell and the SCell is determined based on a first preset upper limit, namely, 44, in the 15 kHz slot in Table 1;

a second upper limit corresponding to the PCell and the SCell, where the second upper limit corresponding to the PCell and the SCell is determined based on a second preset upper limit, namely, 56, in the 15 kHz slot in Table 2;

a first upper limit corresponding to the PCell, where the first upper limit corresponding to the PCell is deter- mined based on the first preset upper limit, namely, 44, in the 15 kHz slot in Table 1; and a second upper limit corresponding to the PCell, where the second upper limit corresponding to the PCell is determined based on the second preset upper limit, namely, 56, in the 15 kHz slot in Table 2; and a monitoring upper limit in a 30 kHz slot may include one or more of the following:

a first upper limit corresponding to the PCell and the SCell, where the first upper limit is determined based on a first preset upper limit, namely, 36, in the 30 kHz slot in Table 1;

a second upper limit corresponding to the PCell and the SCell, where the second upper limit is determined based on a second preset upper limit, namely, 56, in the 30 kHz slot in Table 2;

a first upper limit corresponding to the SCell, where the first upper limit is determined based on the first preset upper limit, namely, 36, in the 30 kHz slot in Table 1; and a second upper limit corresponding to the SCell, where the second upper limit is determined based on the second preset upper limit, namely, 56, in the 30 kHz slot in Table 2.

It can be learned that, in this implementation, the moni- toring upper limit in the 15 kHz slot and the monitoring upper limit in the 30 kHz slot may be determined based on Table 1 and Table 2 as the actual monitoring upper limit of the terminal device.

For another example, in the scenario shown in FIG. 7, the PCell and the SCell both are such configured that a moni- toring upper limit is determined at a granularity of a span, and the span meets a combination (X, Y). When the PCell and the SCell each are not configured with a control resource set pool CORESETPool, or each are configured with a CORESETPool, when the PCell is configured with a CORE-SETPool, and the SCell is not configured with a CORE-SETPool, when the PCell is not configured with a CORE-SETPool, and the SCell is configured with a CORESETPool, or when the PCell and the SCell each are configured with two CORESETPools, for control resource sets corresponding to a same CORESETPool, a monitoring upper limit in a 15 kHz span for a combi- nation (X, Y) may include one or more of the follow- ing:

a first upper limit corresponding to the PCell and the SCell, where the first upper limit corresponding to the PCell and the SCell is determined based on a first preset upper limit in the 15 kHz span for the combination (X, Y) in Table 3;

a second upper limit corresponding to the PCell and the SCell, where the second upper limit corresponding to the PCell and the SCell is determined based on a second preset upper limit in the 15 kHz span for the combi- nation (X, Y) in Table 4;

a first upper limit corresponding to the PCell, where the first upper limit corresponding to the PCell is deter- mined based on the first preset upper limit in the 15 kHz span for the combination (X, Y) in Table 3; and a second upper limit corresponding to the PCell, where the second upper limit corresponding to the PCell is determined based on the second preset upper limit in the 15 kHz span for the combination (X, Y) in Table 4; and a monitoring upper limit in a 30 kHz span for a combi- nation (X, Y) may include one or more of the follow- ing:

a first upper limit corresponding to the PCell and the SCell, where the first upper limit is determined based on a first preset upper limit in the 30 kHz span for the combination (X, Y) in Table 3;

a second upper limit corresponding to the PCell and the SCell, where the second upper limit is determined based on a second preset upper limit in the 30 kHz span for the combination (X, Y) in Table 4;

a first upper limit corresponding to the SCell, where the first upper limit is determined based on the first preset upper limit in the 30 kHz span for the combination (X, Y) in Table 3; and a second upper limit corresponding to the SCell, where the second upper limit is determined based on the second preset upper limit in the 30 kHz span for the combination (X, Y) in Table 4.

It can be learned that, in this implementation, the moni- toring upper limit in the 15 kHz slot and the monitoring upper limit in the 30 kHz slot may be determined based on Table 1 and Table 2 as the actual monitoring upper limit of the terminal device. Alternatively, in this implementation, the monitoring upper limit in the 15 kHz span for the combination (X, Y) and the monitoring upper limit in the 30 kHz span for the combination (X, Y) may be determined based on Table 3 and Table 4 as the actual monitoring upper limit of the terminal device.

Implementation 1.2: The monitoring upper limit in each unit time is determined based on a third parameter and a preset monitoring upper limit per unit time in a scheduling cell corresponding to the unit time. The third parameter is used to determine a number of cells corresponding to a scheduled cell scheduled by the scheduling cell configured with the two CORESETPools.

Similarly, in the implementation 1.2, the description is provided by using an example in which the monitoring upper limit includes a first upper limit and/or a second upper limit, and the preset monitoring upper limit per unit time correspondingly includes a first preset upper limit and/or a second preset upper limit.

When the first scheduling cell and the second scheduling cell each are configured with two control resource set pools CORESETPools, the monitoring upper limit in the first unit time may include one or more of the following:

a first upper limit corresponding to the first scheduling cell and the second scheduling cell, where the first upper limit corresponding to the first scheduling cell and the second scheduling cell is determined based on the third parameter and a first preset upper limit corresponding to the first scheduling cell;

a second upper limit corresponding to the first scheduling cell and the second scheduling cell, where the second upper limit corresponding to the first scheduling cell and the second scheduling cell is determined based on the third parameter and a second preset upper limit corresponding to the first scheduling cell;

a first upper limit corresponding to the first scheduling cell, where the first upper limit corresponding to the first scheduling cell is determined based on the third parameter and the first preset upper limit corresponding to the first scheduling cell; and a second upper limit corresponding to the first scheduling cell, where the second upper limit corresponding to the first scheduling cell is determined based on the third parameter and the second preset upper limit corresponding to the first scheduling cell; and the monitoring upper limit in the second unit time may include one or more of the following:

a first upper limit corresponding to the first scheduling cell and the second scheduling cell, where the first upper limit is determined based on the third parameter and a first preset upper limit corresponding to the second scheduling cell;

a second upper limit corresponding to the first scheduling cell and the second scheduling cell, where the second upper limit is determined based on the third parameter and a second preset upper limit corresponding to the second scheduling cell;

a first upper limit corresponding to the second scheduling cell, where the first upper limit is determined based on the third parameter and the first preset upper limit corresponding to the second scheduling cell; and a second upper limit corresponding to the second scheduling cell, where the second upper limit is determined based on the third parameter and the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are configured with two control resource set pools CORESETPools, it is assumed that the third parameter is $\gamma$. In this case, a monitoring upper limit in a 15 kHz slot may include one or more of the following:

a first upper limit corresponding to the PCell and the SCell, where first upper limit corresponding to the PCell and the SCell is determined based on $\gamma$ and a first preset upper limit (namely, 44) in the 15 kHz slot in Table 1;

a second upper limit corresponding to the PCell and the SCell, where the second upper limit corresponding to the PCell and the SCell is determined based on $\gamma$ and a second preset upper limit (namely, 56) in the 15 kHz slot in Table 2;

a first upper limit corresponding to the PCell, where the first upper limit corresponding to the PCell is determined based on $\gamma$ and the first preset upper limit (namely, 44) in the 15 kHz slot in Table 1; and a second upper limit corresponding to the PCell, where the second upper limit corresponding to the PCell is determined based on $\gamma$ and the second preset upper limit (namely, 56) in the 15 kHz slot in Table 2; and a monitoring upper limit in a 30 kHz slot may include one or more of the following:

a first upper limit corresponding to the PCell and the SCell, where the first upper limit is determined based on $\gamma$ and a first preset upper limit (namely, 36) in the 30 kHz slot in Table 1;

a second upper limit corresponding to the PCell and the SCell, where the second upper limit is determined based on $\gamma$ and a second preset upper limit (namely, 56) in the 30 kHz slot in Table 2;

a first upper limit corresponding to the SCell, where the first upper limit is determined based on $\gamma$ and the first preset upper limit (namely, 36) in the 30 kHz slot in Table 1; and a second upper limit corresponding to the SCell, where the second upper limit is determined based on $\gamma$ and the second preset upper limit (namely, 56) in the 30 kHz slot in Table 2.

It can be learned that, in this implementation, the monitoring upper limit in the 15 kHz slot and the monitoring upper limit in the 30 kHz slot may be determined based on $\gamma$, Table 1, and Table 2 as the actual monitoring upper limit of the terminal device.

For another example, in the scenario shown in FIG. 7, the PCell and the SCell both are such configured that a monitoring upper limit is determined at a granularity of a span, and the span meets a combination (X, Y). When the PCell and the SCell each are configured with two control resource set pools CORESETPools, it is assumed that the third parameter is 7. In this case, a monitoring upper limit in a 15 kHz span for a combination (X, Y) may include one or more of the following:

a first upper limit corresponding to the PCell and the SCell, where the first upper limit corresponding to the PCell and the SCell is determined based on $\gamma$ and a first preset upper limit in the 15 kHz span for the combination (X, Y) in Table 3;

a second upper limit corresponding to the PCell and the SCell, where the second upper limit corresponding to the PCell and the SCell is determined based on $\gamma$ and a second preset upper limit in the 15 kHz span for the combination (X, Y) in Table 4;

a first upper limit corresponding to the PCell, where the first upper limit corresponding to the PCell is determined based on $\gamma$ and the first preset upper limit in the 15 kHz span for the combination (X, Y) in Table 3; and a second upper limit corresponding to the PCell, where the second upper limit corresponding to the PCell is determined based on $\gamma$ and the second preset upper limit in the 15 kHz span for the combination (X, Y) in Table 4; and a monitoring upper limit in a 30 kHz span for a combination (X, Y) may include one or more of the following:

a first upper limit corresponding to the PCell and the SCell, where the first upper limit is determined based on $\gamma$ and a first preset upper limit in the 30 kHz span for the combination (X, Y) in Table 3;

a second upper limit corresponding to the PCell and the SCell, where the second upper limit is determined based on $\gamma$ and a second preset upper limit in the 30 kHz span for the combination (X, Y) in Table 4;

a first upper limit corresponding to the SCell, where the first upper limit is determined based on γ and the first preset upper limit in the 30 kHz span for the combination (X, Y) in Table 3; and a first upper limit corresponding to the SCell, where the first upper limit is determined based on γ and the second preset upper limit in the 30 kHz span for the combination (X, Y) in Table 4.

It can be learned that, in this implementation, the monitoring upper limit in the 15 kHz span for the combination (X, Y) and the monitoring upper limit in the 30 kHz span for the combination (X, Y) may be determined based on γ, Table 3, and Table 4 as the actual monitoring upper limit of the terminal device.

In the implementation 1.1 (to be specific, the first scheduling cell and the second scheduling cell each are not configured with two CORESETPools or the first scheduling cell and the second scheduling cell each are configured with two CORESETPools for CORESETs corresponding to a same CORESETPool) provided in this embodiment of this application, three implementations are described based on whether the first scheduling cell and the second scheduling cell are configured with a first parameter corresponding to the first scheduling cell and the second scheduling cell or whether the first scheduling cell and the second scheduling cell are respectively configured with a first parameter and a second parameter, to specifically determine the monitoring upper limits of the PDCCH candidate in the first unit time and the second unit time. The first parameter is used to determine a number of cells corresponding to a scheduled cell scheduled by a scheduling cell. Optionally, the number of cells may also be referred to as a number of logical cells. An implementation 1.1.1 to an implementation 1.1.3 are separately used for description below.

Implementation 1.1.1: The first scheduling cell and the second scheduling cell are not configured with a first parameter corresponding to the first scheduling cell and the second scheduling cell.

The monitoring upper limits of the PDCCH candidate in the first unit time and the second unit time may be as follows.

The monitoring upper limit in the first unit time may include:

the first upper limit corresponding to the first scheduling cell and the second scheduling cell, where the first upper limit corresponding to the first scheduling cell and the second scheduling cell is equal to the first preset upper limit corresponding to the first scheduling cell; and/or the second upper limit corresponding to the first scheduling cell and the second scheduling cell, where the second upper limit corresponding to the first scheduling cell and the second scheduling cell is equal to the second preset upper limit corresponding to the first scheduling cell.

The monitoring upper limit in the second unit time may include one or more of the following:

the first upper limit corresponding to the first scheduling cell and the second scheduling cell, where the first upper limit corresponding to the first scheduling cell and the second scheduling cell is equal to the first preset upper limit corresponding to the second scheduling cell; and/or the second upper limit corresponding to the first scheduling cell and the second scheduling cell, where the second upper limit corresponding to the first scheduling cell and the second scheduling cell is equal to the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORESETPool, or when the PCell and the SCell each are configured with two CORESETPools for control resource sets corresponding to a same CORESETPool; and when the PCell and the SCell each are not configured with a first parameter corresponding to the PCell and the SCell, monitoring upper limits of the PDCCH candidate in a 15 kHz slot and a 30 kHz slot may be respectively as follows.

The monitoring upper limit in the 15 kHz slot may include:

the first upper limit corresponding to the PCell and the SCell, where the first upper limit corresponding to the PCell and the SCell is equal to the first preset upper limit, namely, 44, in the 15 kHz slot in Table 1; and the second upper limit corresponding to the PCell and the SCell, where the second upper limit corresponding to the PCell and the SCell is equal to the second preset upper limit, namely, 56, in the 15 kHz slot in Table 2.

The monitoring upper limit in the 30 kHz slot may include:

the first upper limit corresponding to the PCell and the SCell, where the first upper limit corresponding to the PCell and the SCell is equal to the first preset upper limit, namely, 36, in the 30 kHz slot in Table 1; and the second upper limit corresponding to the PCell and the SCell, where the second upper limit corresponding to the PCell and the SCell is equal to the second preset upper limit, namely, 56, in the 30 kHz slot in Table 2.

It can be seen that, in the 15 kHz slot, a maximum total number of PDCCH candidates in the PCell and the SCell is 44, and a maximum total number of non-overlapping CCEs in the PCell and the SCell is 56; and in the 30 kHz slot, a maximum total number of PDCCH candidates in the PCell and the SCell is 36, and a maximum total number of non-overlapping CCEs in the PCell and the SCell is 56. Therefore, this not only resolves a problem of how to determine a monitoring upper limit in a unit time in a case in which the PCell and the SCell both schedule the PCell, but also avoids a problem that a first upper limit and a second upper limit corresponding to the PCell and the SCell are determined based on only one unit time, and a first upper limit and a second upper limit corresponding to a single cell in another unit time are not met.

In addition, in the scenario shown in FIG. 7, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Implementation 1.1.2: The first scheduling cell and the second scheduling cell are configured with a first parameter corresponding to the first scheduling cell and the second scheduling cell. It is assumed that the first parameter is a.

The monitoring upper limits of the PDCCH candidate in the first unit time and the second unit time may be respectively as follows.

The monitoring upper limit in the first unit time may include:

the first upper limit corresponding to the first scheduling cell and the second scheduling cell, where the first upper limit corresponding to the first scheduling cell and the second scheduling cell is equal to a product of a and the first preset upper limit corresponding to the first scheduling cell; and/or the second upper limit corresponding to the first scheduling cell and the second scheduling cell, where the second upper limit corresponding to the first scheduling cell and the second scheduling cell is equal to a product of a and the second preset upper limit corresponding to the first scheduling cell; and the first upper limit corresponding to the first scheduling cell, where the first upper limit corresponding to the first scheduling cell is equal to the first preset upper limit corresponding to the first scheduling cell; and/or the second upper limit corresponding to the first scheduling cell, where the second upper limit corresponding to the first scheduling cell is equal to the second preset upper limit corresponding to the first scheduling cell.

The monitoring upper limit in the second unit time may include:

the first upper limit corresponding to the first scheduling cell and the second scheduling cell, where the first upper limit corresponding to the first scheduling cell and the second scheduling cell is equal to a product of a and the first preset upper limit corresponding to the second scheduling cell; and/or the second upper limit corresponding to the first scheduling cell and the second scheduling cell, where the second upper limit corresponding to the first scheduling cell and the second scheduling cell is equal to a product of a and the second preset upper limit corresponding to the second scheduling cell; and the first upper limit corresponding to the second scheduling cell, where the first upper limit corresponding to the second scheduling cell is equal to the first preset upper limit corresponding to the second scheduling cell; and/or the second upper limit corresponding to the second scheduling cell, where the second upper limit corresponding to the second scheduling cell is equal to the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORESETPool, or when the PCell and the SCell each are configured with two CORESETPools for control resource sets corresponding to a same CORESETPool; and when the PCell and the SCell each are not configured with a first parameter corresponding to the PCell and the SCell, monitoring upper limits of the PDCCH candidate in a 15 kHz slot and a 30 kHz slot may be respectively as follows.

The monitoring upper limit in the 15 kHz slot may include:

the first upper limit corresponding to the PCell and the SCell, where the first upper limit corresponding to the PCell and the SCell is equal to a product, namely, 44a, of a and the first preset upper limit in the 15 kHz slot in Table 1;

the second upper limit corresponding to the PCell and the SCell, where the second upper limit corresponding to the PCell and the SCell is equal to a product, namely, 56a, of a and the second preset upper limit in the 15 kHz slot in Table 2;

the first upper limit corresponding to the PCell, where the first upper limit corresponding to the PCell is equal to the first preset upper limit, namely, 44, in the 15 kHz slot in Table 1; and the second upper limit corresponding to the PCell, where the second upper limit corresponding to the PCell is equal to the second preset upper limit, namely, 56, in the 15 kHz slot in Table 2.

In other words, the terminal device does not need to monitor more than 44 a PDCCH candidates and more than 56a non-overlapping CCEs in total in the PCell and the SCell in the 15 kHz slot, and the terminal device does not need to monitor more than 44 PDCCH candidates and more than 56 non-overlapping CCEs in total in the PCell in the 15 kHz slot.

In addition, the monitoring upper limit in the 30 kHz slot may include:

the first upper limit corresponding to the PCell and the SCell, where the first upper limit corresponding to the PCell and the SCell is equal to a product, namely, 36a, of a and the first preset upper limit in the 30 kHz slot in Table 1;

the second upper limit corresponding to the PCell and the SCell, where the second upper limit corresponding to the PCell and the SCell is equal to a product, namely, 56a, of a and the second preset upper limit in the 30 kHz slot in Table 2;

the first upper limit corresponding to the SCell, where the first upper limit corresponding to the SCell is equal to the first preset upper limit, namely, 36, in the 30 kHz slot in Table 1; and the second upper limit corresponding to the SCell, where the second upper limit corresponding to the SCell is equal to the second preset upper limit, namely, 56, in the 30 kHz slot in Table 2.

In other words, the terminal device does not need to monitor more than 36 a PDCCH candidates and more than 56a non-overlapping CCEs in total in the PCell and the SCell in the 30 kHz slot, and the terminal device does not need to monitor more than 36 PDCCH candidates and more than 56 non-overlapping CCEs in the SCell in the 30 kHz slot.

It can be learn that, in the 15 kHz slot, a maximum total number of PDCCH candidates in the PCell and the SCell is 44a, a maximum total number of non-overlapping CCEs in the PCell and the SCell is 56a, a maximum number of PDCCH candidates in the PCell is 44, and a maximum number of non-overlapping CCEs in the PCell is 56; and in the 30 kHz slot, a maximum total number of PDCCH candidates in the PCell and the SCell is 36a, a maximum total number of non-overlapping CCEs in the PCell and the SCell is 56a, a maximum number of PDCCH candidates in the SCell is 36, and a maximum number of non-overlapping CCEs in the SCell is 56. Therefore, this not only resolves a problem of how to determine a monitoring upper limit in a unit time in a case in which the PCell and the SCell both schedule the PCell, but also avoids a problem that a first upper limit and a second upper limit corresponding to the PCell and the SCell are determined based on only one unit time, and a first upper limit and a second upper limit corresponding to a single cell in another unit time are not met.

In addition, in the scenario shown in FIG. 7, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Implementation 1.1.3: The first scheduling cell is configured with a first parameter, and the first parameter is represented as $a_1$. The second scheduling cell is configured with a second parameter, and the second parameter is represented as $a_2$. The first parameter $a_1$ is used to determine a number of cells corresponding to a scheduled cell scheduled by the first scheduling cell, and the second parameter $a_2$ is used to determine a number of cells corresponding to a scheduled cell scheduled by the second scheduling cell.

In a solution of the implementation 1.1.3, the monitoring upper limits of the PDCCH candidate in the first unit time and the second unit time may be respectively as follows.

The monitoring upper limit in the first unit time includes:
the first upper limit corresponding to the first scheduling cell, where the first upper limit corresponding to the first scheduling cell is equal to a product of $a_1$ and the first preset upper limit corresponding to the first scheduling cell; and/or the second upper limit corresponding to the first scheduling cell, where the second upper limit corresponding to the first scheduling cell is equal to a product of $a_1$ and the second preset upper limit corresponding to the first scheduling cell.

The monitoring upper limit in the second unit time may include:
the first upper limit corresponding to the second scheduling cell, where the first upper limit corresponding to the second scheduling cell is equal to a product of $a_2$ and the first preset upper limit corresponding to the second scheduling cell; and/or the second upper limit corresponding to the second scheduling cell, where the second upper limit corresponding to the second scheduling cell is equal to a product of $a_2$ and the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORE-SETPool, or when the PCell and the SCell each are configured with two CORESETPools for control resource sets corresponding to a same CORESETPool; and when the PCell is configured with $a_1$ and the SCell is configured with $a_2$, monitoring upper limits of the PDCCH candidate in a 15 kHz slot and a 30 kHz slot may be respectively as follows.

The monitoring upper limit in the 15 kHz slot may include:
the first upper limit corresponding to the PCell, where the first upper limit corresponding to the PCell is equal to a product, namely, 44 $a_1$, of $a_1$ and the first preset upper limit in the 15 kHz slot in Table 1; and
the second upper limit corresponding to the PCell, where the second upper limit corresponding to the PCell is equal to a product, namely, 56 $a_1$, of $a_1$ and the second preset upper limit in the 15 kHz slot in Table 2.

In other words, the terminal device does not need to monitor more than 44 $a_1$ PDCCH candidates and more than 56 $a_1$ non-overlapping CCEs in the PCell in the 15 kHz slot.

In addition, the monitoring upper limit in the 30 kHz slot may include:
the first upper limit corresponding to the SCell, where the first upper limit corresponding to the SCell is equal to a product, namely, 36 $a_2$, of $a_2$ and the first preset upper limit in the 30 kHz slot in Table 1; and
the second upper limit corresponding to the SCell, where the second upper limit corresponding to the SCell is equal to a product, namely, 56 $a_2$, of $a_2$ and the second preset upper limit in the 30 kHz slot in Table 2.

In other words, the terminal device does not need to monitor more than 36 $a_2$ PDCCH candidates and more than 56 $a_2$ non-overlapping CCEs in the SCell in the 30 kHz slot.

It can be learned that, in this solution, the terminal device does not need to monitor more than 44 $a_1$ PDCCH candidates and more than 56 $a_1$ non-overlapping CCEs in the PCell in the 15 kHz slot, and the terminal device does not need to monitor more than 36 $a_2$ PDCCH candidates and more than 56 $a_2$ non-overlapping CCEs in the SCell in the 30 kHz slot. Therefore, this not only resolves a problem of how to determine the monitoring upper limit in a unit time in a case in which the PCell and the SCell both schedule the PCell, but also avoids a problem that the monitoring upper limit in one unit time is determined based on only the unit time, and a monitoring upper limit in another unit time is not met.

In addition, in the scenario shown in FIG. 7, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In another solution of the implementation 1.1.3, the monitoring upper limits of the PDCCH candidate in the first unit time and the second unit time may be respectively as follows.

The monitoring upper limit in the first unit time includes:
the first upper limit corresponding to the first scheduling cell and the second scheduling cell, where the first upper limit corresponding to the first scheduling cell and the second scheduling cell is equal to a product of $(a_1+a_2)$ and the first preset upper limit corresponding to the first scheduling cell; and/or the second upper limit corresponding to the first scheduling cell and the second scheduling cell, where the second upper limit corresponding to the first scheduling cell and the second scheduling cell is equal to a product of $(a_1+a_2)$ and the second preset upper limit corresponding to the first scheduling cell; and
the first upper limit corresponding to the first scheduling cell, where the first upper limit corresponding to the first scheduling cell is equal to the first preset upper limit corresponding to the first scheduling cell; and/or the second upper limit corresponding to the first scheduling cell, where the second upper limit corresponding to the first scheduling cell is equal to the second preset upper limit corresponding to the first scheduling cell.

The monitoring upper limit in the second unit time may include:
the first upper limit corresponding to the first scheduling cell and the second scheduling cell, where the first upper limit corresponding to the first scheduling cell and the second scheduling cell is equal to a product of $(a_1+a_2)$ and the first preset upper limit corresponding to the second scheduling cell; and/or the second upper limit corresponding to the first scheduling cell and the second scheduling cell, where the second upper limit corresponding to the first scheduling cell and the second scheduling cell is equal to a product of $(a_1+a_2)$ and the second preset upper limit corresponding to the second scheduling cell; and the first upper limit corresponding to the second scheduling cell, where the first upper limit corresponding to the second scheduling cell is equal to the first preset upper limit corresponding to the second scheduling cell; and/or the second upper limit corresponding to the second scheduling cell, where the second upper limit corresponding to the second scheduling cell is equal to the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORESETPool, or when the PCell and the SCell each are configured with two CORESETPools for control resource sets corresponding to a same CORESETPool; and when the PCell is configured with $a_1$ and the SCell is configured with $a_2$, monitoring upper limits of the PDCCH candidate in a 15 kHz slot and a 30 kHz slot may be respectively as follows.

The monitoring upper limit in the 15 kHz slot may include:

the first upper limit corresponding to the PCell and the SCell, where the first upper limit corresponding to the PCell and the SCell is equal to a product, namely, $44(a_1+a_2)$, of $(a_1+a_2)$ and the first preset upper limit in the 15 kHz slot in Table 1; and the second upper limit corresponding to the PCell and the SCell, where the second upper limit corresponding to the PCell and the SCell is equal to a product, namely, $56(a_1+a_2)$, of $(a_1+a_2)$ and the second preset upper limit in the 15 kHz slot in Table 1; and the first upper limit corresponding to the PCell, where the first upper limit corresponding to the PCell is equal to the first preset upper limit, namely, 44, in the 15 kHz slot in Table 1; and the second upper limit corresponding to the PCell, where the second upper limit corresponding to the PCell is equal to the second preset upper limit, namely, 56, in the 15 kHz slot in Table 2.

In other words, the terminal device does not need to monitor more than $44(a_1+a_2)$ PDCCH candidates and more than $56(a_1+a_2)$ non-overlapping CCEs in total in the PCell and the SCell in the 15 kHz slot, and the terminal device does not need to monitor more than 44 PDCCH candidates and more than 56 non-overlapping CCEs in the PCell in the 15 kHz slot.

In addition, the monitoring upper limit in the 30 kHz slot may include:

the first upper limit corresponding to the PCell and the SCell, where the first upper limit corresponding to the PCell and the SCell is equal to a product, namely, $36(a_1+a_2)$, of $(a_1+a_2)$ and the first preset upper limit in the 30 kHz slot in Table 1; and the second upper limit corresponding to the PCell and the SCell, where the second upper limit corresponding to the PCell and the SCell is equal to a product, namely, $56(a_1+a_2)$, of $(a_1+a_2)$ and the second preset upper limit in the 30 kHz slot in Table 1; and the first upper limit corresponding to the SCell, where the first upper limit corresponding to the SCell is equal to the first preset upper limit, namely, 36, in the 30 kHz slot in Table 1; and the second upper limit corresponding to the SCell, where the second upper limit corresponding to the SCell is equal to the second preset upper limit, namely, 56, in the 30 kHz slot in Table 2.

In other words, the terminal device does not need to monitor more than $36(a_1+a_2)$ PDCCH candidates and more than $56(a_1+a_2)$ non-overlapping CCEs in total in the PCell and the SCell in the 30 kHz slot, and the terminal device does not need to monitor more than 36 PDCCH candidates and more than 56 non-overlapping CCEs in the SCell in the 30 kHz slot.

It can be learned that, in this solution, the terminal device does not need to monitor more than $44(a_1+a_2)$ PDCCH candidates and more than $56(a_1+a_2)$ non-overlapping CCEs in total in the PCell and the SCell in the 15 kHz slot, and the terminal device does not need to monitor more than 44 PDCCH candidates and more than 56 non-overlapping CCEs in the PCell in the 15 kHz slot. The terminal device does not need to monitor more than $36(a_1+a_2)$ PDCCH candidates and more than $56(a_1+a_2)$ non-overlapping CCEs in total in the PCell and the SCell in the 30 kHz slot, and the terminal device does not need to monitor more than 36 PDCCH candidates and more than 56 non-overlapping CCEs in the SCell in the 30 kHz slot. Therefore, this not only resolves a problem of how to determine a monitoring upper limit in a unit time in a case in which the PCell and the SCell both schedule the PCell, but also avoids a problem that a monitoring upper limit in one unit time is determined based on only the unit time, and a monitoring upper limit in another unit time is not met.

In addition, in the scenario shown in FIG. 7, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In still another solution of the implementation 1.1.3, the monitoring upper limits of the PDCCH candidate in the first unit time and the second unit time may be respectively as follows.

The monitoring upper limit in the first unit time includes:

the first upper limit corresponding to the first scheduling cell, where the first upper limit corresponding to the first scheduling cell is equal to the first preset upper limit corresponding to the first scheduling cell; and/or the second upper limit corresponding to the first scheduling cell, where the second upper limit corresponding to the first scheduling cell is equal to the second preset upper limit corresponding to the first scheduling cell.

The monitoring upper limit in the second unit time may include:

the first upper limit corresponding to the second scheduling cell, where the first upper limit corresponding to the second scheduling cell is equal to the first preset upper limit corresponding to the second scheduling cell; and/or the second upper limit corresponding to the second scheduling cell, where the second upper limit corresponding to the second scheduling cell is equal to the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORE-SETPool, or when the PCell and the SCell each are configured with two CORESETPools for control resource sets corresponding to a same CORESETPool; and when the PCell is configured with $a_1$ and the SCell is configured with $a_2$, monitoring upper limits of the PDCCH candidate in a 15 kHz slot and a 30 kHz slot may be respectively as follows.

The monitoring upper limit in the 15 kHz slot may include:

the first upper limit corresponding to the PCell, where the first upper limit corresponding to the PCell is equal to the first preset upper limit, namely, 44, in the 15 kHz slot in Table 1; and the second upper limit corresponding to the PCell, where the second upper limit corresponding to the PCell is equal to the second preset upper limit, namely, 56, in the 15 kHz slot in Table 2.

In other words, the terminal device does not need to monitor more than 44 PDCCH candidates and more than 56 non-overlapping CCEs in the PCell in the 15 kHz slot.

In addition, the monitoring upper limit in the 30 kHz slot may include:

the first upper limit corresponding to the SCell, where the first upper limit corresponding to the SCell is equal to the first preset upper limit, namely, 36, in the 30 kHz slot in Table 1; and the second upper limit corresponding to the SCell, where the second upper limit corresponding to the SCell is equal to the second preset upper limit, namely, 56, in the 30 kHz slot in Table 2.

In other words, the terminal device does not need to monitor more than 36 PDCCH candidates and more than 56 non-overlapping CCEs in the SCell in the 30 kHz slot.

It can be learned that, in this solution, the terminal device does not need to monitor more than 44 PDCCH candidates and more than 56 non-overlapping CCEs in the PCell in the 15 kHz slot; and the terminal device does not need to monitor more than 36 PDCCH candidates and more than 56 non-overlapping CCEs in the SCell in the 30 kHz slot. Therefore, this not only resolves a problem of how to determine a monitoring upper limit in a unit time in a case in which the PCell and the SCell both schedule the PCell, but also avoids a problem that a monitoring upper limit in one unit time is determined based on only the unit time, and a monitoring upper limit in another unit time is not met.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In the implementation 1.2 (to be specific, the first scheduling cell and the second scheduling cell each are configured with two CORESETPools) provided in this embodiment of this application, three implementations are described based on whether the first scheduling cell and the second scheduling cell are configured with a first parameter corresponding to the first scheduling cell and the second scheduling cell or whether the first scheduling cell and the second scheduling cell are respectively configured with a first parameter and a second parameter, to specifically determine the monitoring upper limits of the PDCCH candidate in the first unit time and the second unit time. The first parameter is used to determine a number of cells corresponding to a scheduled cell scheduled by a scheduling cell. Optionally, the number of cells may also be referred to as a number of logical cells. An implementation 1.2.1 to an implementation 1.2.3 are separately used for description below. The third parameter is represented as γ.

Implementation 1.2.1: The first scheduling cell and the second scheduling cell are not configured with a first parameter corresponding to the first scheduling cell and the second scheduling cell.

The monitoring upper limits of the PDCCH candidate in the first unit time and the second unit time may be as follows.

The monitoring upper limit in the first unit time may include:

the first upper limit corresponding to the first scheduling cell and the second scheduling cell, where the first upper limit corresponding to the first scheduling cell and the second scheduling cell is equal to a product of γ and the first preset upper limit corresponding to the first scheduling cell; and/or the second upper limit corresponding to the first scheduling cell and the second scheduling cell, where the second upper limit corresponding to the first scheduling cell and the second scheduling cell is equal to a product of γ and the second preset upper limit corresponding to the first scheduling cell.

The monitoring upper limit in the second unit time may include:

the first upper limit corresponding to the first scheduling cell and the second scheduling cell, where the first upper limit corresponding to the first scheduling cell and the second scheduling cell is equal to a product of γ and the first preset upper limit corresponding to the second scheduling cell; and/or the second upper limit corresponding to the first scheduling cell and the second scheduling cell, where the second upper limit corresponding to the first scheduling cell and the second scheduling cell is equal to a product of γ and the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are configured with two control resource set pools CORESETPools, and the PCell and the SCell each are not configured with a first parameter corresponding to the PCell and the SCell, monitoring upper limits of the PDCCH candidate in a 15 kHz slot and a 30 kHz slot may be respectively as follows.

The monitoring upper limit in the 15 kHz slot may include:

the first upper limit corresponding to the PCell and the SCell, where the first upper limit corresponding to the PCell and the SCell is equal to a product, namely, 44γ, of γ and the first preset upper limit in the 15 kHz slot in Table 1; and the second upper limit corresponding to the PCell and the SCell, where the second upper limit corresponding to the PCell and the SCell is equal to a product, namely, 56γ, of γ and the second preset upper limit in the 15 kHz slot in Table 2.

The monitoring upper limit in the 30 kHz slot may include:

the first upper limit corresponding to the PCell and the
SCell, where the first upper limit corresponding to the
PCell and the SCell is equal to a product, namely, 36γ,
of γ and the first preset upper limit in the 30 kHz slot
in Table 1; and the second upper limit corresponding to the PCell and the
SCell, where the second upper limit corresponding to
the PCell and the SCell is equal to a product, namely,
56γ, of γ and the second preset upper limit in the 30 kHz
slot in Table 2.

It can be seen that, in the 15 kHz slot, a maximum total
number of PDCCH candidates in the PCell and the SCell is
44γ, and a maximum total number of non-overlapping CCEs
in the PCell and the SCell is 56γ; and in the 30 kHz slot, a
maximum total number of PDCCH candidates in the PCell
and the SCell is 36γ, and a maximum total number of
non-overlapping CCEs in the PCell and the SCell is 56γ.
Therefore, this not only resolves a problem of how to
determine a monitoring upper limit in a unit time in a case
in which the PCell and the SCell both schedule the PCell, but
also avoids a problem that a first upper limit and a second
upper limit corresponding to the PCell and the SCell are
determined based on only one unit time, and a first upper
limit and a second upper limit corresponding to a single cell
in another unit time are not met.

In addition, a case in which the PCell and the SCell both
are such configured that a monitoring upper limit is deter-
mined at a granularity of a span is similar to that in the
foregoing example. A difference lies in that different preset
monitoring upper limits per unit time are used for different
unit times. Therefore, details are not described herein again.

Implementation 1.2.2: The first scheduling cell and the
second scheduling cell are configured with a first parameter
corresponding to the first scheduling cell and the second
scheduling cell. It is assumed that the first parameter is a.

The monitoring upper limits of the PDCCH candidate in
the first unit time and the second unit time may be respec-
tively as follows.

The monitoring upper limit in the first unit time may
include:

the first upper limit corresponding to the first scheduling
cell and the second scheduling cell, where the first
upper limit corresponding to the first scheduling cell
and the second scheduling cell is equal to a product of
a·γ and the first preset upper limit corresponding to the
first scheduling cell; and/or the second upper limit
corresponding to the first scheduling cell and the sec-
ond scheduling cell, where the second upper limit
corresponding to the first scheduling cell and the sec-
ond scheduling cell is equal to a product of a·γ and the
second preset upper limit corresponding to the first
scheduling cell; and the first upper limit corresponding to the first scheduling
cell, where the first upper limit corresponding to the
first scheduling cell is equal to a product of γ and the
first preset upper limit corresponding to the first sched-
uling cell; and/or the second upper limit corresponding
to the first scheduling cell, where the second upper limit
corresponding to the first scheduling cell is equal to a
product of γ and the second preset upper limit corre-
sponding to the first scheduling cell.

The monitoring upper limit in the second unit time may
include:

the first upper limit corresponding to the first scheduling
cell and the second scheduling cell, where the first
upper limit corresponding to the first scheduling cell
and the second scheduling cell is equal to a product of a·γ and the first preset upper limit corresponding to the
second scheduling cell; and/or the second upper limit
corresponding to the first scheduling cell and the sec-
ond scheduling cell, where the second upper limit
corresponding to the first scheduling cell and the sec-
ond scheduling cell is equal to a product of a·γ and the
second preset upper limit corresponding to the second
scheduling cell; and the first upper limit corresponding to the second sched-
uling cell, where the first upper limit corresponding to
the second scheduling cell is equal to a product of γ and
the first preset upper limit corresponding to the second
scheduling cell; and/or the second upper limit corre-
sponding to the second scheduling cell, where the
second upper limit corresponding to the second sched-
uling cell is equal to a product of γ and the second
preset upper limit corresponding to the second sched-
uling cell.

For example, in the scenario shown in FIG. 7, the PCell
and the SCell both are such configured that a monitoring
upper limit is determined at a granularity of a slot. When the
PCell and the SCell each are configured with two control
resource set pools CORESETPools, and the PCell and the
SCell are configured with a first parameter a corresponding
to the PCell and the SCell, monitoring upper limits of the
PDCCH candidate in a 15 kHz slot and a 30 kHz slot may
be respectively as follows.

The monitoring upper limit in the 15 kHz slot may
include:

the first upper limit corresponding to the PCell and the
SCell, where the first upper limit corresponding to the
PCell and the SCell is equal to a product, namely, 44
a·γ, of a·γ and the first preset upper limit in the 15 kHz
slot in Table 1;

the second upper limit corresponding to the PCell and the
SCell, where the second upper limit corresponding to
the PCell and the SCell is equal to a product, namely,
56 a·γ, of a·γ and the second preset upper limit in the 15
kHz slot in Table 2;

the first upper limit corresponding to the PCell, where the
first upper limit corresponding to the PCell is equal to
a product, namely, 44γ, of γ and the first preset upper
limit in the 15 kHz slot in Table 1; and the second upper limit corresponding to the PCell, where
the second upper limit corresponding to the PCell is
equal to a product, namely, 56γ, of γ and the second
preset upper limit in the 15 kHz slot in Table 2.

In other words, the terminal device does not need to
monitor more than 44 a·γ PDCCH candidates and more than
56 a·γ non-overlapping CCEs in total in the PCell and the
SCell in the 15 kHz slot, and the terminal device does not
need to monitor more than 44γ PDCCH candidates and more
than 56γ non-overlapping CCEs in the PCell in the 15 kHz
slot.

In addition, the monitoring upper limit in the 30 kHz slot
may include:

the first upper limit corresponding to the PCell and the
SCell, where the first upper limit corresponding to the
PCell and the SCell is equal to a product, namely, 36
a·γ, of a·γ and the first preset upper limit in the 30 kHz
slot in Table 1;

the second upper limit corresponding to the PCell and the
SCell, where the second upper limit corresponding to
the PCell and the SCell is equal to a product, namely,
56 a·γ, of a·γ and the second preset upper limit in the 30
kHz slot in Table 2;

the first upper limit corresponding to the SCell, where the first upper limit corresponding to the SCell is equal to a product, namely, $36\gamma$, of $\gamma$ and the first preset upper limit in the 30 kHz slot in Table 1; and the second upper limit corresponding to the SCell, where the second upper limit corresponding to the SCell is equal to a product, namely, $56\gamma$, of $\gamma$ and the second preset upper limit in the 30 kHz slot in Table 2.

In other words, the terminal device does not need to monitor more than 36 $a\cdot\gamma$ PDCCH candidates and more than 56$a\cdot\gamma$ non-overlapping CCEs in total in the PCell and the SCell in the 30 kHz slot, and the terminal device does not need to monitor more than $36\gamma$ PDCCH candidates and more than $56\gamma$ non-overlapping CCEs in the SCell in the 30 kHz slot.

It can be learn that, in the 15 kHz slot, a maximum total number of PDCCH candidates in the PCell and the SCell is 44 $a\cdot\gamma$, a maximum total number of non-overlapping CCEs in the PCell and the SCell is 56$a\cdot\gamma$, a maximum number of PDCCH candidates in the PCell is $44\gamma$, and a maximum number of non-overlapping CCEs in the PCell is $56\gamma$; and in the 30 kHz slot, a maximum total number of PDCCH candidates in the PCell and the SCell is 36 $a\cdot\gamma$, a maximum total number of non-overlapping CCEs in the PCell and the SCell is 56 $a\cdot\gamma$, a maximum number of PDCCH candidates in the SCell is $36\gamma$, and a maximum number of non-overlapping CCEs in the SCell is $56\gamma$. Therefore, this not only resolves a problem of how to determine a monitoring upper limit in a unit time in a case in which the PCell and the SCell both schedule the PCell, but also avoids a problem that a first upper limit and a second upper limit corresponding to the PCell and the SCell are determined based on only one unit time, and a first upper limit and a second upper limit corresponding to a single cell in another unit time are not met.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Implementation 1.2.3: The first scheduling cell is configured with a first parameter, and the first parameter is represented as $a_1$. The second scheduling cell is configured with a second parameter, and the second parameter is represented as $a_2$. The first parameter $a_1$ is used to determine a number of cells corresponding to a scheduled cell scheduled by the first scheduling cell, and the second parameter $a_2$ is used to determine a number of cells corresponding to a scheduled cell scheduled by the second scheduling cell.

In a solution of the implementation 1.2.3, the monitoring upper limits of the PDCCH candidate in the first unit time and the second unit time may be respectively as follows.

The monitoring upper limit in the first unit time includes:

the first upper limit corresponding to the first scheduling cell, where the first upper limit corresponding to the first scheduling cell is equal to a product of $a_1\cdot\gamma$ and the first preset upper limit corresponding to the first scheduling cell; and/or the second upper limit corresponding to the first scheduling cell, where the second upper limit corresponding to the first scheduling cell is equal to a product of $a_1\cdot\gamma$ and the second preset upper limit corresponding to the first scheduling cell.

The monitoring upper limit in the second unit time may include:

the first upper limit corresponding to the second scheduling cell, where the first upper limit corresponding to the second scheduling cell is equal to a product of $a_2\cdot\gamma$ and the first preset upper limit corresponding to the second scheduling cell; and/or the second upper limit corresponding to the second scheduling cell, where the second upper limit corresponding to the second scheduling cell is equal to a product of $a_2\cdot\gamma$ and the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are configured with two control resource set pools CORESETPools, the PCell is configured with $a_1$, and the SCell is configured with $a_2$, the monitoring upper limits of the PDCCH candidate in a 15 kHz slot and a 30 kHz slot may be respectively as follows.

The monitoring upper limit in the 15 kHz slot may include:

the first upper limit corresponding to the PCell, where the first upper limit corresponding to the PCell is equal to a product, namely, 44 $a_1\cdot\gamma$, of $a_1\cdot\gamma$ and the first preset upper limit in the 15 kHz slot in Table 1;

the second upper limit corresponding to the PCell, where the second upper limit corresponding to the PCell is equal to a product, namely, 56 $a_1\cdot\gamma$, of $a_1\cdot\gamma$ and the second preset upper limit in the 15 kHz slot in Table 2.

In other words, the terminal device does not need to monitor more than 44 $a_1\cdot\gamma$ PDCCH candidates and more than 56 $a_1\cdot\gamma$ non-overlapping CCEs in the PCell in the 15 kHz slot.

In addition, the monitoring upper limit in the 30 kHz slot may include:

the first upper limit corresponding to the SCell, where the first upper limit corresponding to the SCell is equal to a product, namely, 36 $a_1\cdot\gamma$, of $a_1\cdot\gamma$ and the first preset upper limit in the 30 kHz slot in Table 1; and the second upper limit corresponding to the SCell, where the second upper limit corresponding to the SCell is equal to a product, namely, 56 $a_1\cdot\gamma$, of $a_1\cdot\gamma$ and the second preset upper limit in the 30 kHz slot in Table 2.

In other words, the terminal device does not need to monitor more than 36 $a_1\cdot\gamma$ PDCCH candidates and more than 56 $a_1\cdot\gamma$ non-overlapping CCEs in the SCell in the 30 kHz slot.

It can be learned that, in this solution, the terminal device does not need to monitor more than 44 $a_1\cdot\gamma$ PDCCH candidates and more than 56 $a_1\cdot\gamma$ non-overlapping CCEs in the PCell in the 15 kHz slot, and the terminal device does not need to monitor more than 36 $a_1\cdot\gamma$ PDCCH candidates and more than 56 $a_1\cdot\gamma$ non-overlapping CCEs in the SCell in the 30 kHz slot. Therefore, this not only resolves a problem of how to determine a monitoring upper limit in a unit time in a case in which the PCell and the SCell both schedule the PCell, but also avoids a problem that a monitoring upper limit in one unit time is determined based on only the unit time, and a monitoring upper limit in another unit time is not met.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In another solution of the implementation 1.2.3, the monitoring upper limits of the PDCCH candidate in the first unit time and the second unit time may be respectively as follows.

The monitoring upper limit in the first unit time includes:

the first upper limit corresponding to the first scheduling cell and the second scheduling cell, where the first upper limit corresponding to the first scheduling cell and the second scheduling cell is equal to a product of $(a_1+a_2) \cdot \gamma$ and the first preset upper limit corresponding to the first scheduling cell; and/or the second upper limit corresponding to the first scheduling cell and the second scheduling cell, where the second upper limit corresponding to the first scheduling cell and the second scheduling cell is equal to a product of $(a_1+a_2) \cdot \gamma$ and the second preset upper limit corresponding to the first scheduling cell; and the first upper limit corresponding to the first scheduling cell, where the first upper limit corresponding to the first scheduling cell is equal to a product of $\gamma$ and the first preset upper limit corresponding to the first scheduling cell; and/or the second upper limit corresponding to the first scheduling cell, where the second upper limit corresponding to the first scheduling cell is equal to a product of $\gamma$ and the second preset upper limit corresponding to the first scheduling cell.

The monitoring upper limit in the second unit time may include:

the first upper limit corresponding to the first scheduling cell and the second scheduling cell, where the first upper limit corresponding to the first scheduling cell and the second scheduling cell is equal to a product of $(a_1+a_2) \cdot \gamma$ and the first preset upper limit corresponding to the second scheduling cell; and/or the second upper limit corresponding to the first scheduling cell and the second scheduling cell, where the second upper limit corresponding to the first scheduling cell and the second scheduling cell is equal to a product of $(a_1+a_2) \cdot \gamma$ and the second preset upper limit corresponding to the second scheduling cell; and the first upper limit corresponding to the second scheduling cell, where the first upper limit corresponding to the second scheduling cell is equal to a product of $\gamma$ and the first preset upper limit corresponding to the second scheduling cell; and/or the second upper limit corresponding to the second scheduling cell, where the second upper limit corresponding to the second scheduling cell is equal to a product of $\gamma$ and the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are configured with two control resource set pools CORESETPools, the PCell is configured with $a_1$, and the SCell is configured with $a_2$, the monitoring upper limits of the PDCCH candidate in a 15 kHz slot and a 30 kHz slot may be respectively as follows.

The monitoring upper limit in the 15 kHz slot may include:

the first upper limit corresponding to the PCell and the SCell, where the first upper limit corresponding to the PCell and the SCell is equal to a product, namely, 44 $(a_1+a_2) \cdot \gamma$, of $(a_1+a_2) \cdot \gamma$ and the first preset upper limit in the 15 kHz slot in Table 1; and the second upper limit corresponding to the PCell and the SCell, where the second upper limit corresponding to the PCell and the SCell is equal to a product, namely, 56 $(a_1+a_2) \cdot \gamma$, of $(a_1+a_2) \cdot \gamma$ and the second preset upper limit in the 15 kHz slot in Table 1; and the first upper limit corresponding to the PCell, where the first upper limit corresponding to the PCell is equal to a product, namely, $44\gamma$, of $\gamma$ and the first preset upper limit in the 15 kHz slot in Table 1; and the second upper limit corresponding to the PCell, where the second upper limit corresponding to the PCell is equal to a product, namely, $56\gamma$, of $\gamma$ and the second preset upper limit in the 15 kHz slot in Table 2.

In other words, the terminal device does not need to monitor more than 44 $(a_1+a_2) \cdot \gamma$ PDCCH candidates and more than $56(a_1+a_2) \cdot \gamma$ non-overlapping CCEs in total in the PCell and the SCell in the 15 kHz slot, and the terminal device does not need to monitor more than $44\gamma$ PDCCH candidates and more than $56\gamma$ non-overlapping CCEs in the PCell in the 15 kHz slot.

In addition, the monitoring upper limit in the 30 kHz slot may include:

the first upper limit corresponding to the PCell and the SCell, where the first upper limit corresponding to the PCell and the SCell is equal to a product, namely, 36 $(a_1+a_2) \cdot \gamma$, of $(a_1+a_2) \cdot \gamma$ and the first preset upper limit in the 30 kHz slot in Table 1; and the second upper limit corresponding to the PCell and the SCell, where the second upper limit corresponding to the PCell and the SCell is equal to a product, namely, 56 $(a_1+a_2) \cdot \gamma$, of $(a_1+a_2) \cdot \gamma$ and the second preset upper limit in the 30 kHz slot in Table 1; and the first upper limit corresponding to the SCell, where the first upper limit corresponding to the SCell is equal to a product, namely, $36\gamma$, of $\gamma$ and the first preset upper limit in the 30 kHz slot in Table 1; and the second upper limit corresponding to the SCell, where the second upper limit corresponding to the SCell is equal to a product, namely, $56\gamma$, of $\gamma$ and the second preset upper limit in the 30 kHz slot in Table 2.

In other words, the terminal device does not need to monitor more than $36(a_1+a_2) \cdot \gamma$ PDCCH candidates and more than $56(a_1+a_2) \cdot \gamma$ non-overlapping CCEs in total in the PCell and the SCell in the 30 kHz slot, and the terminal device does not need to monitor more than $36\gamma$ PDCCH candidates and more than $56\gamma$ non-overlapping CCEs in the SCell in the 30 kHz slot.

It can be learned that, in this solution, the terminal device does not need to monitor more than 44 $(a_1+a_2) \cdot \gamma$ PDCCH candidates and more than 56 $(a_1+a_2) \cdot \gamma$ non-overlapping CCEs in total in the PCell and the SCell in the 15 kHz slot, and the terminal device does not need to monitor more than $44\gamma$ PDCCH candidates and more than $56\gamma$ non-overlapping CCEs in the PCell in the 15 kHz slot. The terminal device does not need to monitor more than $36(a_1+a_2) \cdot \gamma$ PDCCH candidates and more than $56(a_1+a_2) \cdot \gamma$ non-overlapping CCEs in total in the PCell and the SCell in the 30 kHz slot, and the terminal device does not need to monitor more than $36\gamma$ PDCCH candidates and more than $56\gamma$ non-overlapping CCEs in the SCell in the 30 kHz slot. Therefore, this not only resolves a problem of how to determine a monitoring upper limit in a unit time in a case in which the PCell and the SCell both schedule the PCell, but also avoids a problem that a monitoring upper limit in one unit time is determined based on only the unit time, and a monitoring upper limit in another unit time is not met.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In still another solution of the implementation 1.2.3, the monitoring upper limits of the PDCCH candidate in the first unit time and the second unit time may be respectively as follows.

The monitoring upper limit in the first unit time includes:

the first upper limit corresponding to the first scheduling cell, where the first upper limit corresponding to the first scheduling cell is equal to a product of $\gamma$ and the first preset upper limit corresponding to the first scheduling cell; and/or the second upper limit corresponding to the first scheduling cell, where the second upper limit corresponding to the first scheduling cell is equal to a product of $\gamma$ and the second preset upper limit corresponding to the first scheduling cell.

The monitoring upper limit in the second unit time may include:

the first upper limit corresponding to the second scheduling cell, where the first upper limit corresponding to the second scheduling cell is equal to a product of $\gamma$ and the first preset upper limit corresponding to the second scheduling cell; and/or the second upper limit corresponding to the second scheduling cell, where the second upper limit corresponding to the second scheduling cell is equal to a product of $\gamma$ and the second preset upper limit corresponding to the second scheduling cell.

For example, in the scenario shown in FIG. 7, the PCell and the SCell both are such configured that a monitoring upper limit is determined at a granularity of a slot. When the PCell and the SCell each are configured with two control resource set pools CORESETPools, the PCell is configured with $a_1$, and the SCell is configured with $a_2$, the monitoring upper limits of the PDCCH candidate in a 15 kHz slot and a 30 kHz slot may be respectively as follows.

The monitoring upper limit in the 15 kHz slot may include:

the first upper limit corresponding to the PCell, where the first upper limit corresponding to the PCell is equal to a product, namely, $44\gamma$, of $\gamma$ and the first preset upper limit in the 15 kHz slot in Table 1; and the second upper limit corresponding to the PCell, where the second upper limit corresponding to the PCell is equal to a product, namely, $56\gamma$, of $\gamma$ and the second preset upper limit in the 15 kHz slot in Table 2.

In other words, the terminal device does not need to monitor more than $44\gamma$ PDCCH candidates and more than $56\gamma$ non-overlapping CCEs in the PCell in the 15 kHz slot.

In addition, the monitoring upper limit in the 30 kHz slot may include:

the first upper limit corresponding to the SCell, where the first upper limit corresponding to the SCell is equal to a product, namely, $36\gamma$, of $\gamma$ and the first preset upper limit in the 30 kHz slot in Table 1; and the second upper limit corresponding to the SCell, where the second upper limit corresponding to the SCell is equal to a product, namely, $56\gamma$, of $\gamma$ and the second preset upper limit in the 30 kHz slot in Table 2.

In other words, the terminal device does not need to monitor more than $36\gamma$ PDCCH candidates and more than $56\gamma$ non-overlapping CCEs in the SCell in the 30 kHz slot.

It can be learned that, in this solution, the terminal device does not need to monitor more than $44\gamma$ PDCCH candidates and more than $56\gamma$ non-overlapping CCEs in the PCell in the 15 kHz slot; and the terminal device does not need to monitor more than $36\gamma$ PDCCH candidates and more than $56\gamma$ non-overlapping CCEs in the SCell in the 30 kHz slot. Therefore, this not only resolves a problem of how to determine a monitoring upper limit in a unit time in a case in which the PCell and the SCell both schedule the PCell, but also avoids a problem that a monitoring upper limit in one unit time is determined based on only the unit time, and a monitoring upper limit in another unit time is not met.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Embodiment 2: The downlink control information transmission method 200 in this embodiment of this application is applicable to a scenario in which subcarrier spacings of active downlink bandwidth parts in a plurality of scheduling cells are the same.

FIG. 9 is a schematic flowchart of a downlink control information transmission method 200 according to an embodiment of this application. The downlink control information transmission method 200 is described by using an example in which a first scheduling cell and a second scheduling cell schedule a same scheduled cell. Optionally, the downlink control information transmission method 200 is also applicable to a scenario in which a plurality of scheduling cells schedule a same scheduled cell. There is a same inventive concept, and details are not described in this application.

As shown in FIG. 9, the downlink control information transmission method 200 may include but is not limited to the following steps.

S201: A network device sends first configuration information.

S202: A terminal device receives the first configuration information.

Optionally, for the steps S201 and S202, refer to related descriptions of the steps S101 and the S102 in Embodiment 1. Details are not described herein again.

S203: The terminal device determines, for the same scheduled cell, a monitoring upper limit of a PDCCH candidate in a same unit time.

S204: The network device also determines, for the same scheduled cell, the monitoring upper limit of the PDCCH candidate in the same unit time.

The same unit time is determined based on a subcarrier spacing of an active downlink bandwidth part in one of the scheduling cells. The monitoring upper limit of the PDCCH candidate in the same unit time may include a monitoring upper limit of a PDCCH candidate in a single scheduling cell in the unit time, and/or further include a monitoring upper limit of total PDCCH candidates in two scheduling cells in the unit time. Therefore, in the steps S203 and S204, the PDCCH candidate may be the PDCCH candidate in the single scheduling cell, and/or the total PDCCH candidates in the two scheduling cells.

Similarly, the monitoring upper limit of the PDCCH candidate in the unit time may also be referred to as an actual monitoring upper limit of the terminal device.

In an optional implementation, the network device may first determine the first configuration information, perform the step 204 of determining the actual monitoring upper limit of the terminal device, and then perform the step 201 of sending the first configuration information to the terminal device, and the terminal device performs the steps S202 and S203. In another optional implementation, the network device may also jointly determine the first configuration information and an actual monitoring upper limit of the terminal device, and then perform the step 201 of sending the first configuration information to the terminal device, and the terminal device performs the steps S202 and S203.

In an optional implementation, the downlink control information transmission method 200 may further include: The network device sends a PDCCH-related configuration to the terminal device, and then sends a PDCCH in each scheduling cell, so that the terminal device monitors the PDCCH candidate based on the PDCCH-related configuration and the actual monitoring upper limit, to obtain the PDCCH. Optionally, a sequence in which the network device sends the PDCCH-related configuration and the terminal device performs the step S203 may not be limited in this embodiment of this application.

It can be learned that, in the downlink control information transmission method 200 shown in FIG. 9, the monitoring upper limit of the PDCCH candidate in the same unit time is determined, and this resolves a problem of how to determine the monitoring upper limit in a scenario in which the two scheduling cells schedule the same scheduled cell.

In addition, because the subcarrier spacing corresponding to the first scheduling cell is the same as the subcarrier spacing corresponding to the second scheduling cell, in this method, the monitoring upper limit in the same unit time is determined. Therefore, there is no problem that a monitoring upper limit in one unit time is determined and a monitoring upper limit in the other unit time is excessively large.

For example, it is assumed that a subcarrier spacing of an SCell is 30 kHz, a subcarrier spacing of a PCell is also 30 kHz, and the PCell and the SCell both can schedule the PCell. A monitoring upper limit of a PDCCH candidate in a 30 kHz slot is 36, and in a preset monitoring upper limit per unit time corresponding to the SCell and the PCell, a first preset upper limit is 36. Therefore, there is no problem that a monitoring upper limit of total PDCCH candidates in the SCell and the PCell is excessively large in the 30 kHz slot of the terminal device.

The following describes some optional implementations of Embodiment 2.

In an optional implementation, the monitoring upper limit in the same unit time is determined based on a preset monitoring upper limit per unit time corresponding to the first scheduling cell or the second scheduling cell. It can be learned that the actual monitoring upper limit of the terminal device is related to the first configuration information and the preset monitoring upper limit per unit time.

As described above, the preset monitoring upper limit per unit time corresponding to each cell may be obtained through query in a table based on a subcarrier spacing of an active downlink bandwidth part in the cell. Details are not described herein again.

Optionally, in this implementation, a monitoring upper limit in each unit time may alternatively be determined in different manners based on a number of control resource set pools CORESETPools that are configured for the first scheduling cell and the second scheduling cell. An implementation 2.1 and an implementation 2.2 are separately used for description below. Because the preset monitoring upper limit per unit time corresponding to the first scheduling cell is the same as the preset monitoring upper limit per unit time corresponding to the second scheduling cell, in other words, subcarrier spacings corresponding to the first scheduling cell and the second scheduling cell are the same, the following implementation is described by using the preset monitoring upper limit per unit time corresponding to the first scheduling cell as an example.

Implementation 2.1: The monitoring upper limit in the unit time is determined based on the preset monitoring upper limit per unit time corresponding to one of the scheduling cells. It is assumed that subcarrier spacings of active downlink bandwidth parts in the first scheduling cell and the second scheduling cell are μ.

In the implementation 2.1, the description is provided by using an example in which the monitoring upper limit includes a first upper limit and/or a second upper limit, and the preset monitoring upper limit per unit time correspondingly includes a first preset upper limit and/or a second preset upper limit.

When the first scheduling cell and the second scheduling cell each are not configured with a control resource set pool CORESETPool, or each are configured with a CORESETPool, when the first scheduling cell is configured with a CORESETPool, and the second scheduling cell is not configured with a CORESETPool, when the first scheduling cell is not configured with a CORESETPool, and the second scheduling cell is configured with a CORESETPool, or when the first scheduling cell and the second scheduling cell each are configured with two CORESETPools, for control resource sets corresponding to a same CORESETPool, a monitoring upper limit in a unit time with a subcarrier spacing of μ may include one or more of the following:

a first upper limit corresponding to the first scheduling cell and the second scheduling cell, where the first upper limit corresponding to the first scheduling cell and the second scheduling cell is determined based on a first preset upper limit corresponding to the first scheduling cell;

a second upper limit corresponding to the first scheduling cell and the second scheduling cell, where the second upper limit corresponding to the first scheduling cell and the second scheduling cell is determined based on a second preset upper limit corresponding to the first scheduling cell;

a first upper limit corresponding to each scheduling cell, where the first upper limit corresponding to each scheduling cell is determined based on the first preset upper limit corresponding to the first scheduling cell; and a second upper limit corresponding to each scheduling cell, where the second upper limit corresponding to each scheduling cell is determined based on the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. In addition, the PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with CORESETPool, and the SCell is configured with a CORESETPool, or when the PCell and the SCell each are configured with two CORESETPools, for control resource sets corresponding to a same CORESETPool, a monitoring upper limit in a 30 kHz slot may include:

a first upper limit corresponding to the PCell and the SCell, where the first upper limit is determined based on a first preset upper limit, namely, 36, in the 30 kHz slot in Table 1;

a second upper limit corresponding to the PCell and the SCell, where the second upper limit is determined based on a second preset upper limit, namely, 56, in the 30 kHz slot in Table 2;

a first upper limit corresponding to the PCell or the SCell, where the first upper limit is determined based on the first preset upper limit, namely, 36, in the 30 kHz slot in Table 1; and a second upper limit corresponding to the PCell or the SCell, where the first upper limit is determined based on the second preset upper limit, namely, 56, in the 30 kHz slot in Table 2.

It can be learned that, in this implementation, the monitoring upper limit in the 30 kHz slot may be determined based on Table 1 and Table 2 as the actual monitoring upper limit of the terminal device.

For another example, the PCell and the SCell both are such configured that a monitoring upper limit is determined at a granularity of a span, and the span meets a combination (X, Y). When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORESETPool, or when the PCell and the SCell each are configured with two CORESETPools, for control resource sets corresponding to a same CORESETPool, a monitoring upper limit in a 30 kHz span for a combination (X, Y) may include:

a first upper limit corresponding to the PCell and the SCell, where the first upper limit is determined based on a first preset upper limit in the 30 kHz span for the combination (X, Y) in Table 3;

a second upper limit corresponding to the PCell and the SCell, where the second upper limit is determined based on a second preset upper limit in the 30 kHz span for the combination (X, Y) in Table 4;

a first upper limit corresponding to the PCell or the SCell, where the first upper limit is determined based on the first preset upper limit in the 30 kHz span for the combination (X, Y) in Table 3; and a second upper limit corresponding to the PCell or the SCell, where the second upper limit is determined based on the second preset upper limit in the 30 kHz span for the combination (X, Y) in Table 4.

It can be learned that, in this implementation, the monitoring upper limit in the 30 kHz slot may be determined based on Table 1 and Table 2 as the actual monitoring upper limit of the terminal device; or in this implementation, the monitoring upper limit in the 30 kHz span for the combination (X, Y) may be determined based on Table 3 and Table 4 as the actual monitoring upper limit of the terminal device.

Implementation 2.2: The monitoring upper limit in the same unit time is determined based on a third parameter and a preset monitoring upper limit per unit time in each scheduling cell. The third parameter is used to determine a number of cells corresponding to a scheduled cell scheduled by the scheduling cell configured with the two CORESET-Pools. It is assumed that subcarrier spacings of active downlink bandwidth parts in the first scheduling cell and the second scheduling cell are μ.

Similarly, in the implementation 2.2, the description is provided by using an example in which the monitoring upper limit includes a first upper limit and/or a second upper limit, and the preset monitoring upper limit per unit time correspondingly includes a first preset upper limit and/or a second preset upper limit.

When the first scheduling cell and the second scheduling cell each are configured with two control resource set pools CORESETPools, a monitoring upper limit in a unit time with a subcarrier spacing of μ may include one or more of the following:

a first upper limit corresponding to the first scheduling cell and the second scheduling cell, where the first upper limit corresponding to the first scheduling cell and the second scheduling cell is determined based on the third parameter and a first preset upper limit corresponding to the first scheduling cell;

a second upper limit corresponding to the first scheduling cell and the second scheduling cell, where the second upper limit corresponding to the first scheduling cell and the second scheduling cell is determined based on the third parameter and a second preset upper limit corresponding to the first scheduling cell;

a first upper limit corresponding to each scheduling cell, where the first upper limit corresponding to each scheduling cell is determined based on the third parameter and a first preset upper limit corresponding to each scheduling cell; and a second upper limit corresponding to each scheduling cell, where the second upper limit corresponding to each scheduling cell is determined based on the third parameter and a second preset upper limit corresponding to each scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are configured with two control resource set pools CORESETPools, it is assumed that the third parameter is 7. In this case, a monitoring upper limit in a 30 kHz slot may include:

a first upper limit corresponding to the PCell and the SCell, where the first upper limit is determined based on γ and a first preset upper limit (namely, 36) in the 30 kHz slot in Table 1;

a second upper limit corresponding to the PCell and the SCell, where the second upper limit is determined based on γ and a second preset upper limit (namely, 56) in the 30 kHz slot in Table 2;

a first upper limit corresponding to the PCell or the SCell, where the first upper limit is determined based on γ and the first preset upper limit (namely, 36) in the 30 kHz slot in Table 1; and a second upper limit corresponding to the PCell or the SCell, where the second upper limit is determined based on γ and the second preset upper limit (namely, 56) in the 30 kHz slot in Table 2.

It can be learned that, in this implementation, the monitoring upper limit in the 15 kHz slot and the monitoring upper limit in the 30 kHz slot may be determined based on γ, Table 1, and Table 2 as the actual monitoring upper limit of the terminal device.

For another example, the PCell and the SCell both are such configured that a monitoring upper limit is determined at a granularity of a span, and the span meets a combination (X, Y). When the PCell and the SCell each are configured with two control resource set pools CORESETPools, it is assumed that the third parameter is 7. In this case, a monitoring upper limit in a 30 kHz span for a combination (X, Y) may include one or more of the following:

a first upper limit corresponding to the PCell and the SCell, where the first upper limit is determined based on γ and a first preset upper limit in the 30 kHz span for the combination (X, Y) in Table 3;

a second upper limit corresponding to the PCell and the SCell, where the second upper limit is determined based on γ and a second preset upper limit in the 30 kHz span for the combination (X, Y) in Table 4;

a first upper limit corresponding to the PCell or the SCell, where the first upper limit is determined based on γ and the first preset upper limit in the 30 kHz span for the combination (X, Y) in Table 3; and a second upper limit corresponding to the PCell or the SCell, where the second upper limit is determined based on γ and the second preset upper limit in the 30 kHz span for the combination (X, Y) in Table 4.

It can be learned that, in this implementation, the monitoring upper limit in the 15 kHz span for the combination (X, Y) and the monitoring upper limit in the 30 kHz span for combination (X, Y) may be determined based on γ, Table 3, and Table 4 as the actual monitoring upper limit of the terminal device.

In the implementation 2.1 (to be specific, the first scheduling cell and the second scheduling cell each are not configured with two CORESETPools or the first scheduling cell and the second scheduling cell each are configured with two CORESETPools for CORESETs corresponding to a same CORESETPool) provided in this embodiment of this application, three implementations are described based on whether the first scheduling cell and the second scheduling cell are configured with a first parameter corresponding to the first scheduling cell and the second scheduling cell or whether the first scheduling cell and the second scheduling cell are respectively configured with a first parameter and a second parameter, to specifically determine the monitoring upper limit of the PDCCH candidate in the same unit time. The first parameter is used to determine a number of cells corresponding to a scheduled cell scheduled by the scheduling cell. Optionally, the number of cells may also be referred to as a number of logical cells. An implementation 2.1.1 to an implementation 2.1.3 are separately used for description below. It is assumed that the subcarrier spacings respectively corresponding to the first scheduling cell and the second scheduling cell both are μ.

Implementation 2.1.1: The first scheduling cell and the second scheduling cell are not configured with a first parameter corresponding to the first scheduling cell and the second scheduling cell.

The monitoring upper limit of the PDCCH candidate in the unit time with the subcarrier spacing of μ may include:

the first upper limit corresponding to the first scheduling cell and the second scheduling cell, where the first upper limit corresponding to the first scheduling cell and the second scheduling cell is equal to the first preset upper limit corresponding to the first scheduling cell; and/or the second upper limit corresponding to the first scheduling cell and the second scheduling cell, where the second upper limit corresponding to the first scheduling cell and the second scheduling cell is equal to the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, the SCell is configured with a CORESETPool, or when the PCell and the SCell each are configured with two CORESETPools for control resource sets corresponding to a same CORESETPool; and when the PCell and the SCell are not configured with a first parameter corresponding to the PCell and the SCell, the monitoring upper limit of the PDCCH candidate in the 30 kHz slot may be:

the first upper limit corresponding to the PCell and the SCell, where the first upper limit corresponding to the PCell and the SCell is equal to the first preset upper limit, namely, 36, in the 30 kHz slot in Table 1; and the second upper limit corresponding to the PCell and the SCell, where the second upper limit corresponding to the PCell and the SCell is equal to the second preset upper limit, namely, 56, in the 30 kHz slot in Table 2.

It can be seen that, in the 30 kHz slot, a maximum total number of PDCCH candidates in the PCell and the SCell is 36, and a maximum total number of non-overlapping CCEs in the PCell and the SCell is 56. Therefore, this resolves a problem of how to determine a monitoring upper limit in a unit time in a case in which the PCell and the SCell both schedule the PCell.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Implementation 2.1.2: The first scheduling cell and the second scheduling cell are configured with a first parameter corresponding to the first scheduling cell and the second scheduling cell. It is assumed that the first parameter is a.

The monitoring upper limit of the PDCCH candidate in the unit time with the subcarrier spacing of μ may include:

the first upper limit corresponding to the first scheduling cell and the second scheduling cell, where the first upper limit corresponding to the first scheduling cell and the second scheduling cell is equal to a product of a and the first preset upper limit corresponding to the first scheduling cell; and/or the second upper limit corresponding to the first scheduling cell and the second scheduling cell, where the second upper limit corresponding to the first scheduling cell and the second scheduling cell is equal to a product of a and the second preset upper limit corresponding to the first scheduling cell; and the first upper limit corresponding to each scheduling cell, where the first upper limit corresponding to each scheduling cell is equal to the first preset upper limit corresponding to the first scheduling cell; and/or the second upper limit corresponding to each scheduling cell, where the second upper limit corresponding to each scheduling cell is equal to the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, the SCell is configured with a CORESETPool, or when the PCell and the SCell each are configured with two CORESETPools for control resource sets corresponding to a same CORESETPool; and when the PCell and the SCell are not configured with a first parameter corresponding to the PCell and the SCell, the monitoring upper limit of the PDCCH candidate in the 30 kHz slot may be:

the first upper limit corresponding to the PCell and the SCell, where the first upper limit corresponding to the PCell and the SCell is equal to a product, namely, 36a, of a and the first preset upper limit in the 30 kHz slot in Table 1;

the second upper limit corresponding to the PCell and the SCell, where the second upper limit corresponding to the PCell and the SCell is equal to a product, namely, 56a, of a and the second preset upper limit in the 30 kHz slot in Table 2;

a first upper limit corresponding to each of the PCell and the SCell, where the first upper limit corresponding to each of the PCell and the SCell is equal to the first preset upper limit, namely, 36, in the 30 kHz slot in Table 1; and a second upper limit corresponding to each of the PCell and the SCell, where the second upper limit corresponding to each of the PCell and the SCell is equal to the second preset upper limit, namely, 56, in the 30 kHz slot in Table 2.

In other words, the terminal device does not need to monitor more than 36 a PDCCH candidates and more than 56a non-overlapping CCEs in total in the PCell and the SCell in the 30 kHz slot, and the terminal device does not need to monitor more than 36 PDCCH candidates and more than 56 non-overlapping CCEs in each of the PCell and the SCell in the 30 kHz slot.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Implementation 2.1.3: The first scheduling cell is configured with a first parameter, and the first parameter is represented as $a_1$. The second scheduling cell is configured with a second parameter, and the second parameter is represented as $a_2$. The first parameter $a_1$ is used to determine a number of cells corresponding to a scheduled cell scheduled by the first scheduling cell, and the second parameter $a_2$ is used to determine a number of cells corresponding to a scheduled cell scheduled by the second scheduling cell.

In a solution of the implementation 2.1.3, the monitoring upper limit of the PDCCH candidate in the unit time with the subcarrier spacing of $\mu$ may include:

the first upper limit corresponding to the first scheduling cell, where the first upper limit corresponding to the first scheduling cell is equal to a product of $a_1$ and the first preset upper limit corresponding to the first scheduling cell; and/or the second upper limit corresponding to the first scheduling cell, where the second upper limit corresponding to the first scheduling cell is equal to a product of $a_1$ and the second preset upper limit corresponding to the first scheduling cell; and the first upper limit corresponding to the second scheduling cell, where the first upper limit corresponding to the second scheduling cell is equal to a product of $a_2$ and the first preset upper limit corresponding to the first scheduling cell; and/or the second upper limit corresponding to the second scheduling cell, where the second upper limit corresponding to the second scheduling cell is equal to a product of $a_2$ and the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORESETPool, or when the PCell and the SCell each are configured with two CORESETPools for control resource sets corresponding to a same CORESETPool; and when the PCell is configured with $a_1$ and the SCell is configured with $a_2$, the monitoring upper limit of the PDCCH candidate in the 30 kHz slot may include:

the first upper limit corresponding to the PCell, where the first upper limit corresponding to the PCell is equal to a product, namely, $36\,a_1$, of $a_1$ and the first preset upper limit in the 30 kHz slot in Table 1;

the second upper limit corresponding to the PCell, where the second upper limit corresponding to the PCell is equal to a product, namely, $56\,a_1$, of $a_1$ and the second preset upper limit in the 30 kHz slot in Table 2;

the first upper limit corresponding to the SCell, where the first upper limit corresponding to the SCell is equal to a product, namely, $36\,a_2$, of $a_2$ and the first preset upper limit in the 30 kHz slot in Table 1; and the second upper limit corresponding to the SCell, where the second upper limit corresponding to the SCell is equal to a product, namely, $56\,a_2$, of $a_2$ and the second preset upper limit in the 30 kHz slot in Table 2.

In other words, the terminal device does not need to monitor more than $36\,a_1$ PDCCH candidates and more than $56\,a_1$ non-overlapping CCEs in the PCell in the 30 kHz slot, and the terminal device does not need to monitor more than $36\,a_2$ PDCCH candidates and more than $56\,a_2$ non-overlapping CCEs in the SCell in the 30 kHz slot.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In another solution of the implementation 2.1.3, the monitoring upper limit of the PDCCH candidate in the unit time with the subcarrier spacing of $\mu$ may include:

the first upper limit corresponding to the first scheduling cell and the second scheduling cell, where the first upper limit corresponding to the first scheduling cell and the second scheduling cell is equal to a product of $(a_1+a_2)$ and the first preset upper limit corresponding to the first scheduling cell; and/or the second upper limit corresponding to the first scheduling cell and the second scheduling cell, where the second upper limit corresponding to the first scheduling cell and the second scheduling cell is equal to a product of $(a_1+a_2)$ and the second preset upper limit corresponding to the first scheduling cell; and the first upper limit corresponding to each of the first scheduling cell and the second scheduling cell, where the first upper limit corresponding to each of the first scheduling cell and the second scheduling cell is equal to the first preset upper limit corresponding to the first scheduling cell; and/or the second upper limit corresponding to each of the first scheduling cell and the second scheduling cell, where the second upper limit corresponding to each of the first scheduling cell and the second scheduling cell is equal to the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORESETPool, or when the PCell and the SCell each are configured with two CORESETPools for control resource sets corresponding to a same CORESETPool; and when the PCell is configured with $a_1$ and the SCell is configured with $a_2$, the monitoring upper limit of the PDCCH candidate in the 30 kHz slot may include:

the first upper limit corresponding to the PCell and the SCell, where the first upper limit corresponding to the PCell and the SCell is equal to a product, namely, $36(a_1+a_2)$, of $(a_1+a_2)$ and the first preset upper limit in the 30 kHz slot in Table 1; and the second upper limit corresponding to the PCell and the SCell, where the second upper limit corresponding to the PCell and the SCell is equal to a product, namely, $56(a_1+a_2)$, of $(a_1+a_2)$ and the second preset upper limit in the 30 kHz slot in Table 1; and the first upper limit corresponding to each of the PCell and the SCell, where the first upper limit corresponding to each of the PCell and the SCell is equal to the first preset upper limit, namely, 36, in the 30 kHz slot in Table 1; and the second upper limit corresponding to each of the PCell and the SCell, where the second upper limit corresponding to each of the PCell and the SCell is equal to the second preset upper limit, namely, 56, in the 30 kHz slot in Table 2.

In other words, the terminal device does not need to monitor more than $36(a_1+a_2)$ PDCCH candidates and more than $56(a_1+a_2)$ non-overlapping CCEs in total in the PCell and the SCell in the 30 kHz slot, and the terminal device does not need to monitor more than 36 PDCCH candidates and more than 56 non-overlapping CCEs in each of the PCell and the SCell in the 30 kHz slot.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In still another solution of the implementation 2.1.3, the monitoring upper limit of the PDCCH candidate in the unit time with the subcarrier spacing of μ may include:

the first upper limit corresponding to each of the first scheduling cell and the second scheduling cell, where the first upper limit corresponding to each of the first scheduling cell and the second scheduling cell is equal to the first preset upper limit corresponding to the first scheduling cell; and/or the second upper limit corresponding to each of the first scheduling cell and the second scheduling cell, where the second upper limit corresponding to each of the first scheduling cell and the second scheduling cell is equal to the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, and the SCell is configured with a CORESETPool, or when the PCell and the SCell each are configured with two CORESETPools for control resource sets corresponding to a same CORESETPool; and when the PCell is configured with $a_1$ and the SCell is configured with $a_2$, the monitoring upper limit of the PDCCH candidate in the 30 kHz slot may include:

the first upper limit corresponding to each of the PCell and the SCell, where the first upper limit corresponding to each of the PCell and the SCell is equal to the first preset upper limit, namely, 36, in the 30 kHz slot in Table 1; and the second upper limit corresponding to each of the PCell and the SCell, where the second upper limit corresponding to each of the PCell and the SCell is equal to the second preset upper limit, namely, 56, in the 30 kHz slot in Table 2.

In other words, the terminal device does not need to monitor more than 36 PDCCH candidates and more than 56 non-overlapping CCEs in each of the PCell and the SCell in the 30 kHz slot.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In the implementation 2.2 (to be specific, the first scheduling cell and the second scheduling cell each are configured with two CORESETPools) provided in this embodiment of this application, three implementations are described based on whether the first scheduling cell and the second scheduling cell are configured with a first parameter corresponding to the first scheduling cell and the second scheduling cell or whether the first scheduling cell and the second scheduling cell are respectively configured with a first parameter and a second parameter, to specifically determine the monitoring upper limits of the PDCCH candidate in the first unit time and the second unit time. The first parameter is used to determine a number of cells corresponding to a scheduled cell scheduled by the scheduling cell. Optionally, the number of cells may also be referred to as a number of logical cells. An implementation 2.2.1 to an implementation 2.2.3 are separately used for description below. The third parameter is used to determine a number of cells corresponding to a scheduled cell scheduled by the scheduling cell configured with the two CORESETPools. It is assumed that the third parameter is represented as γ.

Implementation 2.2.1: The first scheduling cell and the second scheduling cell are not configured with a first parameter corresponding to the first scheduling cell and the second scheduling cell.

The monitoring upper limit of the PDCCH candidate in the unit time with the subcarrier spacing of μ may include:

the first upper limit corresponding to the first scheduling cell and the second scheduling cell, where the first upper limit corresponding to the first scheduling cell and the second scheduling cell is equal to the first preset upper limit corresponding to the first scheduling cell; and/or the second upper limit corresponding to the first scheduling cell and the second scheduling cell, where the second upper limit corresponding to the first scheduling cell and the second scheduling cell is equal to the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are not configured with a control resource set pool CORESETPool, or each are configured with a CORESETPool, when the PCell is configured with a CORESETPool, and the SCell is not configured with a CORESETPool, when the PCell is not configured with a CORESETPool, the SCell is configured with a CORESETPool, or when the PCell and the SCell each are configured with two CORESETPools for control resource sets corresponding to a same CORESETPool; and when the PCell and the SCell are not configured with a first parameter corresponding to the PCell and the SCell, the monitoring upper limit of the PDCCH candidate in the 30 kHz slot may be:

the first upper limit corresponding to the PCell and the SCell, where the first upper limit corresponding to the PCell and the SCell is equal to the first preset upper limit, namely, 36, in the 30 kHz slot in Table 1; and the second upper limit corresponding to the PCell and the SCell, where the second upper limit corresponding to the PCell and the SCell is equal to the second preset upper limit, namely, 56, in the 30 kHz slot in Table 2.

It can be seen that, in the 30 kHz slot, a maximum total number of PDCCH candidates in the PCell and the SCell is 36, and a maximum total number of non-overlapping CCEs in the PCell and the SCell is 56. Therefore, this resolves a problem of how to determine a monitoring upper limit in a unit time in a case in which the PCell and the SCell both schedule the PCell.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Implementation 2.2.2: The first scheduling cell and the second scheduling cell are configured with a first parameter corresponding to the first scheduling cell and the second scheduling cell. It is assumed that the first parameter is a.

The monitoring upper limit of the PDCCH candidate in the unit time with the subcarrier spacing of μ may include:

the first upper limit corresponding to the first scheduling cell and the second scheduling cell, where the first upper limit corresponding to the first scheduling cell and the second scheduling cell is equal to a product of a·γ and the first preset upper limit corresponding to the first scheduling cell; and/or the second upper limit corresponding to the first scheduling cell and the second scheduling cell, where the second upper limit corresponding to the first scheduling cell and the second scheduling cell is equal to a product of a·γ and the second preset upper limit corresponding to the first scheduling cell; and the first upper limit corresponding to each scheduling cell, where the first upper limit corresponding to each scheduling cell is equal to a product of γ and the first preset upper limit corresponding to the first scheduling cell; and/or the second upper limit corresponding to each scheduling cell, where the second upper limit corresponding to each scheduling cell is equal to a product of γ and the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The Cell and the SCell both are such configured that a monitoring upper limit is determined at a granularity of a slot. When the PCell and the SCell each are configured with two control resource set pools CORESETPools, and the PCell and the SCell each are configured with a first parameter a corresponding to the PCell and the SCell, the monitoring upper limit of the PDCCH candidate in the 30 kHz slot may be:

the first upper limit corresponding to the PCell and the SCell, where the first upper limit corresponding to the PCell and the SCell is equal to a product, namely, 36 a·γ, of a·γ and the first preset upper limit in the 30 kHz slot in Table 1;

the second upper limit corresponding to the PCell and the SCell, where the second upper limit corresponding to the PCell and the SCell is equal to a product, namely, 56 a·γ, of a·γ and the second preset upper limit in the 30 kHz slot in Table 2;

a first upper limit corresponding to each of the PCell and the SCell, where the first upper limit corresponding to each of the PCell and the SCell is equal to a product, namely, 36γ, of γ and the first preset upper limit in the 30 kHz slot in Table 1; and a second upper limit corresponding to each of the PCell and the SCell, where the second upper limit corresponding to each of the PCell and the SCell is equal to a product, namely, 56γ, of γ and the second preset upper limit in the 30 kHz slot in Table 2.

In other words, the terminal device does not need to monitor more than 36 a·γ PDCCH candidates and more than 56a·γ non-overlapping CCEs in total in the PCell and the SCell in the 30 kHz slot, and the terminal device does not need to monitor more than 36γ PDCCH candidates and more than 56γ non-overlapping CCEs in each of the PCell and the SCell in the 30 kHz slot.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Implementation 2.2.3: The first scheduling cell is configured with a first parameter, and the first parameter is represented as $a_1$. The second scheduling cell is configured with a second parameter, and the second parameter is represented as $a_2$. The first parameter $a_1$ is used to determine a number of cells corresponding to a scheduled cell scheduled by the first scheduling cell, and the second parameter $a_2$ is used to determine a number of cells corresponding to a scheduled cell scheduled by the second scheduling cell.

In a solution of the implementation 2.2.3, the monitoring upper limit of the PDCCH candidate in the unit time with the subcarrier spacing of $\mu$ may include:

the first upper limit corresponding to the first scheduling cell, where the first upper limit corresponding to the first scheduling cell is equal to a product of $a_1 \cdot \gamma$ and the first preset upper limit corresponding to the first scheduling cell; and/or the second upper limit corresponding to the first scheduling cell, where the second upper limit corresponding to the first scheduling cell is equal to a product of $a_1 \cdot \gamma$ and the second preset upper limit corresponding to the first scheduling cell; and the first upper limit corresponding to the second scheduling cell, where the first upper limit corresponding to the second scheduling cell is equal to a product of $a_2 \cdot \gamma$ and the first preset upper limit corresponding to the first scheduling cell; and/or the second upper limit corresponding to the second scheduling cell, where the second upper limit corresponding to the second scheduling cell is equal to a product of $a_2 \cdot \gamma$ and the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are configured with two control resource set pools CORESETPools, the PCell is configured with $a_1$, and the SCell is configured with $a_2$, the monitoring upper limit of the PDCCH candidate in the 30 kHz slot may include:

the first upper limit corresponding to the PCell, where the first upper limit corresponding to the PCell is equal to a product, namely, 36 $a_1 \cdot \gamma$, of $a_1 \cdot \gamma$ and the first preset upper limit in the 30 kHz slot in Table 1;

the second upper limit corresponding to the PCell, where the second upper limit corresponding to the PCell is equal to a product, namely, 56 $a_1 \cdot \gamma$, of $a_1 \cdot \gamma$ and the second preset upper limit in the 30 kHz slot in Table 2;

the first upper limit corresponding to the SCell, where the first upper limit corresponding to the SCell is equal to a product, namely, 36 $a_2 \cdot \gamma$, of $a_2 \cdot \gamma$ and the first preset upper limit in the 30 kHz slot in Table 1; and the second upper limit corresponding to the SCell, where the second upper limit corresponding to the SCell is equal to a product, namely, 56 $a_2 \cdot \gamma$, of $a_2 \cdot \gamma$ and the second preset upper limit in the 30 kHz slot in Table 2.

In other words, the terminal device does not need to monitor more than 36 $a_1 \cdot \gamma$ PDCCH candidates and more than 56 $a_1 \cdot \gamma$ non-overlapping CCEs in the PCell in the 30 kHz slot, and the terminal device does not need to monitor more than $36a_2 \cdot \gamma$ PDCCH candidates and more than 56 $a_2 \cdot \gamma$ non-overlapping CCEs in the SCell in the 30 kHz slot.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In another solution of the implementation 2.2.3, the monitoring upper limit of the PDCCH candidate in the unit time with the subcarrier spacing of $\mu$ may include:

the first upper limit corresponding to the first scheduling cell and the second scheduling cell, where the first upper limit corresponding to the first scheduling cell and the second scheduling cell is equal to a product of $(a_1+a_2) \cdot \gamma$ and the first preset upper limit corresponding to the first scheduling cell; and/or the second upper limit corresponding to the first scheduling cell and the second scheduling cell, where the second upper limit corresponding to the first scheduling cell and the second scheduling cell is equal to a product of $(a_1+a_2) \cdot \gamma$ and the second preset upper limit corresponding to the first scheduling cell; and the first upper limit corresponding to each of the first scheduling cell and the second scheduling cell, where the first upper limit corresponding to each of the first scheduling cell and the second scheduling cell is equal to a product of $\gamma$ and the first preset upper limit corresponding to the first scheduling cell; and/or the second upper limit corresponding to each of the first scheduling cell and the second scheduling cell, where the second upper limit corresponding to each of the first scheduling cell and the second scheduling cell is equal to a product of $\gamma$ and the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are configured with two control resource set pools CORESETPools, the PCell is configured with $a_1$, and the SCell is configured with $a_2$, the monitoring upper limit of the PDCCH candidate in the 30 kHz slot may include:

the first upper limit corresponding to the PCell and the SCell, where the first upper limit corresponding to the PCell and the SCell is equal to a product, namely, 36 $(a_1+a_2) \cdot \gamma$, of $(a_1+a_2) \cdot \gamma$ and the first preset upper limit in the 30 kHz slot in Table 1; and the second upper limit corresponding to the PCell and the SCell, where the second upper limit corresponding to the PCell and the SCell is equal to a product, namely, $56(a_1+a_2) \cdot \gamma$, of $(a_1+a_2) \cdot \gamma$ and the second preset upper limit in the 30 kHz slot in Table 1; and a first upper limit corresponding to each of the PCell and the SCell, where the first upper limit corresponding to each of the PCell and the SCell is equal to a product, namely, $36\gamma$, of $\gamma$ and the first preset upper limit in the 30 kHz slot in Table 1; and a second upper limit corresponding to each of the PCell and the SCell, where the second upper limit corresponding to each of the PCell and the SCell is equal to a product, namely, $56\gamma$, of $\gamma$ and the second preset upper limit in the 30 kHz slot in Table 2.

In other words, the terminal device does not need to monitor more than 36 $(a_1+a_2) \cdot \gamma$ PDCCH candidates and more than $56(a_1+a_2) \cdot \gamma$ non-overlapping CCEs in total in the PCell and the SCell in the 30 kHz slot, and the terminal device does not need to monitor more than $36\gamma$ PDCCH candidates and more than $56\gamma$ non-overlapping CCEs in each of the PCell and the SCell in the 30 kHz slot.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

In still another solution of the implementation 2.2.3, the monitoring upper limit of the PDCCH candidate in the unit time with the subcarrier spacing of μ may include:

the first upper limit corresponding to each of the first scheduling cell and the second scheduling cell, where the first upper limit corresponding to each of the first scheduling cell and the second scheduling cell is equal to a product of γ and the first preset upper limit corresponding to the first scheduling cell; and/or the second upper limit corresponding to each of the first scheduling cell and the second scheduling cell, where the second upper limit corresponding to each of the first scheduling cell and the second scheduling cell is equal to a product of γ and the second preset upper limit corresponding to the first scheduling cell.

For example, it is assumed that a subcarrier spacing of an SCell is 30 kHz, a subcarrier spacing of a PCell is also 30 kHz, and the PCell and the SCell both can schedule the PCell. The PCell and the SCell both are such configured that a monitoring upper limit is determined at a granularity of a slot. When the PCell and the SCell each are configured with two control resource set pools CORESETPools, the PCell is configured with $a_1$, and the SCell is configured with $a_2$, the monitoring upper limit of the PDCCH candidate in the 30 kHz slot may include:

a first upper limit corresponding to each of the PCell and the SCell, where the first upper limit corresponding to each of the PCell and the SCell is equal to a product, namely, 36γ, of γ and the first preset upper limit in the 30 kHz slot in Table 1; and a second upper limit corresponding to each of the PCell and the SCell, where the second upper limit corresponding to each of the PCell and the SCell is equal to a product, namely, 56γ, of γ and the second preset upper limit in the 30 kHz slot in Table 2.

In other words, the terminal device does not need to monitor more than 36γ PDCCH candidates and more than 56γ non-overlapping CCEs in each of the PCell and the SCell in the 30 kHz slot.

In addition, a case in which the PCell and the SCell both are such configured that a monitoring upper limit is determined at a granularity of a span is similar to that in the foregoing example. A difference lies in that different preset monitoring upper limits per unit time are used for different unit times. Therefore, details are not described herein again.

Embodiment 3: Downlink control information transmission method 300.

In the downlink control information transmission method 300, first configuration information may be limited to meet one or more of the foregoing features.

Figure 10:
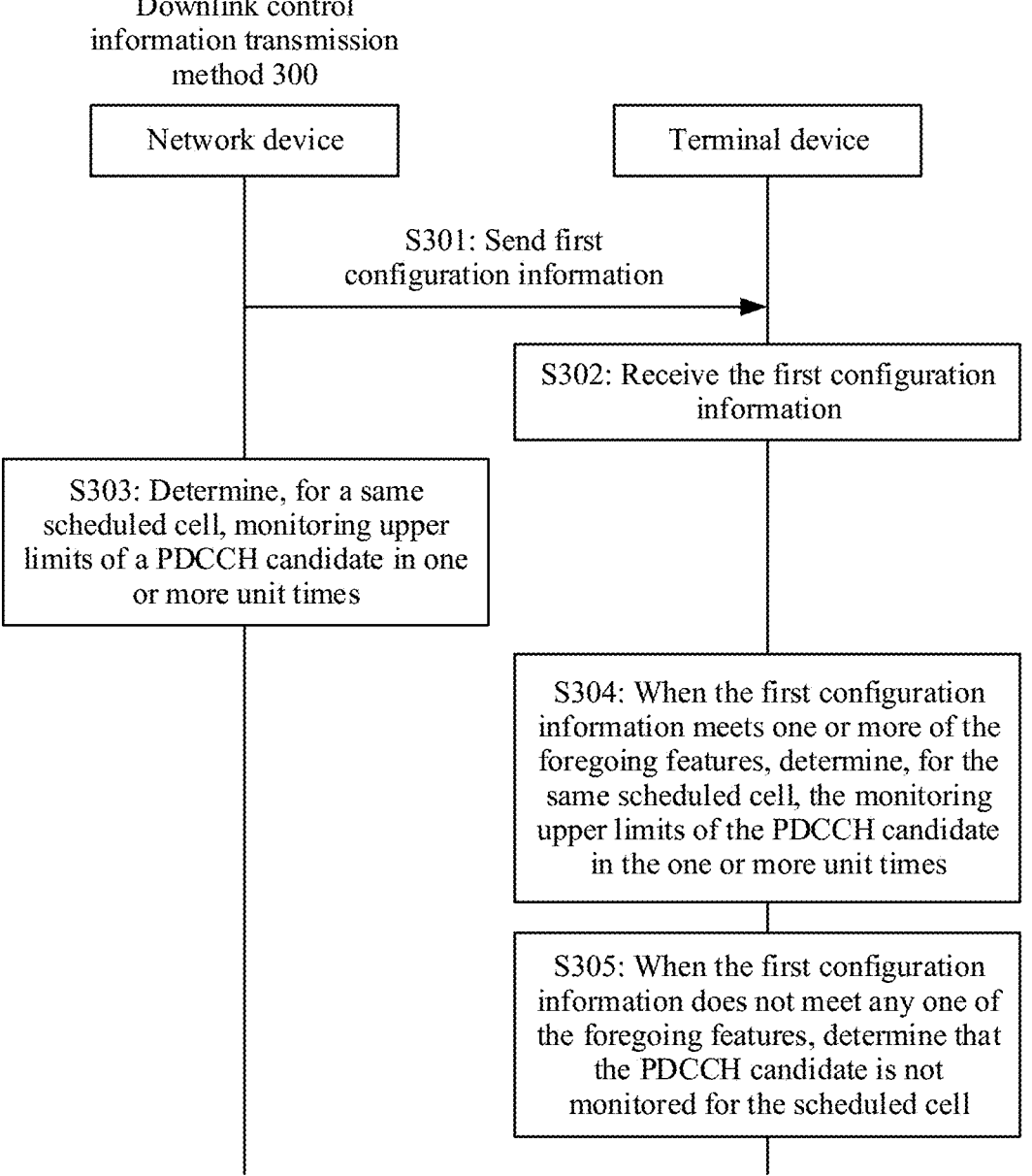
FIG. 10 is a schematic flowchart of a downlink control information transmission method 300 according to an embodiment of this application.

FIG. 10 is a schematic flowchart of the downlink control information transmission method 300 according to an embodiment of this application. As shown in FIG. 10, the downlink control information transmission method 300 may include but is not limited to the following steps.

S301: A network device sends the first configuration information.

S302: A terminal device receives the first configuration information.

The first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell. For some descriptions of the first configuration information, refer to related content in Embodiment 1. Details are not described herein again.

In this embodiment of this application, when the first scheduling cell and the second scheduling cell respectively correspond to different subcarrier spacings, the first configuration information meets one or more of the following features:

(1) the first scheduling cell and the second scheduling cell both are such configured that a monitoring upper limit is determined at a granularity of a slot;

(2) the first scheduling cell and the second scheduling cell both are such configured that a monitoring upper limit is determined at a granularity of a span;

(3) numbers of control resource set pools CORESETPools that are respectively configured for the first scheduling cell and the second scheduling cell are the same and the numbers of the respectively configured CORESET-Pools are 1;

(4) numbers of control resource set pools CORESETPools that are respectively configured for the first scheduling cell and the second scheduling cell are the same and the numbers of the respectively configured CORESET-Pools are 2;

(5) the first scheduling cell is configured with a control resource set pool CORESETPool, and the second scheduling cell is not configured with a CORESET-Pool; or (6) the first scheduling cell is not configured with a control resource set pool CORESETPool, and the second scheduling cell is configured with a CORESETPool; or (7) the first scheduling cell and the second scheduling cell both are such configured that a monitoring upper limit is determined at a granularity of a span, and monitoring is performed in the first monitoring cell and the second monitoring cell by using a combination (X, Y), where there is a symbol group, in the second scheduling cell, whose start location overlaps a start location of any symbol group in the first scheduling cell, every X symbols constitute a symbol group, the subcarrier spacing of the active downlink bandwidth part in the first scheduling cell is greater than the subcarrier spacing of the active downlink bandwidth part in the second scheduling cell, the combination (X, Y) indicates that an interval between start symbols of two consecutive spans is not less than X symbols, and each span is not greater than Y symbols.

Optionally, for the feature (1), that the first scheduling cell and the second scheduling cell both are such configured that the monitoring upper limit is determined at the granularity of the slot may be: The first scheduling cell and the second scheduling cell each are not configured with an r16 monitoring capability; the first scheduling cell and the second scheduling cell each are not configured with a monitoring capability configuration-r16 that is equal to an r16 monitoring capability; the first scheduling cell and the second scheduling cell each are not configured with a monitoring capability configuration-r16; the first scheduling cell and the second scheduling cell each are configured with a monitoring capability configuration-r16 that is equal to an r15 monitoring capability; the first scheduling cell and the second scheduling cell each are configured with an r15 monitoring capability; or the first scheduling cell is configured with a monitoring capability configuration-r16 that is equal to an r15 monitoring capability, and the second scheduling cell is not configured with a monitoringCapabilityConfig-r16.

Optionally, for the feature (2), that the first scheduling cell and the second scheduling cell both are such configured that the monitoring upper limit is determined at the granularity of the span may be: The first scheduling cell and the second scheduling cell each are configured with an r16 monitoring capability, or the first scheduling cell and the second scheduling cell each are configured with a monitoring capability configuration-r16 that is equal to an r16 monitoring capability. For a schematic diagram of one span, refer to related content in FIG. 5. Details are not described herein again.

Optionally, for the features (3) and (4), the control resource set pools CORESETPools that are respectively configured for the first scheduling cell and the second scheduling cell may be control resource set pool indexes CORESETPoolIndexes that are respectively configured for the first scheduling cell and the second scheduling cell. Correspondingly, a number of CORESETPools may be a number of CORESETPoolIndexes.

Figure 11:
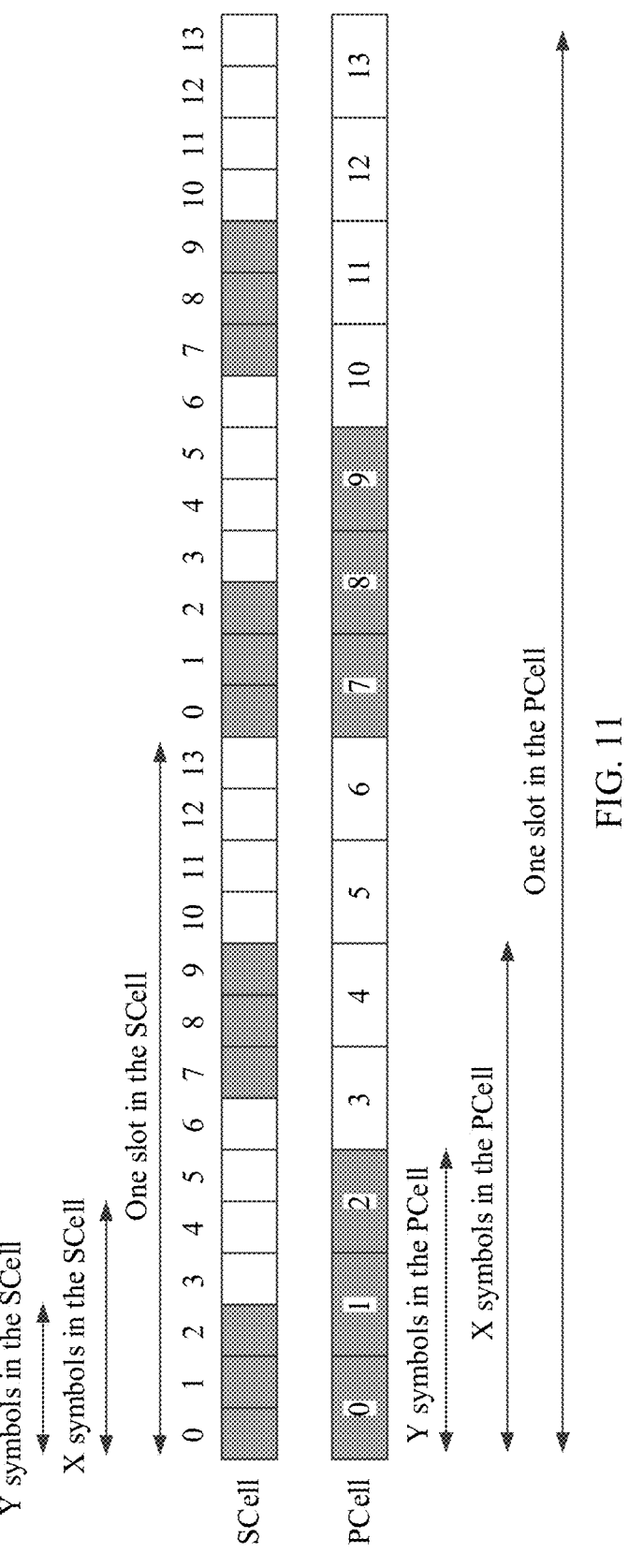
FIG. 11 shows that there are X symbols, in a CC 2, in which a start symbol overlaps a start symbol in every X symbols in a CC 1 according to an embodiment of this application.

For the feature (7), for example, as shown in FIG. 11, it is assumed that a subcarrier spacing of an active downlink bandwidth part in an SCell is greater than a subcarrier spacing of an active downlink bandwidth part in a PCell, the first scheduling cell and the second scheduling cell both are such configured that the monitoring upper limit is determined at the granularity of the span, and monitoring is performed in the first monitoring cell and the second monitoring cell by using a combination (4, 3). To be specific, in FIG. 7, X is equal to 4, and Y is equal to 3. In this case, there are four symbols (a symbol group), in the PCell, whose start location overlaps a start location of any four symbols (a symbol group) in the SCell. To be specific, there are four symbols in the PCell, for example, a symbol 0 to a symbol 3 in the PCell, in which a start symbol overlaps a start symbol in every four symbols in the SCell, for example, a symbol 0 to a symbol 3.

In this embodiment of this application, when the first scheduling cell and the second scheduling cell separately correspond to a same subcarrier spacing, the first configuration information meets one or more of the following features:

(1) the first scheduling cell and the second scheduling cell both are such configured that a monitoring upper limit is determined at a granularity of a slot;

(2) the first scheduling cell and the second scheduling cell both are such configured that a monitoring upper limit is determined at a granularity of a span;

(3) numbers of control resource set pools CORESETPools that are respectively configured for the first scheduling cell and the second scheduling cell are the same and the numbers of the respectively configured CORESET-Pools are 1;

(4) numbers of control resource set pools CORESETPools that are respectively configured for the first scheduling cell and the second scheduling cell are the same and the numbers of the respectively configured CORESET-Pools are 2;

(5) the first scheduling cell is configured with a control resource set pool CORESETPool, and the second scheduling cell is not configured with a CORESET-Pool; or (6) the first scheduling cell and the second scheduling cell both are such configured that a monitoring upper limit is determined at a granularity of a span, and monitoring is performed in the first monitoring cell and the second monitoring cell by using a combination (X, Y), where the combination (X, Y) indicates that an interval between start symbols of two consecutive spans is not less than X symbols, and each span is not greater than Y symbols.

For descriptions of the feature (1) to the feature (5), refer to the foregoing related parameters of different subcarrier spacings. Details are not described herein again.

Correspondingly, the method further includes the following steps.

S303: The network device determines, for the same scheduled cell, monitoring upper limits of the PDCCH candidate in one or more unit times.

S304: When the first configuration information meets one or more of the foregoing features, the terminal device determines, for the same scheduled cell, the monitoring upper limits of the PDCCH candidate in the one or more unit times.

One or more unit times are determined based on subcarrier spacings of active downlink bandwidth parts in one or more scheduling cells in the first scheduling cell and the second scheduling cell. For example, for determining the monitoring upper limits of PDCCH candidate in a plurality of unit times for the same scheduled cell, refer to related descriptions in Embodiment 1. For determining a monitoring upper limit of the PDCCH candidate in a same unit time for the same scheduled cell, refer to related descriptions in Embodiment 2.

To be specific, when the first scheduling cell and the second scheduling cell separately correspond to the same subcarrier spacing, the step S303 or the S304 includes: determining the monitoring upper limit of the PDCCH candidate in the same unit time for the same scheduled cell. Optionally, for the description of the step S303 or the S304, refer to related content in Embodiment 2. Details are not described herein again.

Optionally, when the first scheduling cell and the second scheduling cell respectively correspond to different subcarrier spacings, the step S303 or the S304 includes: determining monitoring upper limits of the PDCCH candidate in a first unit time and a second unit time for the same scheduled cell. Optionally, for the description of the step S303 or the S304, refer to related content in Embodiment 1. Details are not described herein again.

Correspondingly, in the method, the terminal device may receive the first configuration information, and expects that the first configuration information meets one or more of the foregoing features. When the first configuration information does not meet any one of the foregoing features, it may be determined that the PDCCH candidate is not monitored for the scheduled cell. Optionally, the method further includes the following step.

S305: When the first configuration information does not meet any one of the foregoing features, the terminal device determines that the PDCCH candidate is not monitored for the scheduled cell.

Optionally, when the first configuration information does not meet any one of the foregoing features, the terminal device may determine that the monitoring upper limit of the PDCCH candidate is not calculated for the scheduled cell.

In addition, in this embodiment of this application, from another perspective, when the first scheduling cell and the second scheduling cell respectively correspond to different subcarrier spacings, and the first configuration information does not meet one or more of the following features, the terminal determines to calculate the monitoring upper limit of the PDCCH candidate:

(1) one scheduling cell in the first scheduling cell and the second scheduling cell is such configured that a monitoring upper limit is determined at a granularity of a slot, and the other scheduling cell is such configured that a monitoring upper limit is determined at a granularity of a span;

(2) a number of CORESETPools configured for one scheduling cell in the first scheduling cell and the second scheduling cell is 2, and a number of CORESETPools configured for the other scheduling cell is 1;

(3) a number of CORESETPools configured for one scheduling cell in the first scheduling cell and the second scheduling cell is 2, and the other scheduling cell is not configured with a CORESETPool; or (4) the first scheduling cell and the second scheduling cell both are such configured that a monitoring upper limit is determined at a granularity of a span, and monitoring is performed in the first monitoring cell and the second monitoring cell by using different combinations $(X, Y)$, where the combination $(X, Y)$ indicates that an interval between start symbols of two consecutive spans is not less than X symbols, and each span is not greater than Y symbols; or (5) the first scheduling cell and the second scheduling cell both are such configured that a monitoring upper limit is determined at a granularity of a span, and monitoring is performed in the first monitoring cell and the second monitoring cell by using a combination $(X, Y)$, where there is no symbol group, in the second scheduling cell, whose start location overlaps a start location of at least one symbol group in the first scheduling cell, every X symbols constitute a symbol group, the combination $(X, Y)$ indicates that an interval between start symbols of two consecutive spans is not less than X symbols, and each span is not greater than Y symbols.

In this embodiment of this application, from another perspective, the first scheduling cell and the second scheduling cell separately correspond to the same subcarrier spacing, and the first configuration information does not meet one or more of the following features, the terminal determines to calculate the monitoring upper limit of the PDCCH candidate:

(1) one scheduling cell in the first scheduling cell and the second scheduling cell is such configured that a monitoring upper limit is determined at a granularity of a slot, and the other scheduling cell is such configured that a monitoring upper limit is determined at a granularity of a span;

(2) a number of CORESETPools configured for one scheduling cell in the first scheduling cell and the second scheduling cell is 2, and a number of CORESETPools configured for the other scheduling cell is 1;

(3) a number of CORESETPools configured for one scheduling cell in the first scheduling cell and the second scheduling cell is 2, and the other scheduling cell is not configured with a CORESETPool; or (4) the first scheduling cell and the second scheduling cell both are such configured that a monitoring upper limit is determined at a granularity of a span, and monitoring is performed in the first monitoring cell and the second monitoring cell by using different combinations $(X, Y)$, where the combination $(X, Y)$ indicates that an interval between start symbols of two consecutive spans is not less than X symbols, and each span is not greater than Y symbols.

It can be learned that this implementation limits related features of the first configuration information. This helps determine the monitoring upper limit of the PDCCH candidate per unit time under some restrictive conditions, thereby simplifying processing complexity.

Embodiment 4: Downlink control information transmission method 400.

In the downlink control information transmission method 400, for a plurality of scheduled cells, a monitoring upper limit of all PDCCH candidates in a plurality of scheduling cells in a unit time with a subcarrier spacing of $\mu$ may be determined.

Figure 12:
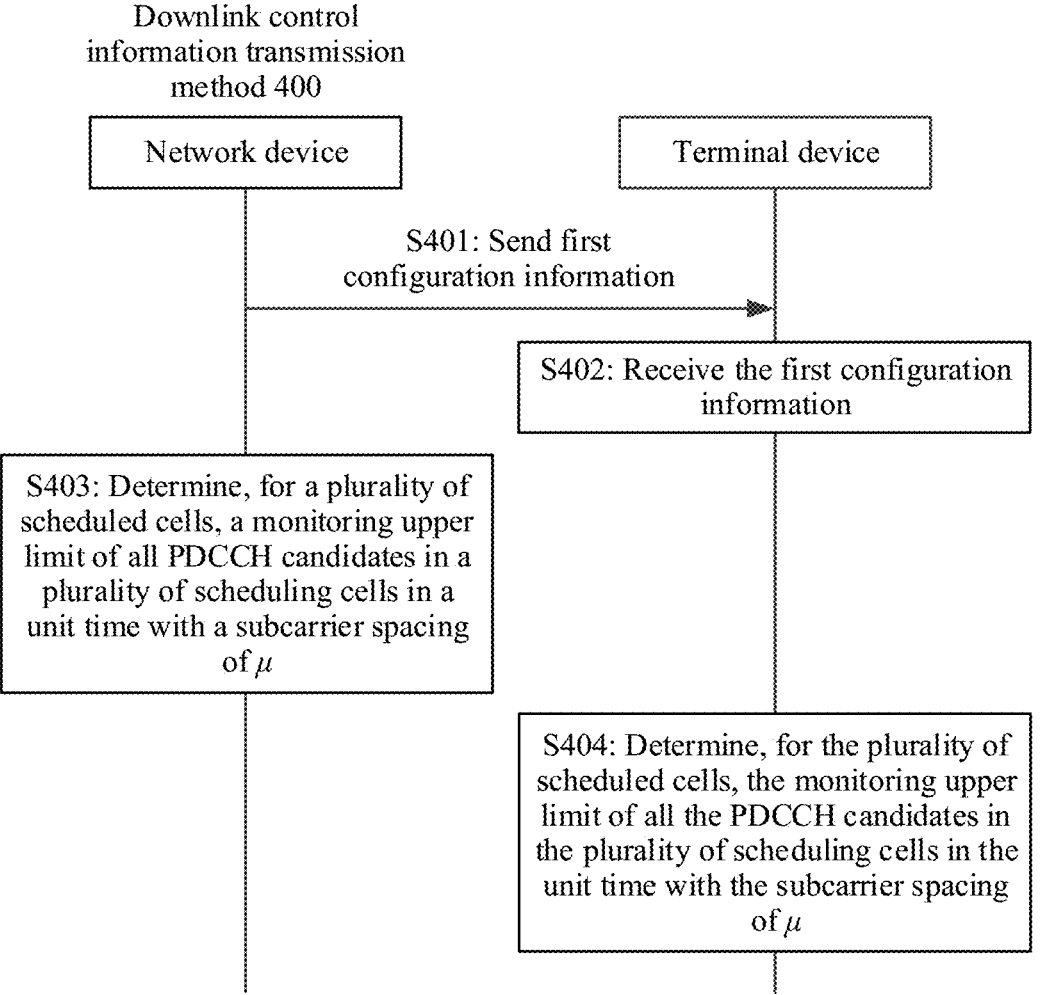
FIG. 12 is a schematic flowchart of a downlink control information transmission method 400 according to an embodiment of this application.

FIG. 12 is a schematic flowchart of the downlink control information transmission method 400 according to an embodiment of this application. The downlink control information transmission method 400 may include but is not limited to the following steps.

S401: A network device sends first configuration information.

S402: A terminal device receives the first configuration information.

S403: The network device determines, for the plurality of scheduled cells, the monitoring upper limit of all PDCCH candidates in the plurality of scheduling cells in the unit time with the subcarrier spacing of $\mu$.

S404: The terminal device determines, for the plurality of scheduled cells, the monitoring upper limit of all PDCCH candidates in the plurality of scheduling cells in the unit time with the subcarrier spacing of $\mu$.

The plurality of scheduling cells are all scheduling cells in which a subcarrier spacing of an active downlink bandwidth part is $\mu$ in cells connected to the terminal device, and the plurality of scheduled cells are all scheduled cells that are respectively scheduled by the plurality of scheduling cells. Optionally, the plurality of scheduling cells may include a scheduling cell for self-scheduling and a scheduling cell for cross-carrier scheduling.

Optionally, for the plurality of scheduled cells, a monitoring upper limit of PDCCH candidates in all scheduling cells in which the subcarrier spacing of the active downlink bandwidth part is $\mu$ in the unit time with the subcarrier spacing of $\mu$ may also be referred to as an actual monitoring upper limit of the terminal device for the plurality of scheduled cells.

Optionally, the network device may first determine the first configuration information, perform the step 403 of determining the actual monitoring upper limit of the terminal device, and then perform the step 401 of sending the first configuration information to the terminal device, and the terminal device performs the steps S402 and S404. In another optional implementation, the network device may also jointly determine the first configuration information and the actual monitoring upper limit of the terminal device for the plurality of scheduled cells, and then perform the step 401 of sending the first configuration information to the terminal device, and the terminal device performs the steps S402 and S404.

In an optional implementation, for the plurality of scheduled cells, the monitoring upper limit is determined based on a preset monitoring upper limit per unit time corresponding to the scheduling cell in which the subcarrier spacing is $\mu$. Specifically, in the unit time with the subcarrier spacing of $\mu$, for the plurality of scheduled cells, a maximum total number of PDCCH candidates in the plurality of scheduling cells is determined based on a preset maximum number of PDCCH candidates in one scheduling cell in which the subcarrier spacing is $\mu$; and a maximum total number of non-overlapping CCEs in the plurality of scheduling cells is determined based on a preset maximum number of non-overlapping CCEs in one scheduling cell in which the subcarrier spacing is $\mu$.

The preset maximum number of PDCCH candidates in one scheduling cell in which the subcarrier spacing is and the preset maximum number of non-overlapping CCEs in one scheduling cell in which the subcarrier spacing is μ may be obtained through query in a table with reference to the description in Embodiment 1.

Optionally, for the plurality of scheduled cells, the monitoring upper limit of all PDCCH candidates in the plurality of scheduling cells in the unit time with the subcarrier spacing of μ is determined based on a number of control resource set pools CORESETPools configured for the first scheduling cell and the second scheduling cell in different implementations. The preset maximum number of PDCCH candidates in one scheduling cell in which the subcarrier spacing is μ is determined in the following implementations.

Implementation 4.1: When the plurality of scheduling cells in which the subcarrier spacing of the active downlink bandwidth part is μ all are such configured that the monitoring upper limit is determined at the granularity of the slot, and when the plurality of scheduling cells each are not configured with a control resource set pool CORESETPool, or each are configured with a CORESETPool; one of the plurality of scheduling cells is configured with a CORE-SETPool, and the other scheduling cells are not configured with a CORESETPool; or the plurality of scheduling cells each are configured with two CORESETPools, for control resource sets corresponding to a same CORESETPool, a maximum total number $$M_{PDCCH}^{total,slot,\mu}$$

of PDCCH candidates in the plurality of scheduling cells in a slot with a subcarrier spacing of μ is:

$$M_{PDCCH}^{total,slot,\mu} = \left\lfloor \frac{N_\mu}{N_{total}} \cdot M_{PDCCH}^{max,slot,\mu} \cdot N_{terminal\ device\ capability} \right\rfloor;$$

and
a maximum total number $$C_{PDCCH}^{total,slot,\mu}$$

of non-overlapping CCEs in the plurality of scheduling cells in the slot with the subcarrier spacing of μ is:

$$C_{PDCCH}^{total,slot,\mu} = \left\lfloor \frac{N_\mu}{N_{total}} \cdot C_{PDCCH}^{max,slot,\mu} \cdot N_{terminal\ device\ capability} \right\rfloor.$$

$N_\mu$ indicates a number of cells corresponding to the plurality of scheduled cells that are respectively scheduled by the plurality of scheduling cells; $N_{total}$ indicates a total number of all scheduled cells that are respectively scheduled by all scheduling cells corresponding to all subcarrier spacings of active downlink bandwidth parts;

$$M_{PDCCH}^{max,t,\mu}$$

indicates a first preset upper limit (namely, a preset upper limit of a PDCCH candidate per unit time in a single cell) corresponding to one scheduling cell in which a subcarrier spacing of an active downlink bandwidth part is $$\mu; C_{PDCCH}^{max,t,\mu}$$

indicates a preset upper limit (namely, a preset upper limit of a PDCCH candidate per unit time in a single cell) corresponding to one scheduling cell in which a subcarrier spacing of an active downlink bandwidth part is μ; $N_{terminal\ device\ capability}$ indicates a number of cells, reported by the terminal device, that can be monitored. Optionally, $N_{terminal\ device\ capability}$ is a preset value, and indicates a number of cells that can be supported by the terminal device.

Implementation 4.2: Compared with the foregoing implementation 4.1, in addition to the restrictive condition in the implementation 4.1, this implementation further includes: When a plurality of scheduling cells in which a subcarrier spacing of an active downlink bandwidth part is μ together correspond to a first parameter a,
a maximum total number $$M_{PDCCH}^{total,slot,\mu}$$

of PDCCH candidates in the plurality of scheduling cells in a slot with a subcarrier spacing of μ is:

$$M_{PDCCH}^{total,slot,\mu} = \left\lfloor \frac{aN_\mu}{N_{total} + (a-1)N_\mu} \cdot M_{PDCCH}^{max,slot,\mu} \cdot N_{terminal\ device\ capability} \right\rfloor;$$

and
a maximum total number $$C_{PDCCH}^{total,slot,\mu}$$

of non-overlapping CCEs in the plurality of scheduling cells in the slot with the subcarrier spacing of μ is:

$$C_{PDCCH}^{total,slot,\mu} = \left\lfloor \frac{aN_\mu}{N_{total} + (a-1)N_\mu} \cdot C_{PDCCH}^{max,slot,\mu} \cdot N_{terminal\ device\ capability} \right\rfloor.$$

The first parameter a is used to determine a number of cells corresponding to a scheduled cell scheduled by the scheduling cell in which the subcarrier spacing of the active downlink bandwidth part is μ.

Implementation 4.3: The plurality of scheduling cells in which the subcarrier spacing of the active downlink bandwidth part is μ all are such configured that the monitoring upper limit is determined at the granularity of the slot; and the plurality of scheduling cells include:

$$N_{cells,0}^{DL,\mu}$$

first-type scheduling cells, where the first-type scheduling cell is a scheduling cell in which a subcarrier spacing is μ, that is not configured with two control resource set pools CORESETPools, and that does not schedule a scheduled cell together with another scheduling cell;

$$N_{cells,1}^{DL,\mu}$$

second-type scheduling cells, where the second-type scheduling cell is a scheduling cell in which a subcarrier spacing is μ, that is configured with two CORESETPools, and that does not schedule a scheduled cell together with another scheduling cell;

$$N_{cells,2}^{DL,\mu}$$

third-type scheduling cells, where the third-type scheduling cell is a scheduling cell in which a subcarrier spacing is μ, that is not configured with two CORESETPools, and that schedules a scheduled cell together with another scheduling cell; and $$N_{cells,3}^{DL,\mu}$$

fourth-type scheduling cells, where the fourth-type scheduling cell is a scheduling cell in which a subcarrier spacing is μ, that is configured with two CORESETPools, and that schedules a scheduled cell together with another scheduling cell.

A number of cells corresponding to a scheduled cell scheduled by each third-type scheduling cell or each fourth-type scheduling cell is equal to $a_\mu$.

In all scheduling cells corresponding to all subcarrier spacings of active downlink bandwidth parts, a number of scheduling cells in which a subcarrier spacing of an active downlink bandwidth part is a subcarrier spacing with an index j, that each are not configured with two control resource set pool indexes CORESET-Pools, and that do not schedule a scheduled cell together with another scheduling cell is $$N_{cells,0}^{DL,j};$$

a number of scheduling cells in which a subcarrier spacing of an active downlink bandwidth part is a subcarrier spacing with an index j, that each are configured with two CORESETPools, and that do not schedule a scheduled cell together with another scheduling cell is $$N_{cells,1}^{DL,j};$$

a number of scheduling cells in which a subcarrier spacing of an active downlink bandwidth part is a subcarrier spacing with an index j, that each are not configured with two CORESETPools, and that schedule a scheduled cell together with another scheduling cell is $$N_{cells,2}^{DL,j};$$

a number of scheduling cells in which a subcarrier spacing of an active downlink bandwidth part is a subcarrier spacing with an index j, that each are configured with two CORESETPools, and that schedule a scheduled cell together with another scheduling cell is $$N_{cells,3}^{DL,j};$$

and a number of cells corresponding to a scheduled cell scheduled by a scheduling cell in which a subcarrier spacing of an active downlink bandwidth part is a subcarrier spacing with an index j is equal to $a_j$.

$N_{terminal\ device\ capability}$ indicates a number of cells, reported by the terminal device, that can be monitored.

In this case, a maximum total number $$M_{PDCCH}^{total,slot,\mu}$$

of PDCCH candidates in the plurality of scheduling cells in a slot with a subcarrier spacing of μ is:

$$M_{PDCCH}^{total,slot,\mu} = \left\lfloor \frac{N_{cells,0}^{DL,\mu} + \gamma \cdot N_{cells,1}^{DL,\mu} + a_\mu \cdot N_{cells,2}^{DL,\mu} + a_\mu \cdot \gamma \cdot N_{cells,3}^{DL,\mu}}{\sum_{j=0}^{3}\left(N_{cells,0}^{DL,j} + \gamma \cdot N_{cells,1}^{DL,j} + a_j \cdot N_{cells,2}^{DL,j} + a_j \cdot \gamma \cdot N_{cells,3}^{DL,j}\right)} \cdot M_{PDCCH}^{max,slot,\mu} \cdot N_{terminal\ device\ capability} \right\rfloor;$$

and a maximum total number $$C_{PDCCH}^{total,slot,\mu}$$

of non-overlapping CCEs in the plurality of scheduling cells in the slot with the subcarrier spacing of μ is:

$$C_{PDCCH}^{total,slot,\mu} = \left\lfloor \frac{N_{cells,0}^{DL,\mu} + \gamma \cdot N_{cells,1}^{DL,\mu} + a_\mu \cdot N_{cells,2}^{DL,\mu} + a_\mu \cdot \gamma \cdot N_{cells,3}^{DL,\mu}}{\sum_{j=0}^{3}\left(N_{cells,0}^{DL,j} + \gamma \cdot N_{cells,1}^{DL,j} + a_j \cdot N_{cells,2}^{DL,j} + a_j \cdot \gamma \cdot N_{cells,3}^{DL,j}\right)} \cdot C_{PDCCH}^{max,slot,\mu} \cdot N_{terminal\ device\ capability} \right\rfloor.$$

γ is used to determine a number of cells corresponding to a scheduled cell scheduled by the scheduling cell configured with the two CORESETPools.

Implementation 4.4: The plurality of scheduling cells in which the subcarrier spacing of the active downlink bandwidth part is μ all are such configured that the monitoring upper limit is determined at the granularity of the slot; and the plurality of scheduling cells include:

$$N_{cells,0}^{DL,\mu}$$

first-type scheduling cells, where the first-type scheduling cell is a scheduling cell in which a subcarrier spacing is $\mu$, that is not configured with two control resource set pool indexes (CORESETPoolIndexes), and that does not schedule a scheduled cell together with another scheduling cell;

$$N_{cells,1}^{DL,\mu}$$

second-type scheduling cells, where the second-type scheduling cell is a scheduling cell in which a subcarrier spacing is $\mu$, that is configured with two CORESETPoolIndexes, and that does not schedule a scheduled cell together with another scheduling cell;

$\quad$ $a_{\mu k}$ cells corresponding to a scheduled cell scheduled by a $(k+1)^{th}$ third-type scheduling cell, where $0 \leq k \leq K_\mu$, the third-type scheduling cell is a scheduling cell in which a subcarrier spacing is $\mu$, that is not configured with two CORESETPoolIndexes, and that schedules a scheduled cell together with another scheduling cell;

$\quad$ $a_{\mu l}$ cells corresponding to a scheduled cell scheduled by an $(l+1)^{th}$ fourth-type scheduling cell, where $0 \leq l \leq L_\mu$, the fourth-type scheduling cell is a scheduling cell in which a subcarrier spacing is $\mu$, that is configured with two CORESETPoolIndexes, and that schedules a scheduled cell together with another scheduling cell.

In all scheduling cells corresponding to all subcarrier spacings of active downlink bandwidth parts, $\quad$ a number of scheduling cells in which a subcarrier spacing of an active downlink bandwidth part is a subcarrier spacing with an index j, that are not configured with two control resource set pool indexes, and that do not schedule a scheduled cell together with another scheduling cell is $$N_{cells,0}^{DL,j};$$

$\quad$ a number of scheduling cells in which a subcarrier spacing of an active downlink bandwidth part is a subcarrier spacing with an index j, that each are configured with two CORESETPoolIndexes, and that do not schedule a scheduled cell together with another scheduling cell is $$N_{cells,1}^{DL,j};$$

$\quad$ a number of cells corresponding to a scheduled cell scheduled by a $(k+1)^{th}$ scheduling cell in which a subcarrier spacing of an active downlink bandwidth part is a subcarrier spacing with an index j, that is not configured with two CORESETPoolIndexes, and that schedules the scheduled cell together with another scheduling cell is $a_{jk}$, where $0 \leq k \leq K_j$; and $\quad$ a number of cells corresponding to a scheduled cell scheduled by an $(l+1)^{th}$ scheduling cell in which a subcarrier spacing of an active downlink bandwidth part is a subcarrier spacing with an index j, that is configured with two CORESETPoolIndexes, and that schedules the scheduled cell together with another scheduling cell is $a_{jl}$, where $0 \leq l \leq L_j$.

$N_{terminal\ device\ capability}$ indicates a number of cells, reported by the terminal device, that can be monitored.

In this case, a maximum total number $$M_{PDCCH}^{total,slot,\mu}$$

of PDCCH candidates in the plurality of scheduling cells in a slot with a subcarrier spacing of $\mu$ is:

$$M_{PDCCH}^{total,slot,\mu} = \left| \frac{N_{cells,0}^{DL,\mu} + \gamma \cdot N_{cells,1}^{DL,\mu} + \sum_{k=0}^{K_\mu-1} a_{\mu k} + \gamma \cdot \sum_{l=0}^{L_\mu-1} a_{\mu l}}{\sum_{j=0}^{3}\left(N_{cells,0}^{DL,j} + \gamma \cdot N_{cells,1}^{DL,j} + \sum_{k=0}^{K_j-1} a_{jk} + \gamma \cdot \sum_{l=0}^{L_j-1} a_{jl}\right)} \right.$$
$$\left. M_{PDCCH}^{max,slot,\mu} \cdot N_{terminal\ device\ capability} \right];$$

and $\quad$ a maximum total number $$C_{PDCCH}^{total,slot,\mu}$$

of non-overlapping CCEs in the plurality of scheduling cells in the slot with the subcarrier spacing of $\mu$ is:

$$M_{PDCCH}^{total,slot,\mu} = \left| \frac{N_{cells,0}^{DL,\mu} + \gamma \cdot N_{cells,1}^{DL,\mu} + \sum_{k=0}^{K_\mu-1} a_{\mu k} + \gamma \cdot \sum_{l=0}^{L_\mu-1} a_{\mu l}}{\sum_{j=0}^{3}\left(N_{cells,0}^{DL,j} + \gamma \cdot N_{cells,1}^{DL,j} + \sum_{k=0}^{K_j-1} a_{jk} + \gamma \cdot \sum_{l=0}^{L_j-1} a_{jl}\right)} \right.$$
$$\left. M_{PDCCH}^{max,slot,\mu} \cdot N_{terminal\ device\ capability} \right|.$$

$\gamma$ is used to determine a number of cells corresponding to a scheduled cell scheduled by the scheduling cell configured with the two CORESETPools.

In an implementation, in Embodiment 1, Embodiment 2, and Embodiment 4, the first parameter a may be configured by the network device. For example, a is equal to 1 or 2. In another implementation, in Embodiment 1, Embodiment 2, and Embodiment 4, the first parameter $a_1$ and the second parameter $a_2$ may be configured by the network device. For example, $a_1=0.5$, and $a_2=0.5$; $a_1=1$, and $a_2=1$; or $0 \leq a_1 \leq 1$, $0 \leq a_2 \leq 1$, and $a_1+a_2=1$. In still another implementation, $a_1$ and $a_2$ may be determined based on a configured by the network device. For example, $a_1=a_2=a/2$, or $a_1=a_2=a$.

In addition, in this application, that the first scheduling cell and the second scheduling cell are not configured with two CORESETPools may be: The first scheduling cell and the second scheduling cell each are not configured with a control resource set pool CORESETPool; the first scheduling cell and the second scheduling cell each are configured with a CORESETPool; the first scheduling cell is configured with a CORESETPool, and the second scheduling cell is not configured with a CORESETPool; or the first scheduling cell is not configured with a CORESETPool, and the second scheduling cell is configured with a CORESETPool.

Optionally, the embodiment 4 may be combined with the foregoing embodiments 1 to 3, so that monitoring upper limits of a PDCCH candidate in one or more unit times are determined for one scheduled cell, and then a monitoring upper limit of a PDCCH candidate in the unit time is determined for a plurality of scheduled cells. Therefore, the network device sends a PDCCH-related configuration to the terminal device based on these monitoring upper limits. Correspondingly, the terminal device monitors, based on these monitoring upper limits, a PDCCH candidate used to carry each DCI for scheduling one or more scheduled cells.

In this embodiment of this application, in an implementation, as described above, the plurality of scheduling cells all are such configured that the monitoring upper limit is determined at the granularity of the slot. In another implementation, the plurality of scheduling cells all are such configured that the monitoring upper limit is determined at the granularity of the span. For related content in this implementation, refer to the foregoing related content of determining the monitoring upper limit at the granularity of the slot. A difference lies in that the unit time is a span with a subcarrier spacing of $\mu$ for a combination (X, Y). Correspondingly, in this implementation $$M_{PDCCH}^{total,slot,\mu}$$

may be replaced with $$M_{PDCCH}^{total,(X,Y),\mu},$$

to indicate an upper limit of total PDCCH candidates in a plurality of scheduling cells per span;

$$M_{PDCCH}^{max,slot,\mu}$$

may be replaced with $$M_{PDCCH}^{max,(X,Y),\mu},$$

to indicate a preset upper limit of PDCCH candidates in one scheduling cell per span; C $$C_{PDCCH}^{total,slot,\mu}$$

may be replaced with $$C_{PDCCH}^{total,(X,Y),\mu},$$

to indicate an upper limit of total non-overlapping CCEs in a plurality of scheduling cells per span; and $$C_{PDCCH}^{max,slot,\mu}$$

may be replaced with $$C_{PDCCH}^{max,(X,Y),\mu}$$

to indicate a preset upper limit of non-overlapping CCEs in one scheduling cell per span.

In the foregoing embodiments provided in this application, the methods provided in the embodiments of this application are described separately from perspectives of the terminal device and the network device. To implement functions in the method provided in embodiments of this application, the terminal device and the network device each may include a hardware structure, a software module, and implement the foregoing functions in a form of the hardware structure, the software module, or a combination of the hardware structure and the software module. One of the foregoing functions may be performed by using the hardware structure, the software module, or the combination of the hardware structure and the software module. The following describes in detail communication apparatuses in embodiments of this application with reference to FIG. 13 to FIG. 15. The communication apparatus is a terminal device or a network device. Optionally, the communication apparatus may be an apparatus in the terminal device or the network device.

Figure 13:
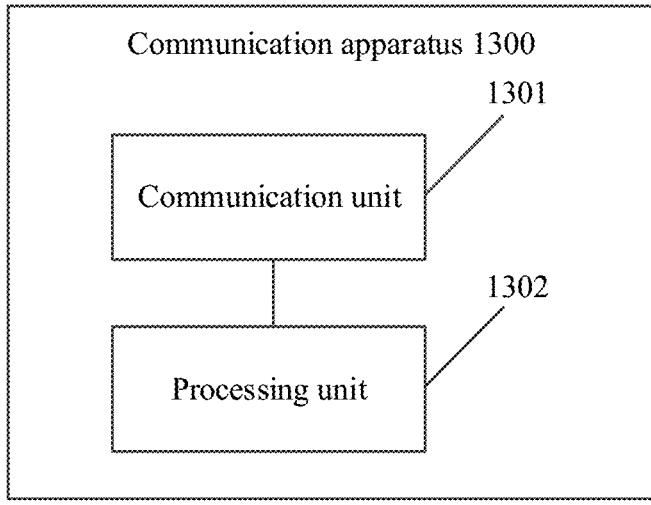
FIG. 13 is a schematic block diagram of a communication apparatus 1300 according to an embodiment of this application.

FIG. 13 is a schematic block diagram of a communication apparatus 1300. The communication apparatus 1300 may perform related operations of the terminal device or the network device in the foregoing method embodiments.

In a possible design, the communication apparatus 1300 includes but is not limited to:

a communication unit 1301, configured to receive first configuration information, where the first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell; and a processing unit 1302, configured to determine, for the same scheduled cell, monitoring upper limits of the PDCCH candidate in a first unit time and a second unit time.

The first unit time is determined based on a subcarrier spacing of an active downlink bandwidth part in the first scheduling cell, and the second unit time is determined based on a subcarrier spacing of an active downlink bandwidth part in the second scheduling cell.

In another possible design, the communication apparatus 1300 includes but is not limited to:

a communication unit 1301, configured to send first configuration information, where the first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell; and a processing unit 1302, configured to determine, for the same scheduled cell, monitoring upper limits of the PDCCH candidate in a first unit time and a second unit time.

The first unit time is determined based on a subcarrier spacing of an active downlink bandwidth part in the first scheduling cell, and the second unit time is determined based on a subcarrier spacing of an active downlink bandwidth part in the second scheduling cell.

In an optional implementation, in the communication apparatus 1300, for related content of the first scheduling information, refer to the implementation and the optional implementations in the downlink control information transmission method 100 or the downlink control information transmission method 400. To be specific, the first scheduling cell and the second scheduling cell meet one or more of the following features: The first scheduling cell and the second scheduling cell both are such configured that a monitoring upper limit is determined at a granularity of a slot; the first scheduling cell and the second scheduling cell are such configured that a monitoring upper limit is determined at a granularity of a span; numbers of control resource set pools CORESETPools that are respectively configured for the first scheduling cell and the second scheduling cell are the same and the numbers of the respectively configured CORESET-Pools are 1; numbers of control resource set pools CORE-SETPools that are respectively configured for the first scheduling cell and the second scheduling cell are the same and the numbers of the respectively configured CORESETPools are 2; the first scheduling cell is configured with a control resource set pool CORESETPool, and the second scheduling cell is not configured with a CORESETPool; the first scheduling cell is not configured with a control resource set pool CORESETPool, and the second scheduling cell is configured with a CORESETPool; or the first scheduling cell and the second scheduling cell are such configured that a monitoring upper limit is determined at a granularity of a span, and monitoring is performed in the first monitoring cell and the second monitoring cell by using a combination (X, Y), where there is a symbol group, in the second scheduling cell, whose start location overlaps a start location of any symbol group in the first scheduling cell, every X symbols constitute a symbol group, the subcarrier spacing of the active downlink bandwidth part in the first scheduling cell is greater than the subcarrier spacing of the active downlink bandwidth part in the second scheduling cell, and the combination (X, Y) indicates that an interval between start symbols of two consecutive spans is not less than X symbols, and each span is not greater than Y symbols.

In an optional implementation, in the communication apparatus 1300, for related content of the monitoring upper limit in the first unit time, refer to the implementation and the optional implementations in the downlink control information transmission method 100 or the downlink control information transmission method 400. To be specific, the monitoring upper limit in the first unit time is determined based on a preset monitoring upper limit per unit time corresponding to the first scheduling cell, and the monitoring upper limit in the second unit time is determined based on a preset monitoring upper limit per unit time corresponding to the second scheduling cell.

In an optional implementation, in the communication apparatus 1300, for related content of a monitoring upper limit in each unit time, refer to the implementation and the optional implementations in the downlink control information transmission method 100 or the downlink control information transmission method 400. The monitoring upper limit in each unit time includes a first upper limit in the unit time and/or a second upper limit in the unit time. The first upper limit is a maximum number of to-be-monitored PDCCH candidates, and the second upper limit is a maximum number of non-overlapping control channel elements CCEs in the to-be-monitored PDCCH candidate. The preset monitoring upper limit per unit time corresponding to each scheduling cell includes a first preset upper limit corresponding to the scheduling cell, and/or a second preset upper limit corresponding to the scheduling cell. The first preset upper limit is a preset maximum number of to-be-monitored PDCCH candidates, and the second preset upper limit is a preset maximum number of non-overlapping CCEs in the to-be-monitored PDCCH candidate.

In an optional implementation, when the first scheduling cell and the second scheduling cell each are not configured with a control resource set pool CORESETPool, or each are configured with a CORESETPool, when the first scheduling cell is configured with a CORESETPool, and the second scheduling cell is not configured with a CORESETPool, when the first scheduling cell is not configured with a CORESETPool, and the second scheduling cell is configured with a CORESETPool, or when the first scheduling cell and the second scheduling cell each are configured with two CORESETPools, for control resource sets corresponding to a same CORESETPool, the processing unit 1302 is specifically configured to determine the monitoring upper limit in the first unit time as one or more of the following: a first upper limit corresponding to the first scheduling cell and the second scheduling cell, where the first upper limit is determined based on a first preset upper limit corresponding to the first scheduling cell; a second upper limit corresponding to the first scheduling cell and the second scheduling cell, where the second upper limit is determined based on a second preset upper limit corresponding to the first scheduling cell; a first upper limit corresponding to the first scheduling cell, where the first upper limit is determined based on the first preset upper limit corresponding to the first scheduling cell; and a second upper limit corresponding to the first scheduling cell, where the second upper limit is determined based on the second preset upper limit corresponding to the first scheduling cell; and the monitoring upper limit in the second unit time determined by the processing unit 1302 specifically includes one or more of the following: a first upper limit corresponding to the first scheduling cell and the second scheduling cell, where the first upper limit is determined based on a first preset upper limit corresponding to the second scheduling cell; a second upper limit corresponding to the first scheduling cell and the second scheduling cell, where the second upper limit is determined based on a second preset upper limit corresponding to the second scheduling cell; a first upper limit corresponding to the second scheduling cell, where the first upper limit is determined based on the first preset upper limit corresponding to the second scheduling cell; and a second upper limit corresponding to the second scheduling cell, where the second upper limit is determined based on the second preset upper limit corresponding to the second scheduling cell.

In an optional implementation, when the first scheduling cell and the second scheduling cell each are configured with two control resource set pools CORESETPools, the processing unit 1302 is specifically configured to determine the monitoring upper limit in the first unit time as one or more of the following: a first upper limit corresponding to the first scheduling cell and the second scheduling cell, where the first upper limit is determined based on a third parameter and a first preset upper limit corresponding to the first scheduling cell; a second upper limit corresponding to the first scheduling cell and the second scheduling cell, where the second upper limit is determined based on the third parameter and a second preset upper limit corresponding to the first scheduling cell; a first upper limit corresponding to the first scheduling cell, where the first upper limit is determined based on the third parameter and the first preset upper limit corresponding to the first scheduling cell; and a second upper limit corresponding to the first scheduling cell, where the second upper limit is determined based on the third parameter and the second preset upper limit corresponding to the first scheduling cell; and the monitoring upper limit in the second unit time determined by the processing unit 1302 includes one or more of the following: a first upper limit corresponding to the first scheduling cell and the second scheduling cell, where the first upper limit is determined based on the third parameter and a first preset upper limit corresponding to the second scheduling cell; a second upper limit corresponding to the first scheduling cell and the second scheduling cell, where the second upper limit is determined based on the third parameter and a second preset upper limit corresponding to the second scheduling cell; a first upper limit corresponding to the second scheduling cell, where the first upper limit is determined based on the third parameter and the first preset upper limit corresponding to the second scheduling cell; and a second upper limit corresponding to the second scheduling cell, where the second upper limit is determined based on the third parameter and the second preset upper limit corresponding to the second scheduling cell. The third parameter is used to determine a number of cells corresponding to a scheduled cell scheduled by the scheduling cell configured with the two CORESET-Pools.

In an optional implementation, the processing unit 1302 is further configured to determine, for a plurality of scheduled cells, a monitoring upper limit of all PDCCH candidates in a plurality of scheduling cells in a unit time with a subcarrier spacing of μ. The plurality of scheduling cells are all scheduling cells in which a subcarrier spacing of an active downlink bandwidth part is μ, and the plurality of scheduled cells are all scheduled cells that are respectively scheduled by the plurality of scheduling cells. For the plurality of scheduled cells, the monitoring upper limit is determined based on a preset monitoring upper limit per unit time corresponding to the scheduling cell in which the subcarrier spacing is μ.

In still another possible design, the communication apparatus 1300 includes but is not limited to:
a communication unit 1301, configured to receive first configuration information, where the first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell; and
a processing unit 1302, configured to determine, for the same scheduled cell, a monitoring upper limit of the PDCCH candidate in a same unit time.
The same unit time is determined based on a subcarrier spacing of an active downlink bandwidth part in the first scheduling cell or the second scheduling cell.

In still another possible design, the communication apparatus 1300 includes but is not limited to:
a communication unit 1301, configured to send first configuration information, where the first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell; and
a processing unit 1302, configured to determine, for the same scheduled cell, a monitoring upper limit of the PDCCH candidate in a same unit time.
The same unit time is determined based on a subcarrier spacing of an active downlink bandwidth part in the first scheduling cell or the second scheduling cell.

In still another possible design, the communication apparatus 1300 includes but is not limited to:
a communication unit 1301, configured to receive first configuration information, where the first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell; and
a processing unit 1302, configured to: when the first configuration information does not meet one or more of the following features, determine that the PDCCH candidate is not monitored for the scheduled cell:
the first scheduling cell and the second scheduling cell both are such configured that a monitoring upper limit is determined at a granularity of a slot;
the first scheduling cell and the second scheduling cell both are such configured that a monitoring upper limit is determined at a granularity of a span;
numbers of control resource set pools CORESETPools that are respectively configured for the first scheduling cell and the second scheduling cell are the same and the numbers of the respectively configured CORESET-Pools are 1;
numbers of control resource set pools CORESETPools that are respectively configured for the first scheduling cell and the second scheduling cell are the same and the numbers of the respectively configured CORESET-Pools are 2;
the first scheduling cell is configured with a control resource set pool CORESETPool, and the second scheduling cell not configured with a CORESETPool; or
the first scheduling cell and the second scheduling cell both are such configured that a monitoring upper limit is determined at a granularity of a span, and monitoring is performed in the first monitoring cell and the second monitoring cell by using a combination (X, Y), where there is a symbol group, in the second scheduling cell, whose start location overlaps a start location of any symbol group in the first scheduling cell, and every X symbols constitute a symbol group.
The combination (X, Y) indicates that an interval between start symbols of two consecutive spans is not less than X symbols, and each span is not greater than Y symbols.
In still another possible design, the communication apparatus 1300 includes but is not limited to a communication unit 1301 and a processing unit 1302.
The communication unit 1301 is configured to send first configuration information, where the first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell.

The first configuration information meets one or more of the following features:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool; or the first scheduling cell and the second scheduling cell both are such configured that a monitoring upper limit is determined at a granularity of a span, and monitoring is performed in the first monitoring cell and the second monitoring cell by using a combination (X, Y), where there is a symbol group, in the second scheduling cell, whose start location overlaps a start location of any symbol group in the first scheduling cell, and every X symbols constitute a symbol group.

The combination (X, Y) indicates that an interval between start symbols of two consecutive spans is not less than X symbols, and each span is not greater than Y symbols.

The processing unit 1302 is configured to determine, for the same scheduled cell, monitoring upper limits of the PDCCH candidate in a first unit time and a second unit time.

The first unit time is determined based on a subcarrier spacing of an active downlink bandwidth part in the first scheduling cell, and the second unit time is determined based on a subcarrier spacing of an active downlink bandwidth part in the second scheduling cell.

In still another possible design, the communication apparatus 1300 includes but is not limited to:

a communication unit 1301, configured to receive first configuration information, where the first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell; and a processing unit 1302, configured to: when the first configuration information does not meet one or more of the following features, determine that the PDCCH candidate is not monitored for the scheduled cell:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool; or the first scheduling cell and the second scheduling cell both are such configured that a monitoring upper limit is determined at a granularity of a span, and monitoring is performed in the first monitoring cell and the second monitoring cell by using a combination (X, Y).

The combination (X, Y) indicates that an interval between start symbols of two consecutive spans is not less than X symbols, and each span is not greater than Y symbols.

In still another possible design, the communication apparatus 1300 includes but is not limited to a communication unit 1301 and a processing unit 1302.

The communication unit 1301 is configured to send first configuration information, where the first configuration information indicates the terminal device to monitor a physical downlink control channel PDCCH candidate in a first scheduling cell and a second scheduling cell, and the PDCCH candidate is used to carry downlink control information for scheduling data transmission in a same scheduled cell.

The first configuration information meets one or more of the following features:

the first scheduling cell and the second scheduling cell both are such configured that a monitoring upper limit is determined at a granularity of a slot;

the first scheduling cell and the second scheduling cell both are such configured that a monitoring upper limit is determined at a granularity of a span;

numbers of control resource set pools CORESETPools that are respectively configured for the first scheduling cell and the second scheduling cell are the same and the numbers of the respectively configured CORESET-Pools are 1;

numbers of control resource set pools CORESETPools that are respectively configured for the first scheduling cell and the second scheduling cell are the same and the numbers of the respectively configured CORESET-Pools are 2;

the first scheduling cell is configured with a control resource set pool CORESETPool, and the second scheduling cell is not configured with a CORESET-Pool; or the first scheduling cell and the second scheduling cell both are such configured that a monitoring upper limit is determined at a granularity of a span, and monitoring is performed in the first monitoring cell and the second monitoring cell by using a combination (X, Y), where there is a symbol group, in the second scheduling cell, whose start location overlaps a start location of any symbol group in the first scheduling cell, and every X symbols constitute a symbol group.

The combination (X, Y) indicates that an interval between start symbols of two consecutive spans is not less than X symbols, and each span is not greater than Y symbols.

The processing unit 1302 is configured to determine, for the same scheduled cell, a monitoring upper limit of the PDCCH candidate in a same unit time.

The same unit time is determined based on a subcarrier spacing of an active downlink bandwidth part in the first scheduling cell or the second scheduling cell.

Optionally, the communication apparatus 1300 may further perform one or more implementations of the downlink control information transmission method 100 to the downlink control information transmission method 400. Details are not described herein again.

Figures 14, 15:
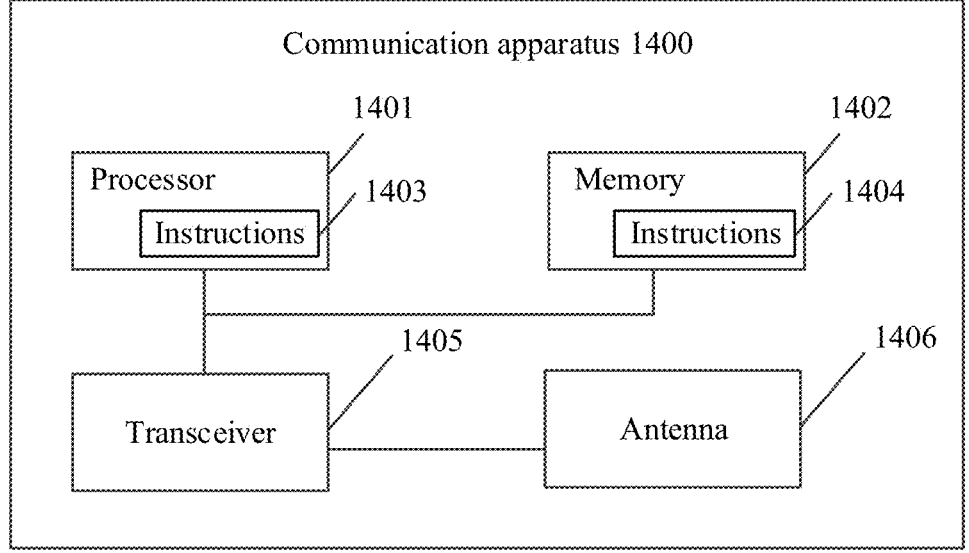
FIG. 14 is a schematic block diagram of another communication apparatus 1400 according to an embodiment of this application.
FIG. 15 is a schematic block diagram of a chip according to an embodiment of this application.

FIG. 14 is a schematic block diagram of a communication apparatus 1400.

In an implementation, the communication apparatus 1400 corresponds to a terminal device in the foregoing downlink control information transmission method. Optionally, the communication apparatus 1400 is an apparatus in the terminal device that performs the foregoing method embodiments, for example, a chip, a chip system, or a processor. The communication apparatus 1400 may be configured to implement the methods described in the foregoing method embodiments. For details, refer to the descriptions in the foregoing method embodiments.

In another implementation, the communication apparatus 1400 corresponds to a network device in the foregoing downlink control information transmission method. Optionally, the communication apparatus 1400 is an apparatus in the network device that performs the foregoing method embodiments, for example, a chip, a chip system, or a processor. The communication apparatus 1400 may be configured to implement the methods described in the foregoing method embodiments. For details, refer to the descriptions in the foregoing method embodiments.

The communication apparatus 1400 may include one or more processors 1401. The processor 1401 may be a general-purpose processor, a dedicated processor, or the like. For example, the processor 1401 may be a baseband processor or a central processing unit. The baseband processor may be configured to process a communication protocol and communication data, and the central processing unit may be configured to control a communication apparatus (for example, a base station, a baseband chip, a terminal, a terminal chip, a DU, or a CU) to execute a computer program, to process data of the computer program.

The communication apparatus 1400 may further include a transceiver 1405. The transceiver 1405 may be referred to as a transceiver unit, a transceiver, a transceiver circuit, or the like, and is configured to implement a transceiver function. The transceiver 1405 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communication apparatus 1400 may further include an antenna 1406.

Optionally, the communication apparatus 1400 may include one or more memories 1402. The memory may store instructions 1404. The instructions 1404 may be a computer program. The computer program may be run on the communication apparatus 1400, so that communication apparatus 1400 performs the methods described in the foregoing method embodiments. Optionally, the memory 1402 may further store data. The communication apparatus 1400 and the memory 1402 may be separately disposed, or may be integrated together.

In an implementation, the communication apparatus 1400 is configured to implement functions of the terminal device in the foregoing method embodiments.

The processor 1401 is configured to perform the step S103 in FIG. 8, the step S203 in FIG. 9, or the steps S304 and S305 in FIG. 10.

The transceiver 1405 is configured to perform the step S102 in FIG. 8, the step S202 in FIG. 9, or the step S302 in FIG. 10.

In another implementation, the communication apparatus 1400 is configured to implement functions of the network device in the foregoing method embodiments.

The transceiver 1405 is configured to perform the step S101 in FIG. 8, the step S201 in FIG. 9, or the step S301 in FIG. 10.

The processor 1401 is configured to perform the step S104 in FIG. 8, the step S204 in FIG. 9, or the step S303 in FIG. 10.

In an implementation, the processor 1401 may include a transceiver configured to implement a receiving function and a sending function. For example, the transceiver may be a transceiver circuit, an interface, or an interface circuit. The transceiver circuit, the interface, or the interface circuit configured to implement the receiving function and the sending function may be separated, or may be integrated together. The transceiver circuit, the interface, or the interface circuit may be configured to read and write code/data. Alternatively, the transceiver circuit, the interface, or the interface circuit may be configured to transmit or transfer a signal.

In an implementation, the processor 1401 may store instructions 1403. The instructions may be a computer program. The computer program 1403 is run on the processor 1401, to enable the communication apparatus 1400 to perform the methods described in the foregoing method embodiments. The computer program 1403 may be fixed in the processor 1401. In this case, the processor 1401 may be implemented by hardware.

In an implementation, the communication apparatus 1400 may include a circuit. The circuit may implement a sending, receiving, or communication function in the foregoing method embodiment.

For a case in which the communication apparatus may be a chip or a chip system, refer to a schematic diagram of a structure of a chip shown in FIG. 15. The chip shown in FIG. 15 includes a processor 1501, an interface 1502, and a memory 1503. There may be one or more processors 1501, and there may be a plurality of interfaces 1502. The memory 1503 may store related data.

A case in which the chip is configured to implement functions of the terminal device in the foregoing method embodiment is described as follows.

The processor 1501 is configured to perform the step S103 in FIG. 8, the step S203 in FIG. 9, or the step S304 in FIG. 10.

The interface 1502 is configured to perform the step S102 in FIG. 8, the step S202 in FIG. 9, or the step S302 in FIG. 10.

Optionally, the chip may further perform functions of the network device in the foregoing method embodiment.

The interface 1502 is configured to perform the step S101 in FIG. 8, the step S201 in FIG. 9, or the step S301 in FIG. 10.

The processor 1501 is configured to perform the step S104 in FIG. 8, the step S204 in FIG. 9, or the step S303 in FIG. 10.

Optionally, the chip may further perform related implementations in the foregoing method embodiments. Details are not described herein again. For example, optionally, the communication apparatus 1500 may further perform one or more of the downlink control information transmission method 100 to the downlink control information transmission method 400. Details are not described herein again.

A person skilled in the art may further understand that various illustrative logical blocks and steps that are listed in embodiments of this application may be implemented by electronic hardware, computer software, or a combination thereof. Whether the functions are implemented by hardware or software depends on particular applications and a design requirement of the entire system.

This application further provides a computer-readable storage medium storing a computer program. When the computer-readable storage medium is executed by a computer, the functions of any one of the foregoing method embodiments are implemented.

This application further provides a computer program product. When the computer program product is executed by a computer, functions of any one of the foregoing method embodiments are implemented.

All or some of the foregoing embodiments may be implemented by software, hardware, firmware, or any combination thereof. When the software is used for implementation, all or some of the embodiments may be implemented in a form of a computer program product. The computer program product includes one or more computer programs. When the computer program is loaded and executed on a computer, the procedures or functions according to embodiments of this application are all or partially generated. The computer may be a general-purpose computer, a dedicated computer, a computer network, or another programmable apparatus. The computer program may be stored in a computer-readable storage medium or may be transmitted from a computer-readable storage medium to another computer-readable storage medium. For example, the computer program may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

What is claimed is:

1. A downlink control information transmission method, performed by a terminal device or a chip in the terminal device, wherein the method comprises:

receiving, first configuration information, wherein the first configuration information indicates the terminal device to monitor a physical downlink control channel (PDCCH) candidate in a first scheduling cell and a second scheduling cell, and the PDCCH candidate is used to carry downlink control information for scheduling data transmission in a same scheduled cell that is scheduled by both the first scheduling cell and the second scheduling cell; and determining for the same scheduled cell, a monitoring upper limit of the PDCCH candidates in a first unit time and a monitoring upper limit in a second unit time, wherein:

the first unit time is determined based on a subcarrier spacing of an active downlink bandwidth part in the first scheduling cell, and the second unit time is determined based on a subcarrier spacing of an active downlink bandwidth part in the second scheduling cell, the monitoring upper limit in the first unit time corresponds to the first scheduling cell and is determined based on a preset monitoring upper limit per unit time corresponding to the subcarrier spacing of the active downlink bandwidth part in the first scheduling cell, and the monitoring upper limit in the second unit time corresponds to the second scheduling cell and is determined based on a preset monitoring upper limit per unit time corresponding to the subcarrier spacing of the active downlink bandwidth part in the second scheduling cell.

2. The method according to claim 1, wherein the first configuration information indicates the terminal device to determine each of the monitoring upper limit of PDCCH candidates in the first unit time and the monitoring upper limit in the second unit time at a granularity of a slot.

3. The method according to claim 1, wherein:

the monitoring upper limit in the second unit time comprises one or both of a first upper limit or a second upper limit, wherein the first upper limit is a maximum number of to-be-monitored PDCCH candidates, and the second upper limit is a maximum number of non-overlapping control channel elements (CCEs) in the to-be-monitored PDCCH candidates.

4. The method according to claim 1, wherein:

the monitoring upper limit in the first unit time comprises one or both of a first upper limit or a second upper limit, wherein the first upper limit is a maximum number of to-be-monitored PDCCH candidates, and the second upper limit is a maximum number of non-overlapping control channel elements (CCEs) in the to-be-monitored PDCCH candidates.

5. The method according to claim 1, wherein:

the terminal device is not configured with a control resource set pool by either the first scheduling cell or the second scheduling cell, the monitoring upper limit in the first unit time comprises one or more of:

a first upper limit corresponding to the first scheduling cell, wherein the first upper limit is determined based on a preset maximum number of to-be-monitored PDCCH candidates corresponding to the first scheduling cell; or a second upper limit corresponding to the first scheduling cell, wherein the second upper limit is determined based on a preset maximum number of non-overlapping CCEs in the to-be-monitored PDCCH candidates corresponding to the first scheduling cell; and the monitoring upper limit in the second unit time comprises one or more of:

a first upper limit corresponding to the second scheduling cell, wherein the first upper limit is determined based on a preset maximum number of to-be-monitored PDCCH candidates corresponding to the second scheduling cell; or a second upper limit corresponding to the second scheduling cell, wherein the second upper limit is determined based on a preset maximum number of non-overlapping CCEs in the to-be-monitored PDCCH candidates corresponding to the second scheduling cell.

6. The method according to claim 5, wherein:

the first upper limit corresponding to the first scheduling cell and the first upper limit corresponding to the second scheduling cell is equal to the preset maximum number of to-be-monitored PDCCH candidates corresponding to the first scheduling cell; and the second upper limit corresponding to the first scheduling cell and the second upper limit corresponding to the second scheduling cell is equal to the preset maximum number of non-overlapping CCEs in the to-be-monitored PDCCH candidates corresponding to the first scheduling cell.

7. The method according to claim 5, wherein:

the first upper limit corresponding to the first scheduling cell is equal to a product of $a_1$ and the preset maximum number of to-be-monitored PDCCH candidates corresponding to the first scheduling cell; and the second upper limit corresponding to the first scheduling cell is equal to a product of $a_1$ and the preset maximum number of non-overlapping CCEs in the to-be-monitored PDCCH candidates corresponding to the first scheduling cell, wherein:

$a_1$ represents a first parameter configured for the first scheduling cell.

8. The method according to claim 7, wherein $0 \leq a_1 \leq 1$.

9. The method according to claim 1, wherein a total monitoring upper limit corresponding to the first scheduling cell and the second scheduling cell in the first unit time is determined based on the preset monitoring upper limit per unit time corresponding to the subcarrier spacing of the active downlink bandwidth part in the first scheduling cell.

10. An apparatus comprising at least one processor coupled with at least one memory storing computer instructions, wherein the computer instructions are executed by the at one least processor to cause the apparatus perform operations comprising:

sending first configuration information, wherein the first configuration information indicates a terminal device to monitor a physical downlink control channel (PDCCH) candidate in a first scheduling cell and a second scheduling cell, and the PDCCH candidate is used to carry downlink control information for scheduling data transmission in a same scheduled cell that is scheduled by both the first scheduling cell and the second scheduling cell; and determining for the same scheduled cell, a monitoring upper limit of the PDCCH candidates in a first unit time and a monitoring upper limit in a second unit time, wherein:

the first unit time is determined based on a subcarrier spacing of an active downlink bandwidth part in the first scheduling cell, and the second unit time is determined based on a subcarrier spacing of an active downlink bandwidth part in the second scheduling cell, the monitoring upper limit in the first unit time corresponds to the first scheduling cell and is determined based on a preset monitoring upper limit per unit time corresponding to the subcarrier spacing of the active downlink bandwidth part in the first scheduling cell, and the monitoring upper limit in the second unit time corresponds to the second scheduling cell and is determined based on a preset monitoring upper limit per unit time corresponding to the subcarrier spacing of the active downlink bandwidth part in the second scheduling cell.

11. The apparatus according to claim 10, wherein the first configuration information indicates the terminal device to determine each of the monitoring upper limit of PDCCH candidates in the first unit time and the monitoring upper limit in the second unit time at a granularity of a slot.

12. The apparatus according to claim 10, wherein:

the monitoring upper limit in the second unit time comprises one or both of a first upper limit or a second upper limit, wherein the first upper limit is a maximum number of to-be-monitored PDCCH candidates, and the second upper limit is a maximum number of non-overlapping control channel elements (CCEs) in the to-be-monitored PDCCH candidates.

13. The apparatus according to claim 10, wherein:

the monitoring upper limit in the first unit time comprises one or both of a first upper limit or a second upper limit, wherein the first upper limit is a maximum number of to-be-monitored PDCCH candidates, and the second upper limit is a maximum number of non-overlapping control channel elements (CCEs) in the to-be-monitored PDCCH candidate.

14. The apparatus according to claim 10, wherein:

the terminal device is not configured with a control resource set pool by either the first scheduling cell or the second scheduling cell each, the monitoring upper limit in the first unit time comprises one or more of:

a first upper limit corresponding to the first scheduling cell, wherein the first upper limit is determined based on a preset maximum number of to-be-monitored PDCCH candidates corresponding to the first scheduling cell; or a second upper limit corresponding to the first scheduling cell, wherein the second upper limit is determined based on a preset maximum number of non-overlapping CCEs in the to-be-monitored PDCCH candidates corresponding to the first scheduling cell; and the monitoring upper limit in the second unit time comprises one or more of:

a first upper limit corresponding to the second scheduling cell, wherein the first upper limit is determined based on a preset maximum number of to-be-monitored PDCCH candidates corresponding to the second scheduling cell; or a second upper limit corresponding to the second scheduling cell, wherein the second upper limit is determined based on a preset maximum number of non-overlapping CCEs in the to-be-monitored PDCCH candidates corresponding to the second scheduling cell.

15. The apparatus according to claim 14, wherein:

the first upper limit corresponding to the first scheduling cell and the second scheduling cell is equal to the preset maximum number of to-be-monitored PDCCH candidates corresponding to the first scheduling cell; and the second upper limit corresponding to the first scheduling cell and the second scheduling cell is equal to the preset maximum number of non-overlapping CCEs in the to-be-monitored PDCCH candidates corresponding to the first scheduling cell.

16. The apparatus according to claim 14, wherein:

the first upper limit corresponding to the first scheduling cell is equal to a product of $a_1$ and the preset maximum number of to-be-monitored PDCCH candidates corresponding to the first scheduling cell; and the second upper limit corresponding to the first scheduling cell is equal to a product of $a_1$ and the preset maximum number of non-overlapping CCEs in the to-be-monitored PDCCH candidates corresponding to the first scheduling cell, wherein $a_1$ represents a first parameter configured for the first scheduling cell.

17. The apparatus according to claim 16, wherein $0 \le a_1 \le 1$.

18. The apparatus according to claim 10, wherein a total monitoring upper limit corresponding to the first scheduling cell and the second scheduling cell in the first unit time is determined based on the preset monitoring upper limit per unit time corresponding to the subcarrier spacing of the active downlink bandwidth part in the first scheduling cell.

19. An apparatus comprising at least one processor coupled with at least one memory storing computer instructions, wherein the computer instructions are executed by the at least one processor to cause the apparatus perform operations comprising:

receiving first configuration information, wherein the first configuration information indicates the apparatus to monitor a physical downlink control channel (PDCCH) candidate in a first scheduling cell and a second scheduling cell, and the PDCCH candidate is used to carry downlink control information for scheduling data transmission in a same scheduled cell that is scheduled by both the first scheduling cell and the second scheduling cell; and determining, for the same scheduled cell, a monitoring upper limit of the PDCCH candidates in a first unit time and a monitoring upper limit in a second unit time, wherein:

the first unit time is determined based on a subcarrier spacing of an active downlink bandwidth part in the first scheduling cell, and the second unit time is determined based on a subcarrier spacing of an active downlink bandwidth part in the second scheduling cell, the monitoring upper limit in the first unit time corresponds to the first scheduling cell and is determined based on a preset monitoring upper limit per unit time corresponding to the subcarrier spacing of the active downlink bandwidth part in the first scheduling cell, and the monitoring upper limit in the second unit time corresponds to the second scheduling cell and is determined based on a preset monitoring upper limit per unit time corresponding to the subcarrier spacing of the active downlink bandwidth part in the second scheduling cell.

20. The apparatus according to claim 19, wherein the first configuration information indicates the apparatus to determine each of the monitoring upper limit of PDCCH candidates in the first unit time and the monitoring upper limit in the second unit time at a granularity of a slot.

21. The apparatus according to claim 19, wherein:

the monitoring upper limit in the second unit time comprises one or both of a first upper limit or a second upper limit, wherein the first upper limit is a maximum number of to-be-monitored PDCCH candidates, and the second upper limit is a maximum number of non-overlapping control channel elements (CCEs) in the to-be-monitored PDCCH candidates.

22. The apparatus according to claim 19, wherein:

the monitoring upper limit in the first unit time comprises one or both of a first upper limit or a second upper limit, wherein the first upper limit is a maximum number of to-be-monitored PDCCH candidates, and the second upper limit is a maximum number of non-overlapping control channel elements (CCEs) in the to-be-monitored PDCCH candidates.

23. The apparatus according to claim 22, wherein:

the apparatus is not configured with a control resource set pool by either the first scheduling cell or the second scheduling cell, the monitoring upper limit in the first unit time comprises one or more of:

a first upper limit corresponding to the first scheduling cell, wherein the first upper limit is determined based on a preset maximum number of to-be-monitored PDCCH candidates corresponding to the first scheduling cell; or a second upper limit corresponding to the first scheduling cell, wherein the second upper limit is determined based on a preset maximum number of non-overlapping CCEs in the to-be-monitored PDCCH candidates corresponding to the first scheduling cell; and the monitoring upper limit in the second unit time comprises one or more of:

a first upper limit corresponding to the second scheduling cell, wherein the first upper limit is determined based on the preset maximum number of to-be-monitored PDCCH candidates corresponding to the second scheduling cell; or a second upper limit corresponding to the second scheduling cell, wherein the second upper limit is determined based on the preset maximum number of non-overlapping CCEs in the to-be-monitored PDCCH candidates corresponding to the second scheduling cell.

24. The apparatus according to claim 23, wherein:

the first upper limit corresponding to the first scheduling cell and the second scheduling cell is equal to the preset maximum number of to-be-monitored PDCCH candidates corresponding to the first scheduling cell; and the second upper limit corresponding to the first scheduling cell and the second scheduling cell is equal to the preset maximum number of non-overlapping CCEs in the to-be-monitored PDCCH candidates corresponding to the first scheduling cell.

25. The apparatus according to claim 23, wherein:

the first upper limit corresponding to the first scheduling cell is equal to a product of $a_1$ and the preset maximum number of to-be-monitored PDCCH candidates corresponding to the first scheduling cell; and the second upper limit corresponding to the first scheduling cell is equal to a product of $a_1$ and the preset maximum number of non-overlapping CCEs in the to-be-monitored PDCCH candidates corresponding to the first scheduling cell, wherein $a_1$ represents a first parameter configured for the first scheduling cell.

26. The apparatus according to claim 25, wherein $0 \le a_1 \le 1$.

27. The apparatus according to claim 23, wherein a total monitoring upper limit corresponding to the first scheduling cell and the second scheduling cell in the first unit time is determined based on the preset monitoring upper limit per unit time corresponding to the subcarrier spacing of the active downlink bandwidth part in the first scheduling cell.

* * * * *